US011723041B2

(12) United States Patent
Jung et al.

(10) Patent No.: US 11,723,041 B2
(45) Date of Patent: Aug. 8, 2023

(54) METHOD AND DEVICE FOR TRANSMITTING AND RECEIVING SIGNAL IN WIRELESS COMMUNICATION SYSTEM

(71) Applicant: Samsung Electronics Co., Ltd., Suwon-si (KR)

(72) Inventors: Euichang Jung, Suwon-si (KR); Jinhyun Park, Suwon-si (KR); Hoondong Noh, Suwon-si (KR); Youngrok Jang, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/225,515

(22) Filed: Apr. 8, 2021

(65) Prior Publication Data

US 2021/0321442 A1    Oct. 14, 2021

(30) Foreign Application Priority Data

Apr. 9, 2020 (KR) .................. 10-2020-0043668
May 15, 2020 (KR) .................. 10-2020-0058102

(51) Int. Cl.
*H04W 72/12* (2023.01)
*H04L 5/00* (2006.01)
(Continued)

(52) U.S. Cl.
CPC .......... *H04W 72/23* (2023.01); *H04W 24/10* (2013.01); *H04W 72/0446* (2013.01)

(58) Field of Classification Search
CPC ............ H04W 72/1289; H04W 72/23; H04W 24/10; H04W 72/0446; H04L 5/0053;
(Continued)

(56) References Cited

U.S. PATENT DOCUMENTS

2018/0269939 A1* 9/2018 Hu ................. H04B 7/0626
2019/0253308 A1* 8/2019 Huang ............. H04B 7/0695
(Continued)

FOREIGN PATENT DOCUMENTS

| KR | 10-2021-0103882 A | 8/2021 |
| WO | 2019/147631 A1 | 8/2019 |
| WO | 2020/048181 A1 | 3/2020 |

OTHER PUBLICATIONS

Nokia Corrections on Cross-carrier Scheduling with Different Numerologies, 3GPP Draft, RP-200194, Mar. 11, 2020, e-meeting_R1-2001443, Mobile Competence Centre; 650, Route Des Lucioles; F-06921 Sophia-Antipolis Cedex; France (Year: 2020).*
(Continued)

*Primary Examiner* — Edan Orgad
*Assistant Examiner* — Vanneilian Lalchinthang
(74) *Attorney, Agent, or Firm* — Jefferson IP Law, LLP

(57) ABSTRACT

The disclosure relates to communication techniques for merging 5$^{th}$ generation (5G) communication systems with internet-of-things (IoT) technology to support a high data transmission rate in post-4$^{th}$ generation (4G) system and systems therefor. The disclosure can be applied to an intelligent service (for example, a smart home, a smart building, a smart city, a smart car or a connected car, health care, digital education, retail, security and safety-related services, and the like) based on a 5G communication technology and an IoT-related technology. A method and device for transmitting and receiving signals in a wireless communication system are provided.

13 Claims, 24 Drawing Sheets

(51) Int. Cl.
   *H04W 72/04* (2023.01)
   *H04W 72/23* (2023.01)
   *H04W 24/10* (2009.01)
   *H04W 72/0446* (2023.01)

(58) Field of Classification Search
   CPC ....... H04L 5/001; H04L 5/0023; H04L 5/005; H04L 27/26025; H04L 5/0048; H04L 5/0051; H04B 7/0628; H04B 7/024; H04B 7/0617
   USPC .......................................................... 370/329
   See application file for complete search history.

(56) References Cited

U.S. PATENT DOCUMENTS

| | | | | |
|---|---|---|---|---|
| 2020/0314860 | A1* | 10/2020 | Zhou | H04W 72/042 |
| 2020/0322109 | A1* | 10/2020 | Yu | H04L 5/0053 |
| 2020/0382354 | A1* | 12/2020 | Sengupta | H04L 5/001 |
| 2021/0169290 | A1* | 6/2021 | No | A47L 9/2894 |
| 2021/0243659 | A1* | 8/2021 | Cirik | H04L 5/0053 |
| 2021/0258964 | A1* | 8/2021 | Khoshnevisan | H04B 7/0695 |
| 2021/0378004 | A1* | 12/2021 | Cirik | H04W 72/0446 |
| 2022/0103219 | A1* | 3/2022 | John Wilson | H04L 5/0048 |
| 2022/0131582 | A1* | 4/2022 | Park | H04B 7/024 |

OTHER PUBLICATIONS

3GPP; TSG RAN; NR; Physical layer procedures for data (Release 16), 3GPP TS 38.214 V16.1.0, Apr. 3, 2020.
Zte, Cross-CC aperiodic CSI-RS triggering with mixed numerology, R1-1911940, 3GPP TSG RAN WG1 Meeting #99, Nov. 9, 2019, Reno, USA.
Asustek, Enhancements on multiple TRP or panel transmission, R1-1913023, 3GPP TSG RAN WG1 #99, Nov. 8, 2019, Reno, USA.
International Search report dated Jul. 22, 2021, issued in International Application No. PCT/KR2021/004448.
Nokia, Corrections on Cross-carrier Scheduling with Different Numerologies, 3GPP Draft, RP-200194, Mar. 11, 2020, e-meeting.
Samsung, Introduction of eMIMO for NR, 3GPP Draft, RP-200339, Mar. 12, 2020, Elbonia.
European Search Report dated Jun. 27, 2022, issued in European Application No. 21783725.1.

* cited by examiner

| | | | | | | | | |
|---|---|---|---|---|---|---|---|---|
| R | | Serving Cell ID | | | | BWP ID | | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

. . .

| | | | | | | | | |
|---|---|---|---|---|---|---|---|---|
| $T_{(N-2)\times 8+7}$ | $T_{(N-2)\times 8+6}$ | $T_{(N-2)\times 8+5}$ | $T_{(N-2)\times 8+4}$ | $T_{(N-2)\times 8+3}$ | $T_{(N-2)\times 8+2}$ | $T_{(N-2)\times 8+1}$ | $T_{(N-2)\times 8}$ | Oct N |

10-00

| | | |
|---|---|---|
| Serving Cell ID | | CORESET ID | Oct 1 |
| CORE SET ID | TCI state ID | | Oct 2 |

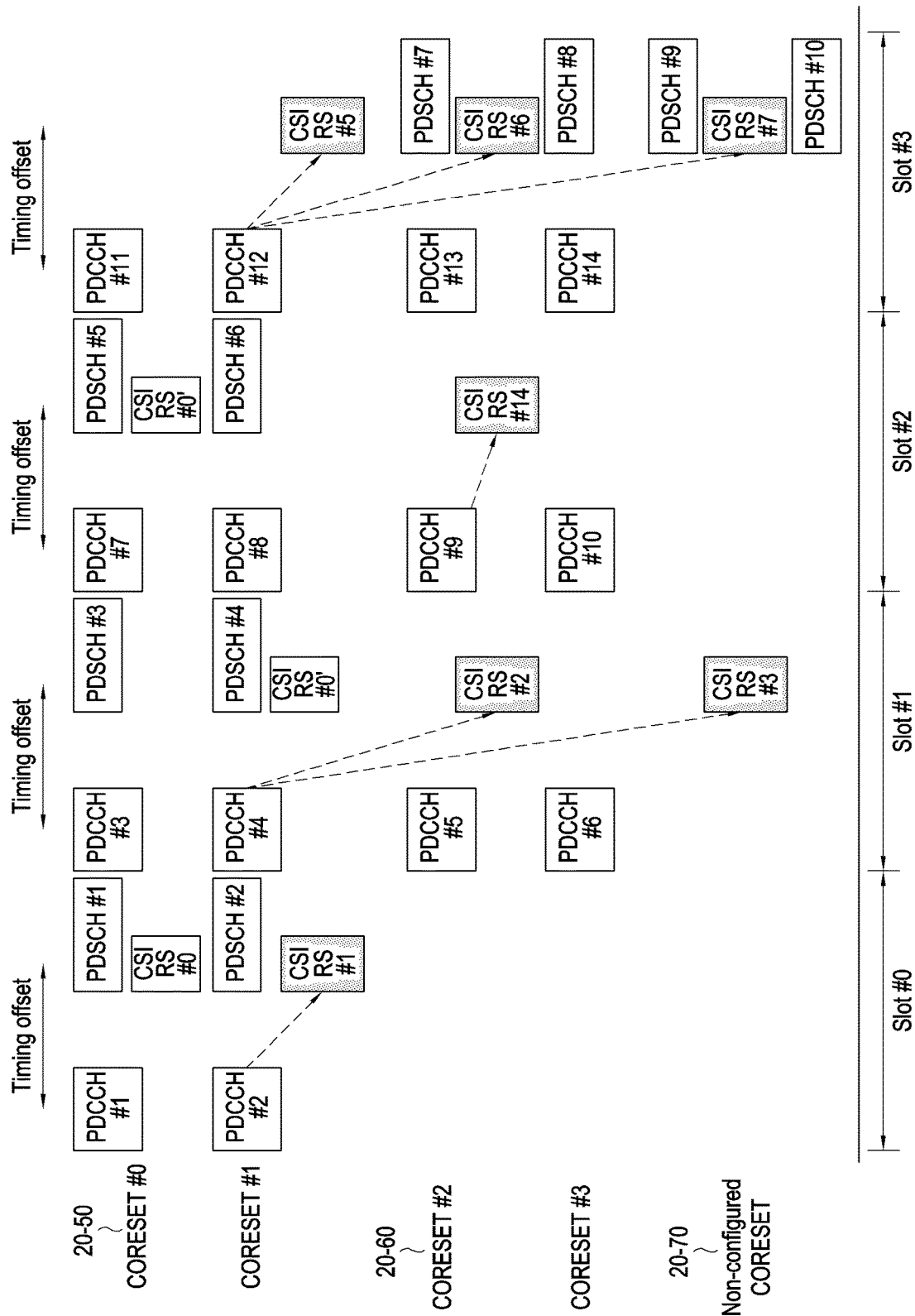

METHOD AND DEVICE FOR TRANSMITTING AND RECEIVING SIGNAL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0043668, filed on Apr. 9, 2020, in the Korean Intellectual Property Office, and of a Korean patent application number 10-2020-0058102, filed on May 15, 2020, in the Korean Intellectual Property Office, the disclosure of each of which is incorporated by reference herein in its entirety.

BACKGROUND

1. Field

The disclosure relates to methods and devices of transmitting and receiving signals in wireless communication systems. More particularly, the disclosure relates to methods and devices for transmitting and receiving one or more data between a transmission node and a user equipment (UE) to perform cooperative communication in a wireless communication system.

2. Description of Related Art

In order to meet the demand for wireless data traffic soaring since the $4^{th}$ generation (4G) communication system came to the market, there are ongoing efforts to develop enhanced $5^{th}$ generation (5G) communication systems or pre-5G communication systems. For the reasons, the 5G communication system or pre-5G communication system is called the beyond 4G network communication system or post long term evolution (LTE) system. For higher data transmit rates, 5G communication systems are considered to be implemented on ultra-high frequency bands (mmWave), such as, e.g., 70 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna. Also being developed are various technologies for the 5G communication system to have an enhanced network, such as an evolved or advanced small cell, a cloud radio access network (cloud RAN), an ultra-dense network, a device-to-device (D2D) communication, a wireless backhaul, a moving network, a cooperative communication, a coordinated multi-point (CoMP), and interference cancellation. There are also other various schemes under development for the 5G system including, e.g., hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of Things (IoT) network by which information is communicated and processed between things or other distributed components. Another arising technology is the Internet of Everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC). In the IoT environment may be offered intelligent Internet Technology (IT) services that collect and analyze the data generated by the things connected with one another to create human life a new value. The IoT may have various applications, such as the smart home, a smart building, a smart city, a smart car or a connected car, a smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

As described above, with the development of wireless communication systems, a data transmission/reception scheme for network cooperative communication is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and devices for transmitting and receiving one or more data between a transmission node and a user equipment (UE) to perform cooperative communication in a wireless communication system.

Objects of the disclosure are not limited to the foregoing, and other unmentioned objects would be apparent to one of ordinary skill in the art from the following description.

Additional aspects will be set forth in part in the description which follows and, in part, will be apparent from the description, or may be learned by practice of the presented embodiments.

In accordance with an aspect of the disclosure, a method performed by a terminal UE in a wireless communication system is provided. The method includes receiving, from a base station (BS), physical downlink control channel (PDCCH) configuration information including two different values of a control resource set (CORESET) pool index, receiving, from the BS, information indicating that predefined quasi co located (QCL) relation is enabled to be applied based on a CORESET pool index, receiving, from the BS, a PDCCH triggering an aperiodic channel state information reference signal (CSI-RS), and receiving, from the BS, the aperiodic CSI-RS, wherein, in case that a scheduling offset between a last symbol of the PDCCH and a start symbol of the aperiodic CSI-RS is smaller than a time duration for QCL application, QCL relation applied for the aperiodic CSI-RS is determined according to a CORESET pool index associated with the PDCCH.

In accordance with another aspect of the disclosure, a method performed by a terminal UE in a wireless communication system is provided. The method includes receiving, from a base station (BS), physical downlink control channel (PDCCH) configuration information including two different values of a control resource set (CORESET) pool index, receiving, from the BS, information indicating that pre-defined quasi co located (QCL) relation is enabled to be applied based on a CORESET pool index, receiving, from the BS, a PDCCH, and receiving, from the BS, a physical downlink shared channel (PDSCH) scheduled by the PDCCH, wherein, in case that an offset between the reception of the PDCCH and the reception of the PDSCH is smaller than a threshold value for applying QCL relation, QCL relation applied for the PDSCH is determined according to a CORESET with a lowest CORESET index among CORESETs configured with a same value as a CORESET pool index of the PDCCH.

In accordance with another aspect of the disclosure, a method performed by a base station (BS) in a wireless communication system is provided. The method includes generating physical downlink control channel (PDCCH) configuration information including two different values of a control resource set (CORESET) pool index, generating first information indicating that pre-defined quasi co located (QCL) relation is enabled to be applied based on a CORESET pool index, transmitting, to the terminal, the PDCCH configuration information, and transmitting, to the terminal, the first information. In accordance with another aspect of the disclosure, a terminal in a wireless communication system is provided. The terminal includes a transceiver, and a processor, wherein the processor is configured to: receive, from a base station (BS) via the transceiver, physical downlink control channel (PDCCH) configuration information including two different values of a control resource set (CORESET) pool index, receive, from the BS via the transceiver, information indicating that pre-defined quasi co located (QCL) relation is enabled to be applied based on a CORESET pool index, receive, from the BS via the transceiver, a PDCCH triggering an aperiodic channel state information reference signal (CSI-RS), and receive, from the BS via the transceiver, the aperiodic CSI-RS, wherein, in case that a scheduling offset between a last symbol of the PDCCH and a start symbol of the aperiodic CSI-RS is smaller than a time duration for QCL application, QCL relation applied for the aperiodic CSI-RS is determined according to a CORESET pool index associated with the PDCCH. In accordance with another aspect of the disclosure, a base station (BS) in a wireless communication system is provided. The BS includes a transceiver, and a processor, wherein the processor is configured to: generate physical downlink control channel (PDCCH) configuration information including two different values of a control resource set (CORESET) pool index, generate first information indicating that pre-defined quasi co located (QCL) relation is enabled to be applied based on a CORESET pool index, transmit, to the terminal via the transceiver, the PDCCH configuration information, and transmit, to the terminal via the transceiver, the first information.

According to an embodiment of the disclosure, there may be provided methods and devices for transmitting and receiving one or more data between a transmission node and a UE to perform cooperative communication in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in connection with the accompanying drawings, in which:

FIG. 10A is a view illustrating a medium access control (MAC) control element CE structure for transmission configuration indication (TCI) state activation of a UE-specific physical downlink control channel (PDCCH) according to an embodiment of the disclosure;

FIGS. 21A and 21B are views illustrating a method for receiving an aperiodic or periodic CSI-RS and a PDSCH based on NC-JT by a UE and a default QCL configuration according to various embodiments of the disclosure;

Throughout the drawings, it should be noted that like reference numbers are used to depict the same or similar elements, features, and structures.

DETAILED DESCRIPTION

Figure 1:
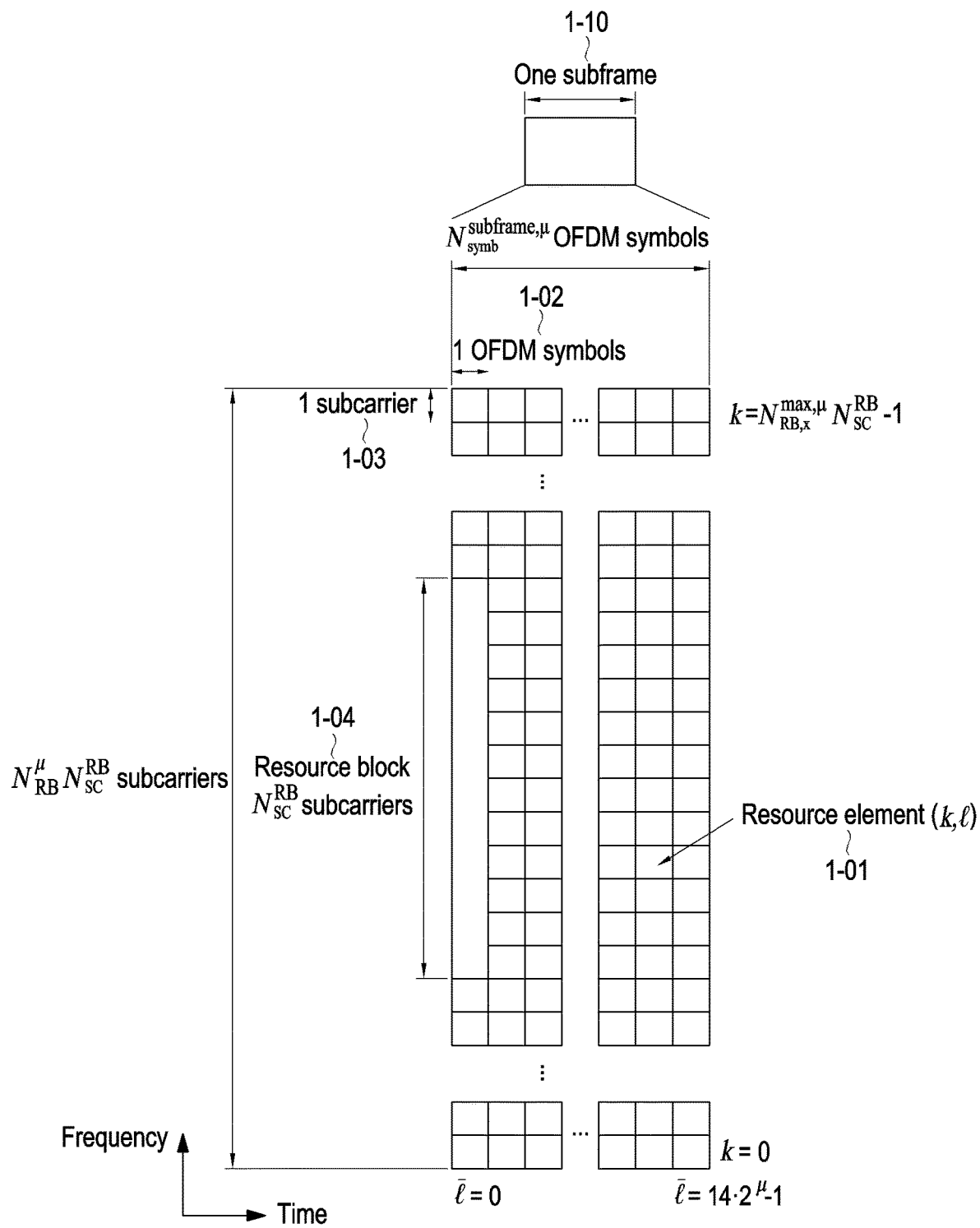
FIG. 1 is a view illustrating a transmission structure in a time-frequency domain in long-term evolution (LTE), evolved universal terrestrial radio access (E-UTRA), LTE-advanced (LTE-A), or a similar wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operations are performed over the computer or other programmable data processing devices and operate the computer or other programmable data processing devices may provide operations for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element, such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or subunits. Further, an element or a 'unit' may be implemented to reproduce one or more central processing units (CPUs) in a device or a security multimedia card. According to embodiments of the disclosure, a " . . . unit" may include one or more processors.

Hereinafter, the operational principle of the disclosure is described below with reference to the accompanying drawings. When determined to make the subject matter of the disclosure unclear, the detailed of the known functions or configurations may be skipped. The terms as used herein are defined considering the functions in the disclosure and may be replaced with other terms according to the intention or practice of the user or operator. Therefore, the terms should be defined based on the overall disclosure. Hereinafter, the base station may be an entity allocating resource to terminal and may be at least one of a gNode B (gNB), an eNode B (eNB), a Node B, a base station (BS), a wireless access unit, a base station a controller, or a node over network. The terminal may include a user equipment (UE), a mobile station (MS), a terminal, a cellular phone, a smartphone, a computer, or a multimedia system capable of performing communication functions. However, embodiments of the disclosure are not limited thereto. According to embodiments of the disclosure, there is described technology for receiving broadcast information from a base station by a UE in a wireless communication system. The disclosure relates to communication techniques for merging $5^{th}$ generation (5G) communication systems with internet-of-things (IoT) technology to support a high data transmission rate in post-$4^{th}$ generation (4G) system and systems therefor. The disclosure can be applied to an intelligent service (for example, a smart home, a smart building, a smart city, a smart car or connected car, health care, digital education, retail, security and safety-related services, and the like) based on a 5G communication technology and an IoT-related technology.

Hereinafter, terms denoting broadcast information, terms denoting control information, communication coverage-related terms, terms (e.g., an event) denoting state variations, terms denoting network entities, terms denoting messages, or terms denoting device components are provided solely for illustration purposes. The disclosure is not limited to the terms, and other terms equivalent in technical concept may also be used.

For ease of description, hereinafter, some of the terms and names defined in the $3^{rd}$ generation partnership project long term evolution (3GPP LTE) standards may be used. However, the disclosure is not limited by such terms and names and may be likewise applicable to systems conforming to other standards.

Wireless communication systems evolve beyond voice-centered services to broadband wireless communication systems to provide high data rate and high-quality packet data services, such as 3GPP high speed packet access (HSPA), LTE or evolved universal terrestrial radio access (E-UTRA)), LTE-advanced (LTE-A), LTE-pro, 3GPP2 high rate packet data (HRPD), ultra-mobile broadband (UMB), and institute of electrical and electronics engineers (IEEE) 802.16e communication standards.

As a representative example of such broadband wireless communication system, the LTE system adopts orthogonal frequency division multiplexing (OFDM) for downlink and single carrier frequency division multiple access (SC-FDMA) for uplink. Uplink means a wireless link where the user equipment (UE) (or mobile station (MS) transmits data or control signals to the base station (BS, or eNode B), and download means a wireless link where the base station transmits data or control signals to the UE. Such multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that meet various requirements. Services considered for 5G communication systems include, e.g., increased mobile broadband (eMBB), massive machine type communication (MMTC), and ultra-reliability low latency communication (URLLC).

According to an embodiment of the disclosure, eMBB aims to provide a further enhanced data transmission rate as compared with LTE, LTE-A, or LTE-pro. For example, eMBB for 5G communication systems needs to provide a peak data rate of 20 Gbps on download and a peak data rate of 10 Gbps on uplink in terms of one base station. The 5G communication system is also required to provide the increased user perceived data rate of the UE. To meet such requirements, transmit (TX)/receive (RX) techniques, as well as multiple input multiple output (MIMO), need to further be enhanced. The data transmission rate required for 5G communication systems may be met by using a broader frequency bandwidth than 20 Mhz in a frequency band ranging 3 Ghz to 6 Ghz or a frequency band of 6 Ghz or more instead of the 2 Ghz band currently adopted in LTE.

mMTC is also considered to support application services, such as internet of things (IoT) in the 5G communication system. To efficiently provide IoT, mMTC may be required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/$km^2$). Since mMTC-supportive UEs, by the nature of service, are highly likely to be located in shadow areas not covered by the cell, such as the underground of a building, it may require much broader coverage as compared with other services that the 5G communication system provides. mMTC-supportive UEs, due to the need for being low cost and difficulty in frequently exchanging batteries, may be required to have a very long battery life.

The URLLC, as a cellular-based wireless communication service used for a specific purpose (mission-critical), may be a service used for remote control for robots or machinery, industrial automation, unmanned aerial vehicles, remote health care, and emergency alerts and may be required to provide communication that provides ultra-low latency and ultra-high reliability. For example, URLLC-supportive services need to meet an air interface latency of less than 0.5 milliseconds simultaneously with a packet error rate of $10^{-5}$ or less. Thus, for URLLC-supportive services, the 5G communication system may be required to be designed to provide a shorter transmit time interval (TTI) than those for other services and allocate a broad resource in the frequency band. However, the aforementioned mMTC, URLLC, and eMBB are merely examples of different service types, and the service types to which the disclosure is applied are not limited to the above-described examples.

Services considered in the 5G communication system described above should be merged together based on one framework. In other words, for efficient resource management and control, it is preferable that the services are integrated into a single system and controlled and transmitted, rather than being independently operated.

Although LTE, LTE-A, LTE Pro, or new radio (NR) systems are described as examples in connection with embodiments of the disclosure, embodiments of the disclosure may also apply to other communication systems with a similar technical background or channel form. Further, embodiments of the disclosure may be modified in such a range as not to significantly depart from the scope of the disclosure under the determination by one of ordinary skill in the art and such modifications may be applicable to other communication systems.

The disclosure relates to methods and devices for repeatedly transmitting data and control signals between a UE and a plurality of transmission nodes performing cooperative communication to enhance communication reliability.

According to an embodiment of the disclosure, when network cooperative communication is used in a wireless communication system, the reliability of UE received data/control signals may be enhanced.

The frame structure of the 5G system is described below with reference to the drawings.

FIG. 1 is a view illustrating a transmission structure in a time-frequency domain of a wireless communication system according to an embodiment of the disclosure.

Referring to FIG. 1, the time-frequency domain transmission structure illustrated in FIG. 1 illustrates the time-frequency domain transmission structure of LTE, LTE-A, NR, or other similar wireless communication systems. FIG. 1 illustrates a basic structure of a time-frequency domain, which is a radio resource region in which data or control channel signals are transmitted in a 5G system. Referring to FIG. 1, the horizontal axis refers to the time domain, and the vertical axis refers to the frequency domain. The basic unit of resource in the time and frequency domain is the resource element (RE) 1-01. One RE may be defined as a resource that occupies one orthogonal frequency division multiplexing (OFDM) symbol 1-02 on the time axis (time domain) and one subcarrier 1-03 on the frequency axis (frequency domain). In the frequency domain $N_{SC}^{RB}$ (e.g., 12) consecutive REs may constitute one resource block (RB) 1-04.

Figure 2:
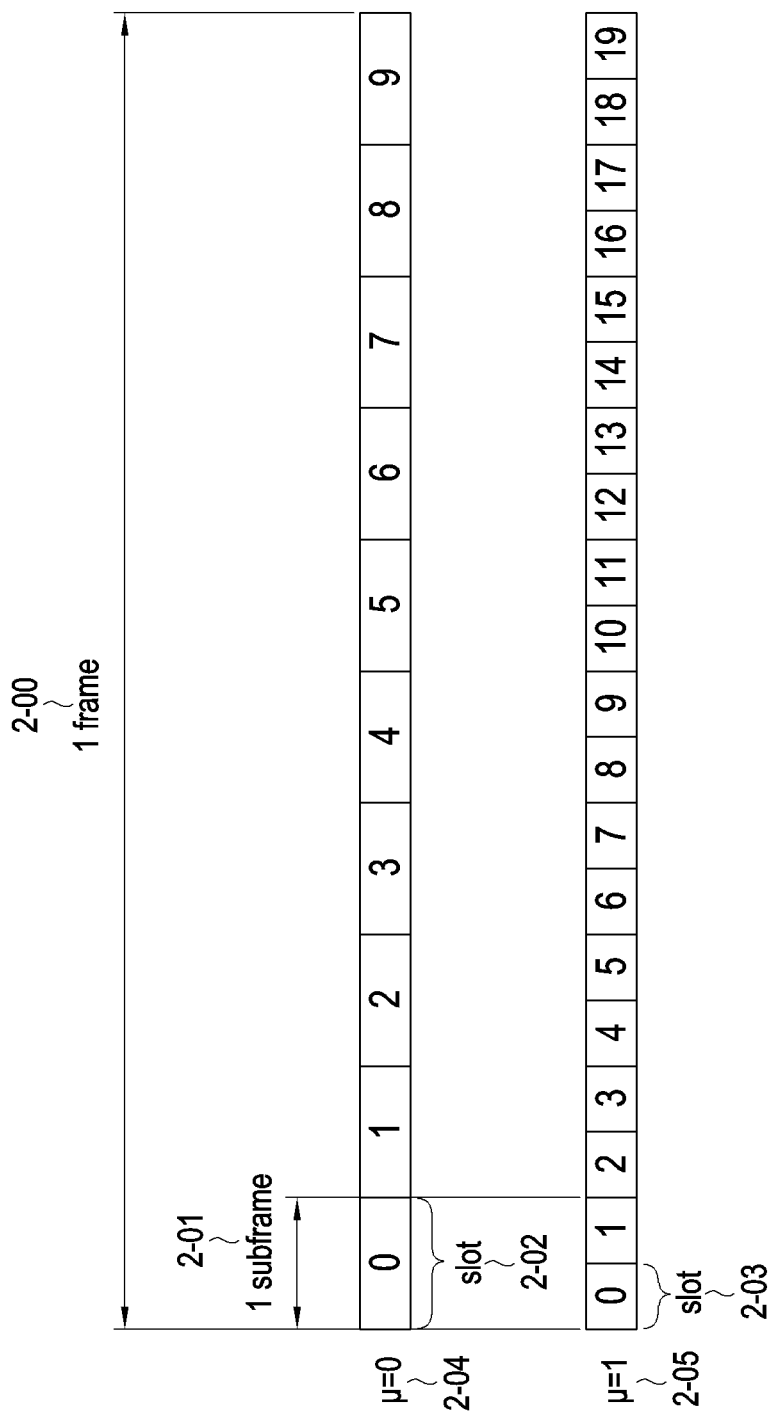
FIG. 2 is a view illustrating a frame, a subframe, and a slot structure in $5^{th}$ generation (5G) communication system according to an embodiment of the disclosure.

FIG. 2 is a view illustrating a frame, a subframe, and a slot structure in 5G communication system according to an embodiment of the disclosure.

Referring to FIG. 2, it illustrates an example structure of a frame 2-00, a subframe 2-01, and a slot 2-02. One frame may have a length of 10 ms. One subframe 1-10 as illustrated in FIG. 1, may have a length of 1 ms, and thus, one frame may consist of a total of 10 subframes. One slot may include 14 OFDM symbols (for example, the number ($N_{symb}^{slot}$) of symbols included in one slot is 14 ($N_{symb}^{slot}=14$)). One subframe 1-10 may include one or more slots, and the number of the slots included in one subframe 1-10 may vary according to μ which is a value set for subcarrier spacing.

FIG. 2 illustrates an example where the value μ set for subcarrier spacing is 0 (μ=0) (2-04) and an example where the value μ set for subcarrier spacing is 1 (μ=1) (2-05). When μ=0 (2-04), the subframe 2-01 may include one slot 2-02 and when μ=1 (2-05), the subframe 2-01 may include two slots, for example, two slots including a slot 2-03. In other words, the number ($N_{slot}^{subframe,\mu}$) of slots included in one subframe may vary and, accordingly, the number ($N_{slot}^{frame,\mu}$) of slots included in one frame may be changed. $N_{slot}^{subframe,\mu}$ and $N_{slot}^{frame,\mu}$ according to the value μ set for subcarrier spacing may be defined as in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the NR communication system, one component carrier (CC) or serving cell may include up to 250 RBs. Therefore, if the UE always receives signals of the entire serving cell bandwidth as does the LTE communication system, the power consumption of the UE may be extreme and, to address such issue, the base station may set one or more bandwidth parts (BWPs) to allow the UE to change the reception region in the cell. In the NR communication system, the base station may set the initial BWP, which is the bandwidth of the control resource set (CORESET) #0 (or common search space (CSS)) in the UE via a master information block (MIB).

Thereafter, the base station may set the initial BWP (or first BWP) of the UE through radio resource control (RRC) signaling and provide information about at least one or more BWP configurations that may be indicated via downlink control information (DCI) in the future. Thereafter, the base station may indicate to the UE what band is to be used by the UE by providing a BWP identifier (ID) via DCI. If the UE does not receive the DCI in the currently allocated BWP for a specific time or longer, the UE may switch back to the default BWP and attempt to receive the DCI in the default BWP.

Figure 3:
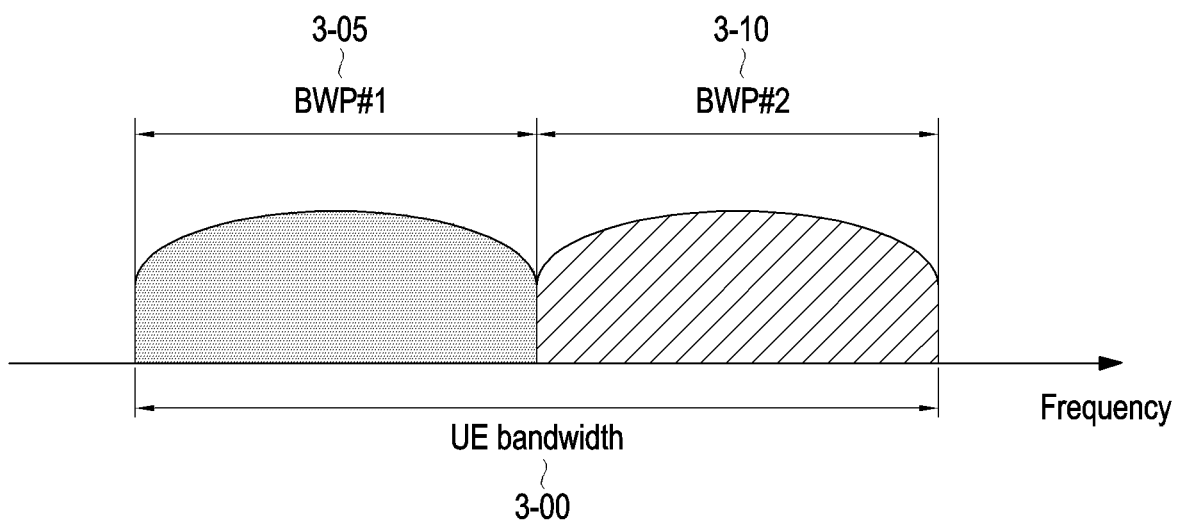
FIG. 3 is a view illustrating a bandwidth part (BWP) configuration in a wireless communication system according to an embodiment of the disclosure.

FIG. 3 is a view illustrating a BWP configuration in a wireless communication system according to an embodiment of the disclosure.

Referring to FIG. 3, the wireless communication system may be, e.g., a 5G communication system. FIG. 3 illustrates an example in which a UE bandwidth 3-00 is divided into two bandwidth parts, e.g., bandwidth part #1 (BWP #1) 3-05 and bandwidth part #2 (BWP #2) 3-10. The base station may configure one or more bandwidth parts in the UE and, for each bandwidth part, information as illustrated in Table 2 below may be configured.

TABLE 2

| | |
|---|---|
| Configuration information 1 | Bandwidth of bandwidth part (number of PRBs constituting bandwidth part) |
| Configuration information 2 | Position of frequency of bandwidth part (such information includes offset from reference point, which may be, e.g., the center frequency of the carrier, synchronization signal, or synchronization signal raster) |
| Configuration information 3 | Numerology of bandwidth part (e.g., subcarrier spacing or cyclic prefix (CP)) |
| Others | |

In addition to the configuration information described in Table 2, various parameters related to the bandwidth part may be configured in the UE. The above-described information may be delivered from the base station to the UE through higher layer signaling, e.g., RRC signaling. At least one of the one or more bandwidth parts configured may be activated. Whether to activate the configured bandwidth part may be transferred from the base station to the UE semi-statically through RRC signaling or dynamically through a medium access control (MAC) control element (CE) or DCI.

The configuration of the bandwidth part supported by the 5G communication system described above may be used for various purposes.

For example, when the bandwidth supported by the UE is smaller than the system bandwidth, the bandwidth supported by the UE may be supported by configuring bandwidth parts. For example, as the frequency position of the bandwidth part in Table 2 is configured in the UE through configuration information 2, the UE may transmit and receive data in a specific frequency position within the system bandwidth.

As another example, for the purpose of supporting different numerology, the base station may configure a plurality of bandwidth parts in the UE. For example, to support both data transmission/reception using a subcarrier spacing of 15 kHz and data transmission/reception using a subcarrier spacing of 30 kHz for any UE, two bandwidth parts may be configured for the UE in which case one of the two bandwidth parts may be configured to use the subcarrier spacing of 15 kHz while the other bandwidth part is configured to use the subcarrier spacing of 30 kHz. The different bandwidth parts may be frequency division multiplexed (FDM) and, when data is to be transmitted/received at a specific subcarrier spacing, the bandwidth part configured to use the corresponding subcarrier spacing may be activated.

As another example, for the purpose of reducing power consumption of the UE, the base station may configure bandwidth parts having different sizes of bandwidths in the UE. For example, when the UE supports a very large bandwidth, e.g., a bandwidth exceeding a threshold bandwidth, such as of 100 MHz, and always transmits and receives data through the corresponding bandwidth, significant power consumption may occur. In particular, it is very inefficient in terms of power consumption for the UE to monitor an unnecessary downlink control channel for a large bandwidth of 100 MHz in a situation where there is no traffic. Therefore, for the purpose of reducing power consumption of the UE, the base station may configure a bandwidth part of a relatively small bandwidth to the UE, e.g., a bandwidth part of 20 MHz, in the UE. In a situation where there is no traffic, the UE may perform a monitoring operation in the 20 MHz bandwidth part, and when data is generated, the UE may transmit and receive data using a bandwidth part of 100 MHz according to an instruction from the base station.

Figure 4:
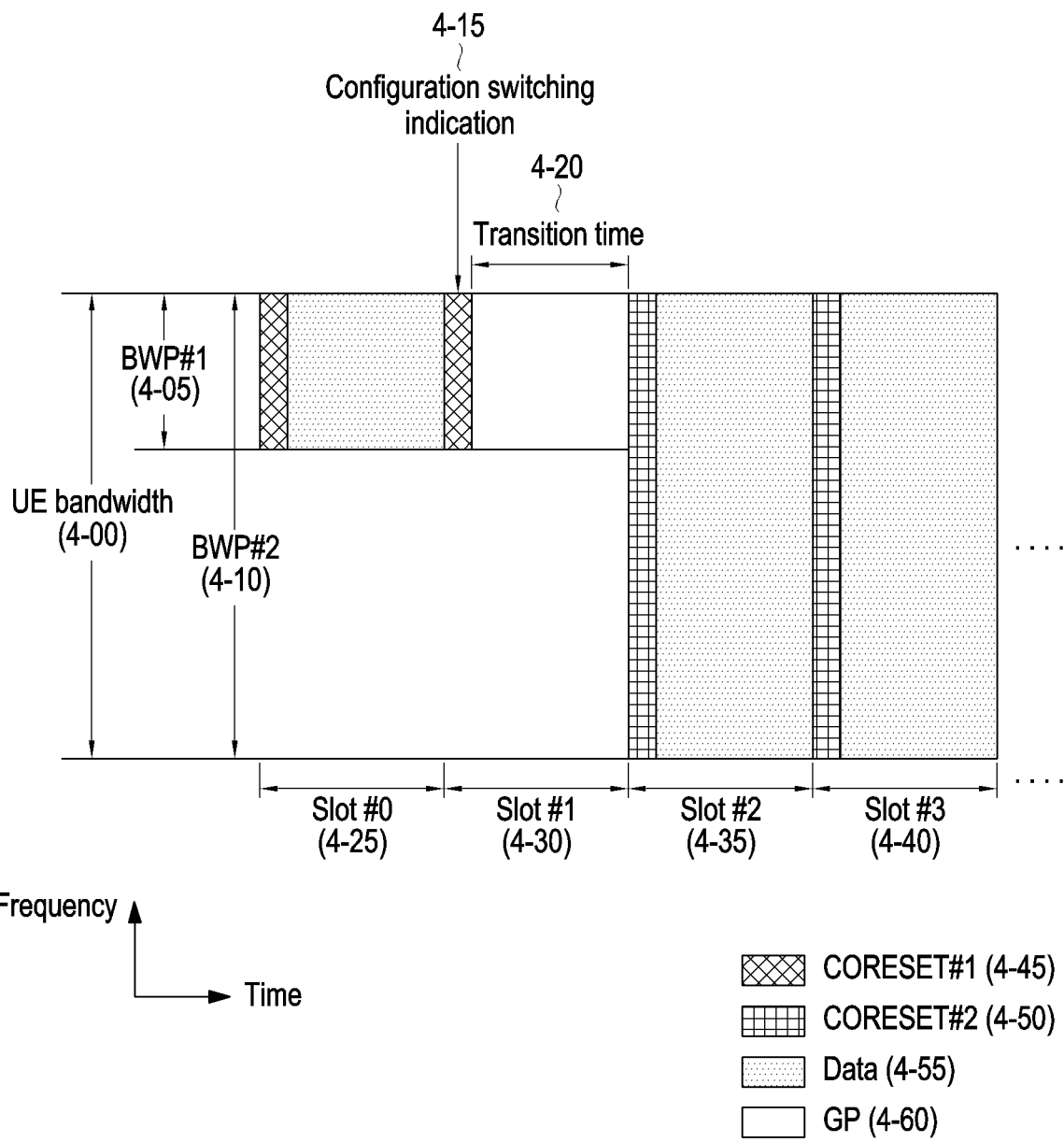
FIG. 4 is a view illustrating a method for indicating and changing a bandwidth part in a wireless communication system according to an embodiment of the disclosure.

FIG. 4 is a view illustrating a method for indicating and changing a bandwidth part in a wireless communication system according to an embodiment of the disclosure.

The operation of indicating and changing a bandwidth part illustrated in FIG. 4 may be, e.g., an operation for dynamically changing the configuration for the bandwidth part.

Referring to FIG. 4, as described above in connection with Table 2, the base station may configure one or more bandwidth parts in the UE and provide the UE with information about, e.g., the bandwidth of the bandwidth part, frequency position of the bandwidth part, and numerology of the bandwidth part, as the configuration for each bandwidth part.

FIG. 4 illustrates an example in which two bandwidth parts, bandwidth part #1 (BPW #1) 4-05 and bandwidth part #2 (BWP #2) 4-10 are configured in the UE bandwidth 4-00 for one UE. One or more bandwidth parts of the configured bandwidths may be activated. FIG. 4 illustrates an example in which one bandwidth part is activated.

Referring to FIG. 4, among the bandwidth parts configured in slot #0 4-25, bandwidth part #1 (BWP #1) 4-05 is activated, and the UE may monitor the physical downlink control channel (PDCCH) in control region #1 (CORESET #1) 4-45 configured in bandwidth part #1 (BWP #1) 4-05 and transmit/receive data 4-55 in bandwidth part #1 (BWP #1) 4-05. The control region in which the UE receives the PDCCH signal may be different depending on which of the configured bandwidth parts is activated, and accordingly, the bandwidth in which the UE monitors the PDCCH may vary.

The base station may additionally transmit an indicator, e.g., a configuration change indicator for changing the configuration of the bandwidth part to the UE. Here, the operation of changing the configuration for the bandwidth part may be regarded as identical to the operation of activating a specific bandwidth part (e.g., changing the activated bandwidth part from bandwidth part A to bandwidth part B). The base station may transmit a configuration change indicator e.g., a configuration switching indicator, to the UE in a specific slot, and the UE may receive a configuration change indicator from the base station. After receiving the configuration change indicator the UE may determine a bandwidth part to be activated by applying the configuration changed according to the configuration change indicator from a specific time and perform a monitoring operation on the PDCCH in the control region configured in the activated bandwidth part.

Referring to FIG. 4, the base station may transmit a configuration change indicator, e.g., a configuration switching indicator 4-15, to instruct to change the activated bandwidth part from the existing bandwidth part #1 (BWP #1) 4-05 to bandwidth part #2 (BWP #2) 4-10 in slot #1 4-30. After receiving the configuration change indicator the UE may activate bandwidth part #2 (BWP #2) 6-10 based on the configuration change indicator. In this case, a transition time 4-20 for changing the bandwidth part may be required, and a time point for activating the activated bandwidth part may be determined according to the required transition time 4-20.

FIG. 4 illustrates an example in which a transition time 4-20 of one slot is required after receiving the configuration change indicator (e.g., configuration switching indicator) 4-15. Data transmission/reception may not be performed during the transition time 4-20 (4-60). Accordingly, bandwidth part #2 (BWP #2) 4-10 may be activated in slot #2 4-35, and the operation of transmitting/receiving control channel signals and data may be performed in the activated bandwidth part #2 (BWP #2) 4-10.

The base station may pre-configure one or more bandwidth parts in the UE by higher layer signaling (e.g., RRC signaling) and may instruct to activate the bandwidth part by a method of mapping the configuration change indicator 4-15 to one of the bandwidth parts preconfigured by the base station. For example, the configuration change indicator that may be implemented with $\log_2 N$ bits may indicate one of N preconfigured bandwidth parts. Table 3 below illustrates an example of indicating configuration information about the bandwidth part using a configuration change indicator implemented with two bits.

TABLE 3

| Value of indicator | Bandwidth part configuration |
| --- | --- |
| 00 | Bandwidth configuration A set by higher layer signaling |
| 01 | Bandwidth configuration B set by higher layer signaling |
| 10 | Bandwidth configuration C set by higher layer signaling |
| 11 | Bandwidth configuration D set by higher layer signaling |

The configuration change indicator 4-15 for the bandwidth part as described above in connection with FIG. 4 may be transferred from the base station to the UE in the form of medium access control (MAC) control element (CE) signaling or L1 signaling (e.g., common DCI, group-common DCI, or UE-specific DCI). What time point bandwidth part activation is to be applied from according to the configuration change indicator 4-15 for the bandwidth part as described above in connection with FIG. 4 may be determined as follows.

What time to apply the bandwidth part activation may be set to a predefined value (e.g., applies it N (≥1) slots after the configuration change indicator is received) (method 1), be set in the UE by the base station via higher layer signaling (e.g., RRC signaling) (method 2), or be included and transmitted in the configuration change indicator 4-15 (method 3). Alternatively, it may be determined by a combination of the above-described methods, e.g., methods 1 to 3. After receiving the configuration change indicator 4-15 for the The control region in the 5G communication system described above may be configured in the UE by the base station through higher layer signaling (e.g., system information, master information block (MIB), or radio resource control (RRC) signaling). Configuring a control region in a UE means providing the UE with such information as the identifier (ID) of the control region, the frequency position of the control region, and symbol length of the control region. For example, the information shown in Table 4 may be provided.

TABLE 4

| | |
|---|---|
| ControlResourceSet ::= | SEQUENCE { |
| -- Corrseponds to L1 parametr 'CORESET-ID' | |
| controlResourceSetId | ControlResourceSetId, |
| [control region identity] | |
| frequencyDomainResources | BIT STRING (SIZE (45)), |
| [frequency domain resource allocation information] | |
| duration | INTEGER (1..maxCoReSetDuration), |
| [time domain resource allocation information] | |
| cce-REG-MappingType | CHOICE { |
| [CCE-to-REG mapping scheme] | |
| interleaved | SEQUENCE { |
| reg-BundleSize | ENUMERATED {n2, n3, n6}, |
| precoderGranularity | ENUMERATED {sameAsREG-bundle, allContiguousRBs}, |
| interleaverSize | ENUMERATED {n2, n3, n6}, |
| shiftIndex | INTEGER(0..maxNrofPhysicalResourceBlocks−1) |
| [interleaver shift] | |
| }, | |
| nonInterleaved | NULL |
| }, | |
| tci-StatesPDCCH | SEQUENCE(SIZE (1..maxNrofTCI-StatesPDCCH)) OF TCI-StateId OPTIONAL, |
| [QCL configuraiton information] | |
| tci-PresentInDCI | ENUMERATED {enabled} |
| } | | bandwidth part, the UE may apply the changed configuration from the time obtained by any one of the above-described methods or a combination thereof.

A downlink control channel in the 5G communication system is described below with reference to the drawings.

Figure 5:
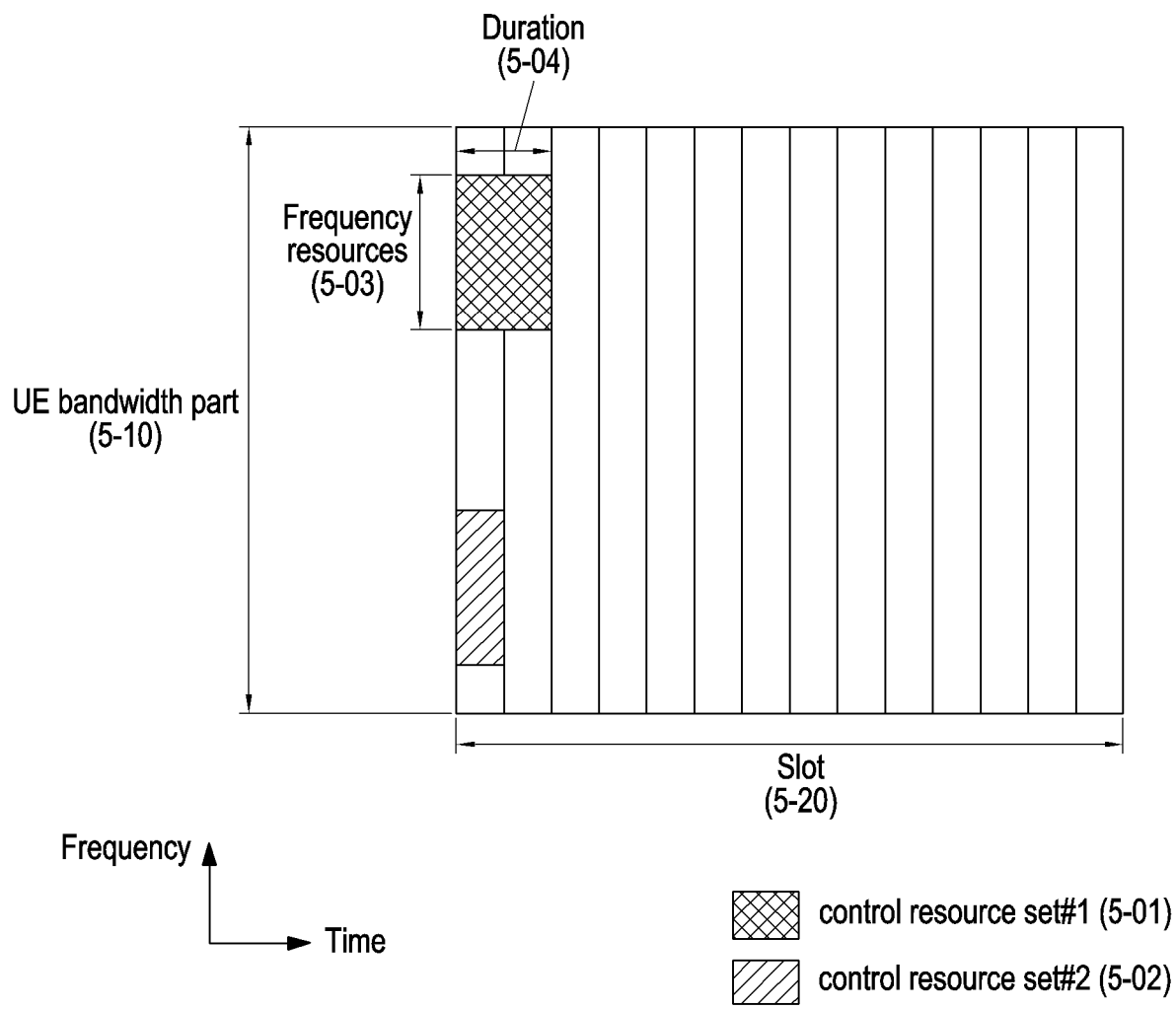
FIG. 5 is a view illustrating a method configuration of a control region of a downlink control channel in a wireless communication system according to an embodiment of the disclosure.

FIG. 5 is a view illustrating a method configuration of a control region of a downlink control channel in a wireless communication system according to an embodiment of the disclosure.

Referring to FIG. 5, an example configuration of a control region of a downlink control channel in the wireless communication system may be an example configuration of a control region, e.g., CORESET, through which a downlink control channel is transmitted in the 5G communication system. FIG. 5 illustrates an example in which the UE's bandwidth part 5-10 is configured on the frequency axis, and two control regions (control region #1 (CORESET #1) 5-01 and control region #2 (CORESET #2) 5-02) are configured in one slot 5-20 on the time axis. The control regions 5-01 and 5-02 may be configured in a specific frequency resource 5-03 within the entire UE bandwidth part 5-10 on the frequency axis. The control regions 5-01 and 5-02 may be configured with one or more OFDM symbols on the time axis and may be defined as a control region length, e.g., CORESET duration 5-04. In the example of FIG. 5, control region #1 5-01 is configured as a control region length of two symbols, and control region #2 5-02 is configured as a control region length of one symbol.

In Table 4, the tci-StatesPDCCH field indicates the QCL configuration information. The tci-StatesPDCCH (simply referred to as a transmission configuration indicator (TCI) state) field may include one or more synchronization signal (Ss)/physical broadcast channel (PBCH) blocks quasi co-located (QCLed) with the demodulation reference signal (DMRS) transmitted in the corresponding control region or the indexes of channel state information reference signals (CSI-RSs). In Table 4, the controlResourceSetId field indicates the control region, e.g., the control resource set ID, the frequencyDomainResources field indicates the resource allocation information in the frequency domain, duration indicates the resource allocation information in the time domain, the cce-REG-MappingType field indicates a method for mapping control channel elements (CCEs) to resource element groups (REGs), the reg-BundleSize field indicates the size of the REG bundle, the interleaverSize field indicates the size of the interleaver, and shiftIndex indicates the interleaver shift. In the wireless communication system, one or more different antenna ports (which may be replaced with or one or more channels, or one or more signals or combinations thereof. Hereinafter, different antenna ports are described as an example for convenience purposes) may be associated with each other by the QCL configuration illustrated in Table A-1 below.

TABLE A-1

```
QCL-Info ::=            SEQUENCE {
    cell                ServCellIndex [Index of serving cell where QCL reference RS is
transmitted]
    bwp-Id              BWP-Id [Index of bandwidth part where QCL reference RS is
transmitted]
    referenceSignal             CHOICE { [Indicator indicating One of CSI-RS or SS/PBCH
block as QCL reference]
        csi-rs          NZP-CSI-RS-ResourceId,
        ssb             SSB-Index
    },
    qcl-Type            ENUMERATED {typeA, typeB, typeC, typeD} [QCL type
indicator],
    ...
}
```

Specifically, the QCL configuration may associate two different antenna ports with each other in the relationship between (QCL) target antenna port and (QCL) reference antenna port. The UE may apply (or assume) all or some of the statistical characteristics (e.g., Doppler shift, Doppler spread, average delay, delay spread, average gain, spatial Rx (or Tx) parameters or such channel large scale parameters or the UE's Rx space filter coefficient or Tx space filter coefficient) measured at the reference antenna port upon the target antenna port reception. The target antenna port means an antenna port that transmits the channel or signal set by higher layer configuration including the QCL configuration or an antenna port that transmits the channel or signal to which the TCI state indicating the QCL configuration is applied. The reference antenna port means an antenna port that transmits the channel or signal indicated (specified) by the referenceSignal parameter in the QCL configuration. In Table A-1, the referenceSignal field may be an indicator indicating one of a channel state information reference signal (CSI-RS) or an SS/PBCH block as a QCL reference RS.

Specifically, the statistical characteristics of the channel (indicated by the parameter qcl-Type in the Table A-1 QCL configuration) defined by the QCL configuration may be classified by QCL type as follows.

width of the target antenna port is broader than the transmission bandwidth of the reference antenna port on both the frequency axis and the time axis, and the transmission time (or duration) of the target antenna port is longer than the transmission time (or duration) of the reference antenna port on both the frequency axis and the time axis) so that all measurable statistical characteristics may be referred to on the frequency and time axes.

QCL-TypeB is the QCL type that is used when the bandwidth of the target antenna port is sufficient to measure measurable statistical characteristics, e.g., Doppler shift and Doppler spread.

QCL-TypeC is the QCL type that is used when the bandwidth and transmission duration of the target antenna port are insufficient to measure second-order statistics, e.g., Doppler spread and delay spread, so that only first-order statistics, e.g., Doppler shift and average delay, may be referenced.

QCL-TypeD is the QCL type that is set when the spatial reception filter values used when receiving through the reference antenna port may be used when receiving through the target antenna port.

The base station may configure or indicate up to two QCL configurations in one target antenna port via the TCI state configurations as shown in Table A-2 below.

TABLE A-2

```
TCI-State ::=    SEQUENCE {
    tci-StateId     TCI-StateId,[TCI state indicator]
    qcl-Type1       QCL-Info, [Configuration of first QCL for target antenna port
where the corresponding TCI state is applied]
    qcl-Type2       QCL-Info [Configuration of second QCL for target antenna port
where the corresponding TCI state is applied]                           OPTIONAL, -
- Need R
    ...
}
```

'QCL-TypeA', {Doppler shift, Doppler spread, average delay, delay spread}
'QCL-TypeB', {Doppler shift, Doppler spread}
'QCL-TypeC', {Doppler shift, average delay}
'QCL-TypeD', {Spatial Rx parameter}

In this case, QCL types are not limited to the above four types, but all possible combinations are not listed in order not to make the subject matter of description unclear.

QCL-TypeA is the QCL type used when the bandwidth and transmission duration of the target antenna port are sufficient as compared with the reference antenna port (e.g., when the number of target antenna ports is larger than the number of reference antenna port samples on both the frequency axis and the time axis, the transmission band- In Table A-2, the tci-StateId field may include a TCI state indicator, and the qcl-Type1 field indicates the first QCL configuration for the target antenna port to which the corresponding TCI state is applied, and the qcl-Type2 field indicates the second QCL configuration for the target antenna port to which the corresponding TCI state is applied. Of the two QCL configurations included in one TCI state configuration, the first QCL configuration may be set to one of QCL-TypeA, QCL-TypeB, and QCL-TypeC. In this case, the configurable QCL type is specified according to the types of the target antenna port and the reference antenna port, which is described below. Of the two QCL configurations included in the one TCI state configuration, the second QCL configuration may be set to QCL-TypeD and may be omitted in some cases. However, this is merely an embodiment of the disclosure, and the first QCL configuration and the second QCL configuration may be set to at least one of QCL-type A to QCL-type D in some cases.

Tables 4-1 to 4-5 below show effective TCI state configurations according to target antenna port types.

Table 4-1 shows the effective TCI state configuration when the target antenna port is for CSI-RS for tracking (TRS). TRS refers to a non-zero-power (NZP) CSI-RS in which no repetition parameter is set and trs-Info is set to true among CSI-RSs. Configuration No. 3 in Table 4-1 may be used for aperiodic TRS.

TABLE 4-1 the effective TCI state configuration when the target antenna port is for CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 4-2 shows the effective TCI state configuration when the target antenna port is for CSI-RS for CSI. The CSI-RS for CSI refers to an NZP CSI-RS in which no repetition parameter is set and trs-Info is not set to true among the CSI-RSs.

TABLE 4-2 the effective TCI state configuration when the target antenna port is for CSI-RS for CSI

| Valid TCI state Configuration | DL RS 1 | qd-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 4-3 shows the effective TCI state configuration when the target antenna port is for CSI-RS for beam management (BM) (e.g., CSI-RS for BM may have the same meaning as CSI-RS for L1 RSRP reporting). The CSI-RS for BM refers to an NZP CSI-RS in which a repetition parameter is set and has a value of On or Off, and trs-Info is not set to true among the CSI-RSs.

TABLE 4-3 the effective TCI state configuration when the target antenna port is for CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 4-4 shows the effective TCI state configuration when the target antenna port is for the physical downlink control channel (PDCCH) de-modulation reference signal (DMRS).

TABLE 4-4 the effective TCI state configuration when the target antenna port is for PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 4-5 shows the effective TCI state configuration when the target antenna port is for the physical downlink shared channel (PDSCH) DMRS.

TABLE 4-5 the effective TCI state configuration when the target antenna port is for PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method according to Tables 4-1 to 4-5 above is to set and operate the target antenna port and reference antenna port for each step as "SSB"→"TRS"→"CSI-RS for CSI, or CSI-RS for BM, or PDCCH DMRS, or PDSCH DMRS". This may help the UE's reception operation, with the statistical characteristics measurable from the synchronization signal block (SSB) and TRS associated with the antenna ports.

Methods for allocating time and frequency resources for data transmission in the NR communication system are described below.

In the NR communication system, the following frequency domain resource allocation (FD-RA) methods may be provided in addition to the frequency-axis resource candidate allocation through BWP indication.

Figure 6:
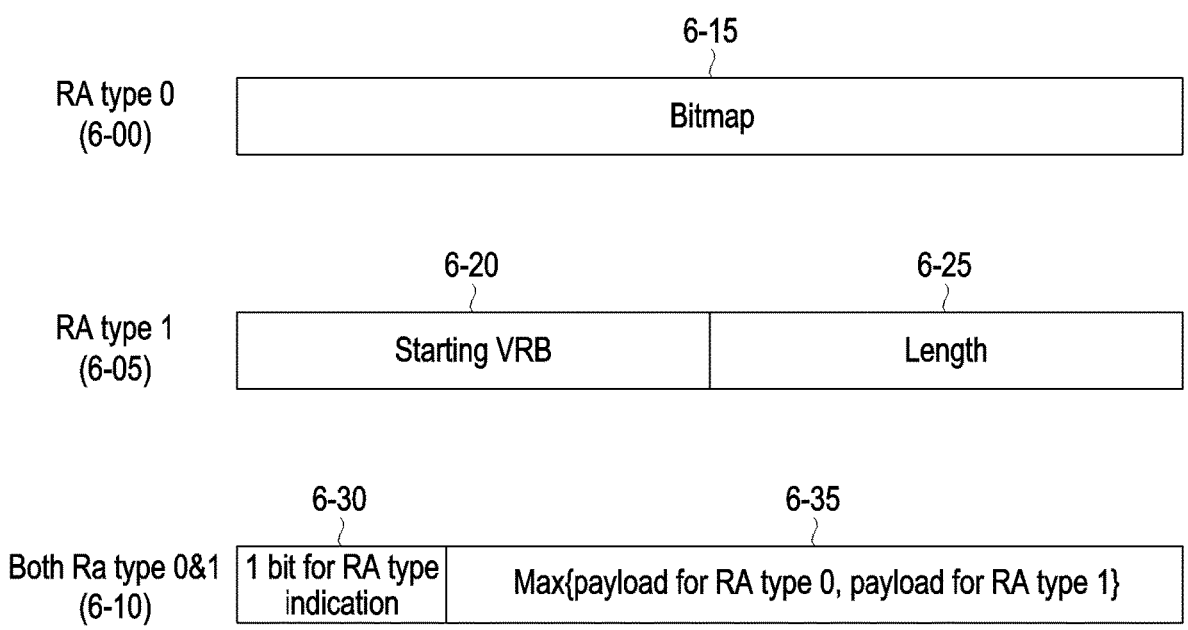
FIG. 6 is a view illustrating a method of allocating a resource on a physical downlink shared channel (PDSCH) frequency axis in a wireless communication system according to an embodiment of the disclosure.

FIG. 6 is a view illustrating a method of allocating a resource on a PDSCH frequency axis in a wireless communication system according to an embodiment of the disclosure.

FIG. 6 illustrates three frequency-axis resource allocation methods of type 0 and type 1 configurable via the higher layer, and dynamic change, e.g., dynamic switching.

Referring to FIG. 6, the frequency axis resource allocation method according to type 0 is indicated as RA type 0 (6-00), the frequency axis resource allocation method according to type 1 is indicated as RA type 0 (6-05), and the frequency axis resource allocation method according to the dynamic change is indicated as Both Ra type 0 & 1 (6-10).

Referring to FIG. 6, if the UE is configured to use only resource type 0 through higher layer signaling (6-00), some downlink control information (DCI) for allocating a PDSCH to the UE has a bitmap including NRBG bits. The conditions for this are described below. In this case, NRBG means the number of resource block groups (RBGs) determined as illustrated in Table 5 below according to the BWP size allocated by the BWP indicator and the higher layer parameter rbg-Size, and data is transmitted in the RBG in which the value of the corresponding bit in the bitmap is expressed as 1.

TABLE 5

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only resource type 1 through higher layer signaling (6-05), some DCIs that allocate a PDSCH to the corresponding UE has frequency axis resource allocation information including $\lceil \log_2(N_{RB}^{DL,BWP}(N_{RB}^{DL,BWP}+1)/2) \rceil$ bits. The conditions for this are described below. By so doing, the base station may configure a starting virtual resource block (VRB) 6-20 and a length 6-25 of the frequency axis resources consecutively allocated therefrom.

If the UE is configured to use both resource type 0 and resource type 1 through higher layer signaling (6-10), some DCIs that allocate a PDSCH to the UE have frequency axis resource allocation information including bits of the larger (6-35) of the payload 6-15 for setting resource type 0 and the payloads 6-20 and 6-25 for setting resource type 1. The conditions for this are described below. In this case, one bit (e.g., a most significant byte (MSB)) may be added to a specific part, e.g., the foremost part, of the frequency axis resource allocation information in the DCI and, when the corresponding bit is 0, this may indicate that resource type 0 is used while the corresponding bit is 1, it may indicate that resource type 1 is used.

Figure 7:
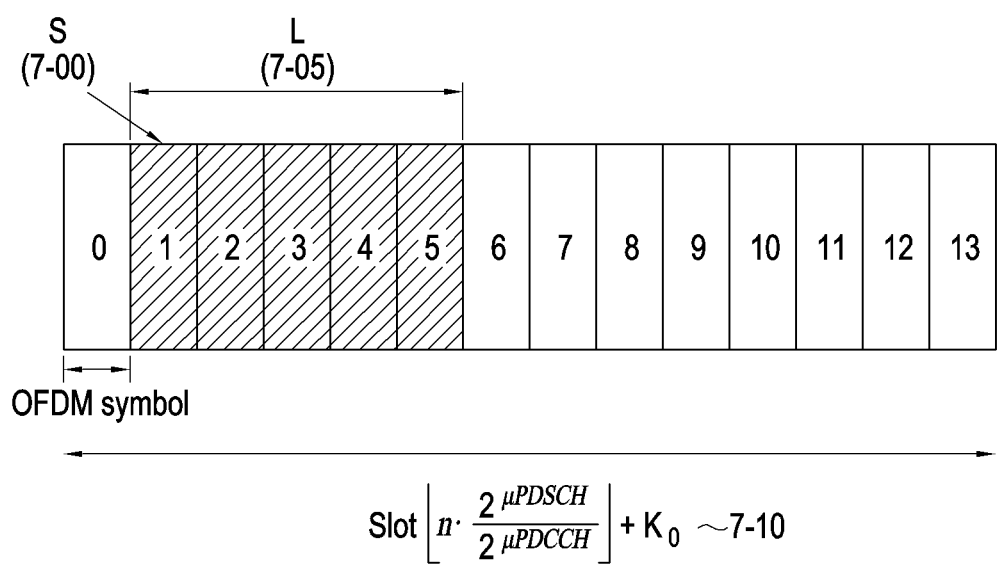
FIG. 7 is a view illustrating a method of allocating a resource on a PDSCH time axis in a wireless communication system according to an embodiment of the disclosure.

FIG. 7 is a view illustrating a method of allocating a resource on a PDSCH time axis in a wireless communication system according to an embodiment of the disclosure.

FIG. 7 illustrates an example of time axis resource allocation for a PDSCH in an NR communication system.

Referring to FIG. 7, the base station may indicate the position of the PDSCH resource on the time axis according to the subcarrier spacing (SCS) of the data channel and the control channel configured using the higher layer (where, the subcarrier spacing of the data channel is $\mu_{PDSCH}$, and the subcarrier spacing of the control channel is $\mu_{PDCCH}$), scheduling offset ($K_0$), and the OFDM symbol start position 7-00 and length 7-05 in one slot dynamically indicated via DCI.

Figure 8:
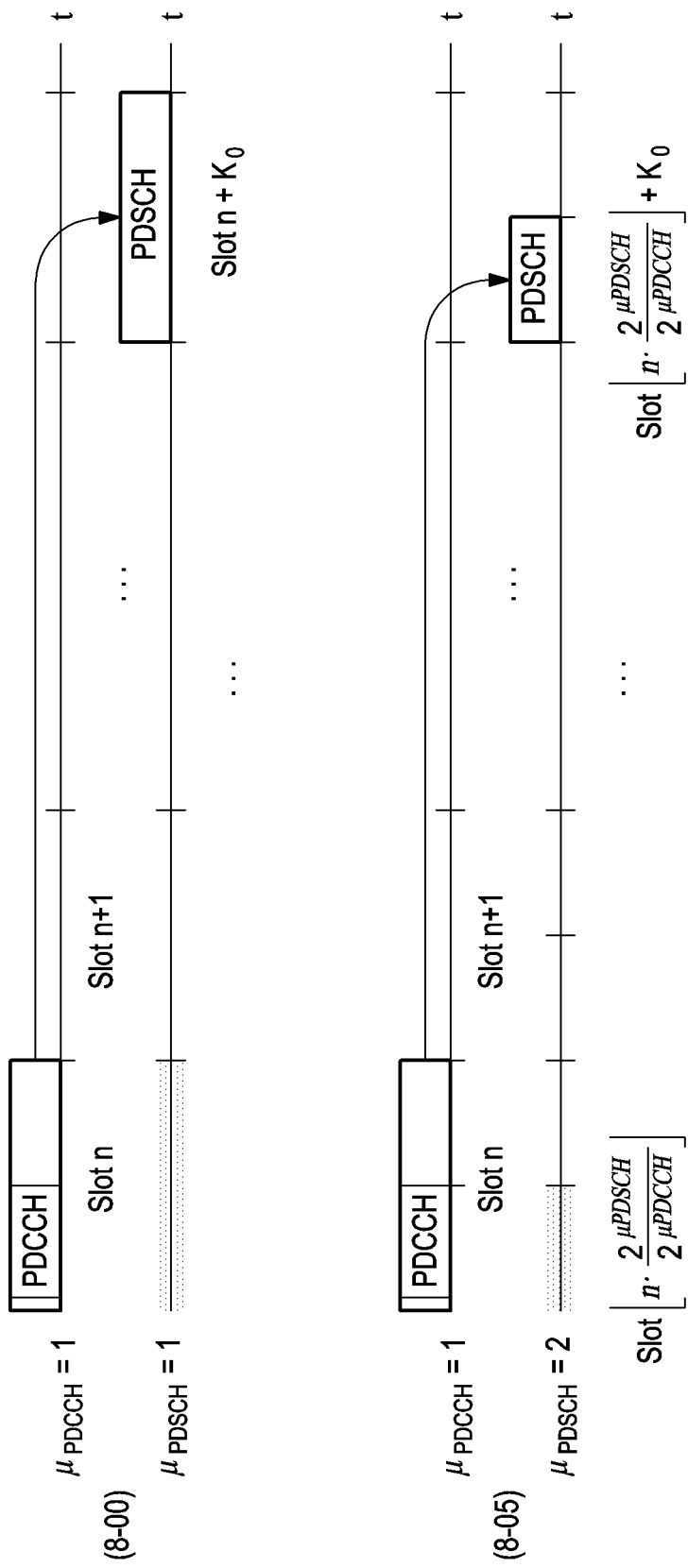
FIG. 8 is a view illustrating a method of allocating a resource on a time axis according to subcarrier spacings of a data channel and a control channel in a wireless communication system according to an embodiment of the disclosure.

FIG. 8 is a view illustrating a method of allocating a resource on a time axis according to subcarrier spacings of a data channel and a control channel in a wireless communication system according to an embodiment of the disclosure.

Referring to FIG. 8, it may be identified that when the subcarrier spacings of the data channel and the control channel are the same (8-00), e.g., when $\mu_{PDSCH}=\mu_{PDCCH}$ (8-00), the slot number for the data channel is identical to the slot number for the control channel, so that the base station and the UE generates the scheduling offset to fit a predetermined slot offset $K_0$. In contrast, it may be identified that when the subcarrier spacings of the data channel and the control channel differ from each other (8-05), e.g., when $\mu_{PDSCH}\neq\mu_{PDCCH}$ (8-05), the slot number for the data channel differs from the slot number for the control channel, so that the base station and the UE generate the scheduling offset to fit a predetermined slot offset $K_0$, with respect to the subcarrier spacing of the PDCCH.

The NR communication system provides various types of DCI formats as illustrated in Table 6 below according to the purpose for efficient control channel signal reception by the UE.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 0_0 or DCI format 0_1 to allocate, e.g., schedule, a PDSCH to one cell.

When DCI format 0_1 is transmitted along with the CRC scrambled by the cell radio network temporary identifier (C-RNTI), configured scheduling RNTI (CS-RNTI) or a new RNTI (new-RNTI), DCI format 0_1 includes, at least, the following information, e.g., information fields.

The Identifier for DCI formats (1 bit) field: the Identifier for DCI formats field is the DCI format indicator and may always be set to 1.

frequency domain resource assignment (NRBG bits or $\lceil \log_2(N_{RB}^{DL,BWP}(N_{RB}^{DL,BWP}+1)/2) \rceil$ bits) field: the frequency domain resource assignment field indicates frequency axis resource assignment and, when DCI format 1_0 is monitored in a UE specific search space, $N_{RB}^{DL,BWP}$ is the size of the active DL BWP. When DCI format 1_0 is not monitored in a UE specific search space, $N_{RB}^{DL,BWP}$ is the size of the initial DL BWP. NRBG is the number of the resource block group. For a method, refer to the frequency axis resource allocation.

Time domain resource assignment (0 to 4 bits) field: the time domain resource assignment field indicates time axis resource assignment according to the above description.

VRB-to-PRB mapping (1 bit) field: if the value of the VRB-to-PRB mapping field is 0, it indicates non-interleaved VRP-to-PRB mapping and, if the value of the VRB-to-PRB mapping field is 1, it indicates interleaved VRP-to-PRB mapping.

Modulation and coding scheme (5 bits) field: the modulation and coding scheme field indicates the modulation order and coding rate used for PDSCH transmission.

New data indicator (1 bit) field: the new data indicator field indicates whether the PDSCH is initial transmission or retransmission depending on whether it is toggled.

Redundancy version (2 bits) field: the redundancy version field indicates the redundancy version used for PDSCH transmission.

HARQ process number (4 bits) field: the HARQ process number field indicates the hybrid automatic repeat request (HARQ) process number used for PDSCH transmission.

Downlink assignment index (2 bits) field: the downlink assignment index field is the DAI indicator.

TPC command for scheduled PUCCH (2 bits) field: the TPC command for scheduled PUCCH field is the PUCCH power control indicator.

PUCCH resource indicator (3 bits) field: the PUCCH resource indicator field is the PUCCH resource indicator and indicates one of eight resources configured through a higher layer.

PDSCH-to-HARQ feedback timing indicator (3 bits) field: the PDSCH-to-HARQ feedback timing indicator field is the HARQ feedback timing indicator and indicates one of eight feedback timing offsets set through a higher layer.

When DCI format 1_1 is transmitted along with the CRC scrambled by the cell radio network temporary identifier (C-RNTI), configured scheduling RNTI (CS-RNTI) or a new-RNTI, DCI format 1_1 includes, at least, the following information, e.g., information fields.

The Identifier for DCI formats (1 bit) field: the Identifier for DCI formats field is the DCI format indicator and may always be set to 1.

Carrier indicator (0 or 3 bits) field: the carrier indicator field indicates the component carrier (CC) (or cell) through which the PDSCH allocated by the corresponding DCI is transmitted.

Bandwidth part indicator (0 or 1 or 2 bits) field: the bandwidth part indicator field indicates the BWP through which the PDSCH allocated by the corresponding DCI is transmitted.

Frequency domain resource assignment (payload is determined according to the frequency axis resource assignment) field: the frequency domain resource assignment field indicates frequency axis resource assignment, and $N_{RB}^{DL,BWP}$ is the size of the active DL BWP. Since the method has been described in the frequency axis resource allocation, no further description thereof is given below.

Time domain resource assignment (0 to 4 bits) field: the time domain resource assignment field indicates time axis resource assignment according to the above description.

VRB-to-PRB mapping (0 or 1 bit) field: if the value of the VRB-to-PRB mapping field is 0, it indicates non-interleaved VRP-to-PRB mapping and, if the value of the VRB-to-PRB mapping field is 1, it indicates interleaved VRP-to-PRB mapping. When the frequency axis resource allocation is set to resource type 0, the number of bits in the VRB-to-PRB mapping field is 0.

PRB bundling size indicator (0 or 1 bit) field: the number of bits in the PRB bundling size indicator field is 0 if the higher layer parameter prb-BundlingType is not set or the value of the prb-BundlingType is set to 'static,' and the number of bits in the PRB bundling size indicator is 1 if the value of the prb-BundlingType is set to 'dynamic.'

Rate matching indicator (0 or 1 or 2 bits) field: the rate matching indicator field indicates the rate matching pattern.

ZP CSI-RS trigger (0 or 1 or 2 bits) field: the ZP CSI-RS trigger field is the indicator for triggering aperiodic ZP CSI-RS.

For transport block 1:

Modulation and coding scheme (5 bits) field: the modulation and coding scheme field indicates the modulation order and coding rate used for PDSCH transmission.

New data indicator (1 bit) field: the new data indicator field indicates whether the PDSCH is initial transmission or retransmission depending on whether it is toggled.

Redundancy version (2 bits) field: the redundancy version field indicates the redundancy version used for PDSCH transmission.

For transport block 2:

Modulation and coding scheme (5 bits) field: the modulation and coding scheme field indicates the modulation order and coding rate used for PDSCH transmission.

New data indicator (1 bit) field: the new data indicator field indicates whether the PDSCH is initial transmission or retransmission depending on whether it is toggled.

Redundancy version (2 bits) field: the redundancy version field indicates the redundancy version used for PDSCH transmission.

HARQ process number (4 bits) field: the HARQ process number field indicates the HARQ process number used for PDSCH transmission.

Downlink assignment index (0 or 2 or 4 bits) field: the downlink assignment index field is the DAI indicator.

TPC command for scheduled PUCCH (2 bits) field: the TPC command for scheduled PUCCH field is the PUCCH power control indicator.

PUCCH resource indicator (3 bits) field: the PUCCH resource indicator field is the PUCCH resource indicator and indicates one of eight resources configured through a higher layer.

PDSCH-to-HARQ feedback timing indicator (3 bits) field: the PDSCH-to-HARQ feedback timing indicator field is the HARQ feedback timing indicator and indicates one of eight feedback timing offsets set through a higher layer.

Antenna port (4 or 5 or 6 bits) field: the antenna port field indicates the DMRS port and the code division multiplexing (CDM) group without data.

Transmission configuration indication (0 or 3 bits) field: the transmission configuration indication field indicates the TCI indicator.

SRS request (2 or 3 bits) field: the SRS request field indicates the sounding reference signal (SRS) transmission request indicator.

CBG transmission information (0 or 2 or 4 or 6 or 8 bits) field: the CBG transmission information field is the indicator indicating whether to transmit code block groups in the allocated PDSCH. When the value of the CBG transmission information field is 0, it means that the corresponding code-block-group (CBG) is not transmitted and, when the value of the CBG transmission information field is 1, it means that the corresponding CBG is transmitted.

CBG flushing out information (0 or 1 bit) field: the CBG flushing out information field is the indicator indicating whether previous CBGs are contaminated. If the value of the CBG flushing out information field is 0, it means that the previous CBGs may have been contaminated and, if the value of the CBG flushing out information field is 1, it means that the previous CBGs may be used (combinable) when a retransmission is received.

DMRS sequence initialization (0 or 1 bit) field: the DMRS sequence initialization field is the DMRS scrambling ID selection indicator.

The number of DCIs with different sizes that the UE may receive per slot in the corresponding cell is up to 4. The number of DCIs with different sizes scrambled with a cell radio network temporary identifier (C-RNTI) that the UE may receive per slot in the corresponding cell is up to 3.

Here, the antenna port indication may be indicated through Table 7 to Table 10 below.

TABLE 7

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 8

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1, enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 9

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |

TABLE 9-continued

Antenna port(s) (1000 + DMRS port), dmrs-Type = 2, maxLength = 1

| | One codeword: Codeword 0 enabled, Codeword 1 disabled | | Two codewords: Codeword 0 enabled, Codeword 1 enabled | | |
|---|---|---|---|---|---|
| Value | Number of DMRS CDM group(s) without data | DMRS port(s) | Value | Number of DMRS CDM group(s) without data | DMRS port(s) |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24-31 | Reserved | Reserved | | | |

TABLE 10

Antenna port(s) (1000 + DMRS port), dmrs-Type = 2, maxLength = 2

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |

TABLE 10-continued

Antenna port(s) (1000 + DMRS port), dmrs-Type = 2, maxLength = 2

| | One codeword:<br>Codeword 0 enabled,<br>Codeword 1 disabled | | | Two Codewords:<br>Codeword 0 enabled,<br>Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

Table 7 is a table used when dmrs-type is 1 and maxLength is indicated as 1. Table 8 is a table used when dmrs-Type=1 and maxLength=2. When dmrs-type=2 and maxLength=1, Table 9 is used and, when drms-tpye is 2 and maxLength is 2, Table 10 is used to indicate the port of the DMRS as used. In Table 7 to Table 10, the numbers 1, 2, and 3 indicated by the number of DMRS CDM group(s) without data are respectively CDMR groups {0}, {0, 1}, and {0, 1, 2}, respectively. The DMRS port(s) is a sequence of indexes of ports to be used. The antenna port is indicated as DMRS port+1000. The CDM group of the DMRS is connected to the method for generating the DMRS sequence and the antenna port as shown in Table 11 and Table 12. Table 11 shows parameters when dmrs-type=1 is used, and Table 12 shows parameters when dmrs-type=2 is used.

TABLE 11

Parameters for PDSCH DMRS dmrs-type = 1

| | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 12

Parameters for PDSCH DMRS dmrs-type = 2

| | | | $w_f(k')$ | | $w_t(l')$ | |
|---|---|---|---|---|---|---|
| p | λ | Δ | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |

TABLE 12-continued

Parameters for PDSCH DMRS dmrs-type = 2

| | | | $w_f(k')$ | | $w_t(l')$ | |
|---|---|---|---|---|---|---|
| p | λ | Δ | k' = 0 | k' = 1 | l' = 0 | l' = 1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The sequence of the DMRS according to each parameter is determined by the following Equation 1.

$$a_{k,l}^{(p,\mu)} = \beta_{PDSCH}^{DMRS} w_f(k') w_t(l') r(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Equation 1

In Table 7 and Table 8, when only one codeword is enabled, lines 2, 9, 10, 11, and 30 are used only for single user multiple input multiple output (MIMO). In other words, in this case, the UE may not perform a multi-user MIMO reception operation, such as canceling, nulling, or whitening multi-user interference, without assuming that other UEs are co-scheduled.

In Table 9 and Table 10, when only one codeword is enabled, lines 2, 10, and 23 are used only for single user MIMO. In other words, in this case, the UE may not perform a multi-user MIMO reception operation, such as canceling, nulling, or whitening multi-user interference without assuming that other UEs are co-scheduled.

Figure 9:
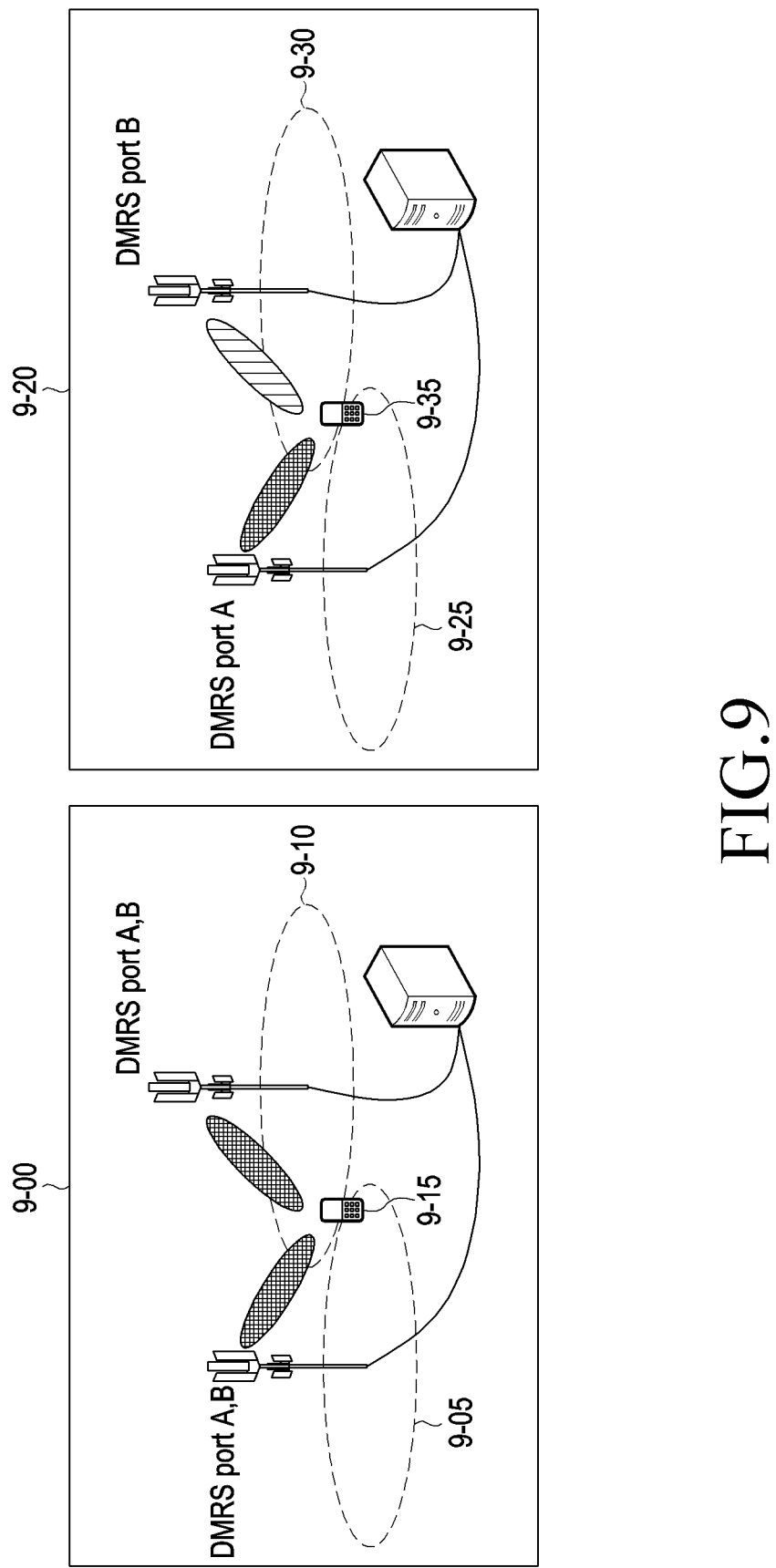
FIG. 9 is a view illustrating a cooperative communication antenna port configuration according to an embodiment of the disclosure.

FIG. 9 is a view illustrating a cooperative communication antenna port configuration according to an embodiment of the disclosure.

FIG. 9 illustrates an example of radio resource allocation per transmission and reception point (TRP) according to the context and a joint transmission (JT) scheme.

Referring to FIG. 9, 9-00 shows an example of coherent joint transmission (C-JT) supporting coherent precoding between each cell, TRP, and/or beam.

In C-JT, the same data (e.g., PDSCH signal) is transmitted in TRP A 9-05 and TRP B 9-10, and joint precoding is performed in multiple TRPs. This may mean that in TRP A 9-05 and TRP B 9-10, the same DMRS ports (e.g., DMRS ports A and B in both the TRPs) are used for the same PDSCH signal transmission. In this case, the UE 9-15 may receive one DCI format for receiving one PDSCH signal that is demodulated based on the DMRS transmitted through DMRS ports A and B.

Referring to FIG. 9, 9-20 shows an example of non-coherent joint transmission (NC-JT) supporting non0coherent precoding between each cell, TRP, and/or beam. In the case of NC-JT, different PDSCH signals are transmitted in each cell, TRP, and/or beam, and individual precoding may be applied to each PDSCH signal. This may mean that TRP A 9-25 and TRP B 9-30 use different DMRS ports (e.g., DMRS port A in TRP A and DMRS port B in TRP B) for different PDSCH signal transmissions. In this case, the UE 9-35 may receive two DCI formats for receiving PDSCH signal A which is demodulated based on the DMRS transmitted via DMRS port A and PDSCH signal B which is demodulated based on the DMRS transmitted via DMRS port B.

To support NC-JT simultaneously providing one UE with data at two or more transmission points, it may be needed to allocate PDSCHs which are transmitted from two (or more) different transmission points via a single PDCCH or to allocate PDSCHs which are transmitted from two (or more) transmission points via multiple PDCCHs. The UE may obtain the quasi co-location (QCL) connection relationship between channels or each reference signal based on L1/L2/L3 signaling and may effectively estimate the large scale parameters of each reference signal or channel based on the obtained QCL connection relationship.

If the transmission point of a specific reference signal or channel differs, the large scale parameters may be difficult to share. Thus, upon performing joint transmission, the base station needs to provide the UE with quasi co-location information for two or more transmission points via two or more TCI states at the same time. If non-coherent joint transmission is supported via multiple PDCCHs, that is, if two or more PDSCHs are allocated to the same serving cell and the same bandwidth part at the same time by two or more PDCCHs, the two or more TCI states may be individually allocated to PDSCHs or DMRS ports via the PDCCHs. On the other hand, if non-coherent joint transmission is supported via a single PDCCH, that is, if two or more PDSCHs are allocated to the same serving cell and the same bandwidth part at the same time by one PDCCH, the two or more TCI states need to be allocated to the PDSCHs or DMRS ports via one PDCCH.

Under the assumption that the DMRS ports allocated to the UE at a specific time are divided into DMRS port group A transmitted from transmission point A and DMRS port group B transmitted from transmission point B, the two or more TCI states may be individually connected to the DMRS port groups so that the channel may be estimated based on a different QCL assumption per group.

The different DMRS ports may be code division multiplexed (CDMed), frequency division multiplexed (FDMed), or time domain multiplexed (TDMed) to increase channel measurement accuracy and reduce the transmission load. When the CDMed DMRS ports among them are collectively referred to as a CDM group, the DMRS ports in the CDM group work well on code-based multiplexing when each port has similar channel characteristics (in other words, since it is divided well by the orthogonal cover code (OCC) when each port has similar characteristics). Thus, it may be of significance to avoid the DMRS ports present in the same CDM group from having different TCI states. According to an embodiment of the disclosure, there is provided a method for indicating, to the UE, the DMRS port and CDM group without data to meet the characteristics.

For ease of description, the process of transmitting control information via the PDCCH may be referred to as transmitting the PDCCH, and the process of transmitting data via the PDSCH may be referred to as transmitting the PDSCH.

Hereinafter, for ease of description, Table 7 to Table 12 are referred to as a "first antenna port indication" (or "antenna port indication according to the related art"), and a table resultant from modifying all or some of the code points in Table 7 to Table 12 is referred to as a "second antenna port indication" (or "new antenna port indication"). The DMRS port and CDM group without data allocation are referred to as DMRS allocation.

The UE may determine the number of antenna ports used when transmitting the PDSCH through a table indicating the DMRS port. In the Rel-15-based antenna port indication method, DCI format 1_1 may be based on the index with a length of 4 bits to 6 bits indicated in the antenna port field in the DCI and the antenna port may be determined accordingly. The UE may identify the number and index of DMRS ports for PDSCH, number of front-load symbols, and number of CDM groups based on the indicator (index) transmitted by the base station. The UE may determine a dynamic change in beamforming direction based on information about the transmission configuration indication (TCI) in DCI 1_1.

If the tci-PresentDCI field is set to 'enabled' in a higher layer, the UE may identify the TCI field of 3-bit information and determine the beam direction associated with the downlink reference signal (DL-RS) and activated TCI states in the scheduled component carrier or the DL BWP. Conversely, if the tci-PresentDCI field is disabled, it may be regarded as no change in beam direction of beamforming.

According to an embodiment of the disclosure, there is considered a scenario case of allocating PDSCHs transmitted from two (or more) different transmission points through a single PDCCH. The Rel-15 UE receives a PDSCH stream including a single or multiple layers QCLed based on the antenna port information and TCI information in the single PDCCH. The Rel-16 UE may receive the data from a plurality of base stations or multi-TRP in the form of C-JT/NC-JT. To support the C-JT/NC-JT, the Rel-16 UE needs a default higher layer configuration. Specifically, for higher layer configuration, the UE needs to receive C-JT/NC-JT-related parameters or set values and configure them.

Embodiment 1

In the disclosure, a separate DMRS port table for transmitting and receiving C-JT/NC-JT transmission signaling is proposed for the base station and UE supporting C-JT/NC-JT. The proposed DMRS port table may be generated as a separate table from the DMRS port table indicated in the antenna port field indicated based on DCI format 1_1. As a method for distinguishing from the DMRS port table proposed in Rel-15, the base station and the UE may previously configure information about whether to support NC-JT transmission in the RRC configuration. In other words, a field, such as C-JT/NC-JT transmission=enabled/disabled, may be set through RRC configuration, and whether C-JT/NC-JT is identified based on the C-JT/NC-JT transmission field.

When the field value of the C-JT/NC-JT transmission field is set to enabled through the higher layer (C-JT/NC-JT transmission=enabled), the existing antenna port field in DCI format 1_1 may be used to indicate the field that the UE should use. Alternatively, it is possible to indicate at least one of the DMRS port number for NC-JT transmission, number of DMRS CDM group(s) without data, (maximum) number of front-loaded symbols, and DMRS-type using a separate field except form the antenna port field in a separate DCI format 1_1.

Table 12-1 to Table 12-4 propose DMRS ports so that DMRS ports transmitted in the same TRP are transmitted to the same CDM group with respect to the CDM group described above in connection with Table 11. In Table 12-1 to Table 12-4, different TRP transmissions and different CDM group mappings are distinguished by the semicolon (;) between the left side and right, but it may be omitted according to embodiments. Further, the order of values included in the table may be changed based on the semicolon (;). Further, the DMRS ports described in connection with Table 12-1 to Table 12-4 show an example in which the first TRP and the second TRP each support up to two DMRS ports. Further, the basic concept of DMRS ports, types, and number of front-loaded symbols described above in connection with Tables 12-1 to 12-4 and Tables 7 to 10 may be applied likewise.

As shown in Table 12-1, the DMRS port table for C-JT/NC-JT purposes may support other types of ports, as differentiated from the ports non-supported in Rel-15.

For example, if the base station indicates entry 0 (or also referred to as a value) to the UE, the UE may determine that the first TRP and the second TRP transmit the DMRS via DMRS port 0 and DMRS port 2. Upon identifying that the number of DMRS ports for each TRP is 1, the UE may determine that single layer transmission from the first TRP and the second TRP is performed.

If the base station indicates entry 1 to the UE, the UE may determine that the first TRP and the second TRP transmits the DMRS through DMRS port 1 and DMRS port 3. Upon identifying that the number of DMRS ports for each TRP is 1, the UE may determine that single layer transmission from the first TRP and the second TRP is performed. Although the DMRS port numbers in entry 1 differ from the DMRS port numbers in entry 0, the function of entry 1 is similar to the function of entry 0. Thus, entry 1 may be regarded as overlapping entry 0 and may thus be omitted from Table 12-1 above.

If the base station indicates entry 2 to the UE, the UE may determine that the first TRP transmits the DMRS via DMRS port 0 and DMRS port 1, and the second TRP transmits the DMRS via DMRS port 2. Upon identifying that the number of DMRS ports for the first TRP is two, and the number of DMR ports for the second TRP is 1, the UE may determine that 2-layer transmission is performed in the first TRP while 1-layer transmission is performed in the second TRP.

If the base station indicates entry 3 to the UE, the UE may determine that the first TRP transmits the DMRS via DMRS port 0, and the remaining one TRP, i.e., the second TRP, transmits the DMRS via DMRS port 2 and DMRS port 3. Upon identifying that the number of DMRS ports for the first TRP is 1, and the number of DMRS ports for the second TRP is 2, the UE may determine that single layer transmission is performed in the first TRP while 2-layer transmission is performed in the second TRP.

The operations of the base station and the UE for entry 4 and entry 5 may be easily understood from the descriptions given above in connection with entry 2 and entry 3. Although the DMRS port numbers of entry 4 and entry 5 differ from the DMRS port numbers of entry 2 and entry 3, they are functionally similar and may thus be omitted from the table above.

If the base station indicates entry 6 to the UE, the UE may determine that the first TRP transmits the DMRS via DMRS port 0 and DMRS port 1, and the other TRP, i.e., the second TRP, transmits the DMRS via DMRS port 2 and DMRS port 3. Upon identifying that the number of ports for each of the first TRP and the second TRP is 2, the UE may determine that 2-layer transmission is performed in the first TRP while 2-layer transmission is performed in the second TRP.

Table 12-1 shows various scenario cases for communication between the base station and the UE in the form of entries, and all or some of the seven entries may be applied to actual systems. Alternatively, a different table configured with at least one entry among the entries included in Table 12-1 above may be used. Table 12-1 illustrates an example in which the base station transmits one codeword to the UE. However, a similar method to that shown in Table 12-1 may be applied even when the base station transmits two or more codewords to the UE.

Table 12-2 illustrates an example in which the maxLength is different from the maxLength described above in connection with Table 12-1 above, e.g., when maxLength is 2 (maxLength=2), in the same DMRS type as the DMRS type described above in connection with Table 12-1, e.g., DMRS type 1. Referring to Tables 7 and 8, the DMRS port configuration for C-JT/NC-JT may be mapped in the same manner as when the maxLength is 1 (maxLength=1), from DMRS port 0 to DMRS port 3.

Table 12-3 is a DMRS port table for C-JT/NC-JT transmission of a different DMRS type, e.g., DMRS type 2, from the DMRS type, e.g., DMRS type 1, described above in connection with Table 12-1 above. Table 12-3 supports up to 12 DMRS ports which is a structure appropriate for MU-MIMO.

For example, if the base station indicates entry 1 to the UE, the UE may determine that the first TRP and the second TRP each transmit the DMRS via DMRS port 0 and DMRS port 2. Upon identifying that the number of DMRS ports for each of the first TRP and the second TRP is 1, the UE may determine that single layer transmission from each of the first TRP and the second TRP is performed. The entries in Table 12-3 show a case where the number of DMRS CDM groups is 2 and a case where the number of DMRS CDM groups is 3, but do not exclude the case where the number of DMRS CDM groups is 2 and the case where the number of DMRS CDM groups is 3 being shown in the entries, separated from each other. The above-described embodiments show listing in the form of entries, and all or some of the 14 entries may be applied to actual systems.

For example, some of the 14 entries may be entries 0, 2, 3, 6, 7, 9, 10, and 13, and a table may be determined based on entries 0, 2, 3, 6, 7, 9, 10, and 13. The order of entries in the above embodiment is merely an embodiment, and embodiments of the disclosure are not limited thereto. Table 12-3 illustrates an example in which the base station transmits one codeword to the UE. However, when the base station transmits two or more codewords to the UE may also be similar to the case where the base station transmits one codeword to the UE.

Table 12-4 illustrates an example in which the maxLength is different from the maxLength described above in connection with Table 12-3 above, e.g., when maxLength is 2 (maxLength=2), in the same DMRS type as the DMRS type described above in connection with Table 12-3, e.g., DMRS type 2. Referring to Tables 7 and 8, a total of two through four DMRS ports are allocated in the DMRS port configuration for C-JT/NC-JT, and at least one DMRS port is allocated per CDM group. According to the number of front-loaded symbols, if the number of front-loaded symbols is one, at least one DMRS port per CDM group is allocated in DMRS ports 0 to 3 (which has been described above in connection with Table 12-3, and no further description thereof is presented below) and, if the number of front-loaded symbols is two, at least one DMRS port per CDM group is allocated within DMRS ports 0 to 7. When a total of two DMRS ports are used for each CDM group, the frequency domain orthogonal cover code (OCC) of each CDM group should be the same.

Meanwhile, the time domain OCC of each CDM group may be the same or different. For example, in CDM group {0,1} DMRS ports 0 and 2 using the same time domain OCC may be used at the same time, and DMRS ports 0 and 6 using different time domain OCCs may also be used at the same time. When three or more DMRS ports are used, the time domain OCCs applied to CDM group {0,1} may be the same or different. The above-described embodiments show listing in the form of entries, and all or some of the 28 entries may be applied to actual systems.

For example, some of the entries may be entries 0, 2, 3, 6, 7, 9, 10, and 13 or 0, 2, 3, 6, 7, 9, 10, 13, 14, 16, 17, 20, 23, 24, and 27, and a table may be determined based on entries 0, 2, 3, 6, 7, 9, 10, and 13 or 0, 2, 3, 6, 7, 9, 10, 13, 14, 16, 17, 20, 23, 24, and 27. The order of entries in the above embodiment is merely an embodiment, and embodiments of the disclosure are not limited thereto. Table 12-4 illustrates an example in which the base station transmits one codeword to the UE. However, the case where the base station transmits two or more codewords to the UE may be similar to those described above in connection with Table 12-4.

TABLE 12-1

DMRS indication table for antenna port(s) (1000 + DMRS port), dmrs-Type = 1, maxLength = 1
One Codeword (dmrs-Type = 1, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |

TABLE 12-2

DMRS indication table for antenna port(s) (1000 + DMRS port), dmrs-Type = 1, maxLength = 2
One Codeword (dmrs-Type = 1, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |

TABLE 12-3

DMRS indication table for antenna port(s) (1000 + DMRS port), dmrs-Type = 2, maxLength = 1
One Codeword (dmrs-Type = 2, maxLength = 1)

| Entries | Number of DMRS CDM group(s) without data | DMRS port(s) | Number of front-load symbols |
|---|---|---|---|
| 0 | 2 | 0; 2 | 1 |
| 1 | 2 | 1; 3 | 1 |
| 2 | 2 | 0, 1; 2 | 1 |
| 3 | 2 | 0; 2, 3 | 1 |
| 4 | 2 | 1; 2, 3 | 1 |
| 5 | 2 | 0, 1; 3 | 1 |
| 6 | 2 | 0, 1; 2, 3 | 1 |
| 7 | 3 | 0; 2 | 1 |
| 8 | 3 | 1; 3 | 1 |
| 9 | 3 | 0, 1; 2 | 1 |
| 10 | 3 | 0; 2, 3 | 1 |
| 11 | 3 | 1; 2, 3 | 1 |
| 12 | 3 | 0, 1; 3 | 1 |
| 13 | 3 | 0, 1; 2, 3 | 1 |

TABLE 12-4

DMRS indication table for antenna port(s) (1000 + DMRS port), dmrs-Type = 2, maxLength = 2
One Codeword (dmrs-Type = 2, maxLength = 2)

| Entries | Number of DMRS CDM group(s) without data | DMRS port(s) | Number of front-load symbols |
|---|---|---|---|
| 0 | 2 | 0; 2 | 2 |
| 1 | 2 | 1; 3 | 2 |
| 2 | 2 | 0, 1; 2 | 2 |
| 3 | 2 | 0; 2, 3 | 2 |
| 4 | 2 | 1; 2, 3 | 2 |
| 5 | 2 | 0, 1; 3 | 2 |
| 6 | 2 | 0, 1; 2, 3 | 2 |
| 7 | 3 | 0; 2 | 2 |
| 8 | 3 | 1; 3 | 2 |
| 9 | 3 | 0, 1; 2 | 2 |
| 10 | 3 | 0; 2, 3 | 2 |
| 11 | 3 | 1; 2, 3 | 2 |
| 12 | 3 | 0, 1; 3 | 2 |
| 13 | 3 | 0, 1; 2, 3 | 2 |
| 14 | 2 | 6; 8 | 2 |
| 15 | 2 | 7; 9 | 2 |
| 16 | 2 | 6, 7; 8 | 2 |
| 17 | 2 | 6, 8; 9 | 2 |
| 18 | 2 | 7; 8, 9 | 2 |
| 19 | 2 | 6; 7, 9 | 2 |
| 20 | 2 | 6, 7; 8, 9 | 2 |
| 21 | 3 | 6; 8 | 2 |
| 22 | 3 | 7; 9 | 2 |
| 23 | 3 | 6, 7; 8 | 2 |

TABLE 12-4-continued

DMRS indication table for antenna port(s) (1000 +
DMRS port), dmrs-Type = 2, maxLength = 2
One Codeword (dmrs-Type = 2, maxLength = 2)

| Entries | Number of DMRS CDM group(s) without data | DMRS port(s) | Number of front-load symbols |
|---|---|---|---|
| 24 | 3 | 6, 8; 9 | 2 |
| 25 | 3 | 7; 8, 9 | 2 |
| 26 | 3 | 6; 7; 9 | 2 |
| 27 | 3 | 6, 7; 8, 9 | 2 |

Embodiment 2

Table 13-1 proposes a method of using the codepoint of the reserved bit in Rel-15 as a method for indicating, by the base station, the DMRS port to the UE for C-JT/NC-JT transmission. As illustrated in Table 7, in the Rel-15 DMRS port table, bits 0 to 11 are used, but bits 12 to 15, as reserved bits, are not used. According to an embodiment of the disclosure, as shown in Table 13-1, four codepoints, 12 to 15, in the DMRS port table may be used to indicate the DMRS port for joint transmission transmitted in two TRPs. As such, use of the reserved bits may eliminate the need for the base station to allocate a separate field to the UE, allowing for more efficient use of DCI resources.

As an example, when the base station indicates entry 12 to the UE, the UE may determine that the first TRP and the second TRP transmit the DMRS through the DMRS port 0 and the DMRS port 2. Upon identifying that the number of DMRS ports used in each TRP is 1, the UE may determine that single layer transmission from each of the first TRP and the second TRP is performed.

As another example, If the base station indicates entry 13 to the UE, the UE may determine that the first TRP transmits the DMRS via DMRS port 0 and DMRS port 1, and the second TRP transmits the DMRS via DMRS port 2. Upon identifying that the number of DMRS ports used in the first TRP is two, and the number of DMRS ports used in the second TRP is 1, the UE may determine that 2-layer transmission is performed in the first TRP while 1-layer transmission is performed in the second TRP.

As another example, if the base station indicates entry 14 to the UE, the UE may determine that the first TRP transmits the DMRS via DMRS port 0, and the remaining one TRP, i.e., the second TRP, transmits the DMRS via DMRS port 2 and DMRS port 3. Upon identifying that the number of DMRS ports used in the first TRP is 1, and the number of DMRS ports used in the second TRP is 2, the UE may determine that single layer transmission is performed in the first TRP while 2-layer transmission is performed in the second TRP.

As another example, If the base station indicates entry 15 to the UE, the UE may determine that the first TRP transmits the DMRS via DMRS port 0 and DMRS port 1, and the other TRP, i.e., the second TRP, transmits the DMRS via DMRS port 2 and DMRS port 3. Upon identifying that the number of ports used in each of the first TRP and the second TRP is 2, the UE may determine that 2-layer transmission is performed in the first TRP while 2-layer transmission is performed in the second TRP.

Here, the UE in which the field value of the C-JT/NC-JT transmission field is set to enabled (C-JT/NC-JT transmission=enabled) by a higher layer may identify the remaining codepoints of the existing antenna port field in DCI format 1_1 and dynamically determine whether to perform C-JT/NC-JT transmission. In other words, when the antenna port field in DCI format 1_1 is 12 to 15, the UE may identify the number of TRPs used for transmission of the PDSCH scheduled in the DCI, the number of layers transmitted, the number of DMRS CDM groups without data, and the number of front-loaded symbols. The above-described embodiments show listing in the form of entries, and all or some of the 4 entries may be applied to actual systems. The order of entries in the above embodiment is merely an embodiment, and embodiments of the disclosure are not limited thereto.

As an example, Table 13-2 to Table 13-4 regard embodiments resultant from adding some of the DMRS ports separately generated in Table 12-2 to Table 12-4 to Tables 8 to 10 defined in the Rel-15 standard. In Table 13-2 to Table 13-4, duplicate DMRS ports are omitted to reduce bit size as much as possible. The omission is merely an embodiment, and all or some of the DMRS ports shown in Table 12-1 to Table 12-4 may be additionally used. The base station may schedule joint transmission for the Rel-16 NC-JT UE as shown in Table 12-1 to Table 13-4 for the same DMRS port, schedule single port transmission for the Rel-15 UE, and perform downlink MU-MIMO operations.

As another example, if some entries in Table 13-1 to Table 13-4 have the same DMRS port indexes, the duplicate index may be omitted. In other words, in Table 13-1, the DMRS port indexes for entries 12, 13, and 15 for NC-JT transmission are identical to the DMRS port indexes for entries 11, 9, and 10, and the DMRS port indexes for entries 12, 13, and 15 may be omitted. In Table 13-2, the DMRS port indexes for entries 31, 32, and 34 for NC-JT transmission are identical to the DMRS port indexes for entries 11, 9, and 10, and the DMRS port indexes for entries 31, 32, and 34 may be omitted. In Table 13-3, the DMRS port indexes for entries 24, 25, 27, 29, and 31 for NC-JT transmission are identical to the DMRS port indexes for entries 23, 9, 10, 29, and 22, and the DMRS port indexes for entries 24, 25, 27, 29, and 31 may be omitted. In Table 13-3, the DMRS port indexes for entries 24, 25, 27, 29, and 31 for NC-JT transmission are identical to the DMRS port indexes for entries 23, 9, 10, 29, and 22, and the DMRS port indexes for entries 24, 25, 27, 29, and 31 may be omitted. In Table 13-4, the DMRS port indexes for entries 58, 59, 61, 63, and 65 for NC-JT transmission are identical to the DMRS port indexes for entries 23, 9, 10, 20, and 22, and the DMRS port indexes for entries 58, 59, 61, 63, and 65 may be omitted. The DMRS port indexes may be omitted based on at least one of the assumption that at least different CDM groups for NC-JT are not transmitted in the same DMRS port, the assumption that the TCI field may indicate whether to perform NC-JT to allow the UE to identify the DMRS port for NC-JT, and the assumption that the UE may differentiate DMRS ports based on the reception of DCI and the reception of the MAC CE message, and the DMRS port indexes for duplicate entries may thus be omitted.

TABLE 13-1

DMRS indication table for antenna port(s) (1000 +
DMRS port), dmrs-Type = 1, maxLength = 1
One Codeword:
Codeword 0 enabled,
Codeword 1 disabled

| Entry | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0; 2 |
| 13 | 2 | 0, 1; 2 |
| 14 | 2 | 0; 2, 3 |
| 15 | 2 | 0, 1; 2, 3 |

TABLE 13-2

DMRS indication table for antenna port(s) (1000 +
DMRS port), dmrs-Type = 1, maxLength = 2
One Codeword:
Codeword 0 enabled,
Codeword 1 disabled

| Entry | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | 2 | 0; 2 | 1 |
| 32 | 2 | 0, 1; 2 | 1 |
| 33 | 2 | 0; 2, 3 | 1 |
| 34 | 2 | 0, 1; 2, 3 | 1 |
| 35 | 2 | 0; 2 | 2 |
| 36 | 2 | 0, 1; 2 | 2 |
| 37 | 2 | 0; 2, 3 | 2 |
| 38 | 2 | 0,1; 2, 3 | 2 |
| 39 | Reserved | Reserved | Reserved |

TABLE 13-3

DMRS indication table for antenna port(s) (1000 +
DMRS port), dmrs-Type = 2, maxLength = 1
One codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24 | 2 | 0; 2 |
| 25 | 2 | 0, 1; 2 |
| 26 | 2 | 0; 2, 3 |
| 27 | 2 | 0, 1; 2, 3 |
| 28 | 3 | 0; 2 |
| 29 | 3 | 0, 1; 2 |
| 30 | 3 | 0; 2, 3 |
| 31 | 3 | 0, 1; 2, 3 |

TABLE 13-4

DMRS indication table for antenna port(s) (1000 +
DMRS port), dmrs-Type = 2, maxLength = 2
One codeword:
Codeword 0 enabled,
Codeword 1 disabled

| Value | Number of DMRS CDM group(s) without data | DMRS | Number of front-load symbols | Value | Number of DMRS CDM group(s) without data | DMRS port(s) | Number of front-load symbols |
|---|---|---|---|---|---|---|---|
| 0 | 1 | 0 | 1 | 48 | 1 | 0 | 2 |
| 1 | 1 | 1 | 1 | 49 | 1 | 1 | 2 |
| 2 | 1 | 0, 1 | 1 | 50 | 1 | 6 | 2 |
| 3 | 2 | 0 | 1 | 51 | 1 | 7 | 2 |
| 4 | 2 | 1 | 1 | 52 | 1 | 0, 1 | 2 |
| 5 | 2 | 2 | 1 | 53 | 1 | 6, 7 | 2 |
| 6 | 2 | 3 | 1 | 54 | 2 | 0, 1 | 2 |
| 7 | 2 | 0, 1 | 1 | 55 | 2 | 2, 3 | 2 |
| 8 | 2 | 2, 3 | 1 | 56 | 2 | 6, 7 | 2 |
| 9 | 2 | 0-2 | 1 | 57 | 2 | 8, 9 | 2 |
| 10 | 2 | 0-3 | 1 | 58 | 2 | 0; 2 | 1 |
| 11 | 3 | 0 | 1 | 59 | 2 | 0, 1; 2 | 1 |
| 12 | 3 | 1 | 1 | 60 | 2 | 0; 2, 3 | 1 |
| 13 | 3 | 2 | 1 | 61 | 2 | 0, 1; 2, 3 | 1 |
| 14 | 3 | 3 | 1 | 62 | 3 | 0; 2 | 1 |
| 15 | 3 | 4 | 1 | 63 | 3 | 0, 1; 2 | 1 |
| 16 | 3 | 5 | 1 | 64 | 3 | 0; 2, 3 | 1 |
| 17 | 3 | 0, 1 | 1 | 65 | 3 | 0, 1; 2, 3 | 1 |
| 18 | 3 | 2, 3 | 1 | 66 | 2 | 0; 2, | 2 |
| 19 | 3 | 4, 5 | 1 | 67 | 2 | 0, 1; 2, 3 | 2 |
| 20 | 3 | 0-2 | 1 | 68 | 2 | 0; 2, 3 | 2 |
| 21 | 3 | 3-5 | 1 | 69 | 2 | 0, 1; 2, 3 | 2 |
| 22 | 3 | 0-3 | 1 | 70 | 3 | 0; 2 | 2 |
| 23 | 2 | 0, 2 | 1 | 71 | 3 | 0, 1; 2 | 2 |
| 24 | 3 | 0 | 2 | 72 | 3 | 0; 2, 3 | 2 |
| 25 | 3 | 1 | 2 | 73 | 3 | 0, 1; 2, 3 | 2 |
| 26 | 3 | 2 | 2 | 74-127 | reserved | reserved | reserved |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |

According to an embodiment of the disclosure, the UE may support the data from a plurality of base stations or multi-TRP in the form of C-JT/NC-JT. The UE supporting C-JT/NC-JT may receive, e.g., C-JT/NC-JT-related parameters or set values in the higher layer configuration and, based thereupon, set the UE's RRC parameters. For the higher layer configuration, the UE may utilize the UE capability parameter tci-StatePDSCH. Here, the UE capability parameter tci-StatePDSCH defines TCI states for the purpose of PDSCH transmission, and the number of TCI states may be 4, 8, 16, 32, 64, or 128 in FR1 and 64 or 128 in FR2, and up to eight states that may be indicated with the 3 bits of the TCI field of the DCI may be set via a MAC CE message among the set numbers. The maximum value, 128, means the value indicated by the maxNumberConfiguredTCIstatesPerCC field in the tci-StatePDSCH parameter included in the UE's capability signaling. As such, the series of configuration processes from the higher layer configuration to the MAC CE configuration may be applied to a beamforming indication or beamforming change instruction for at least one PDSCH in one TRP.

According to an embodiment of the disclosure, it is described how the UE may activate or deactivate the TCI state via different MAC CE signaling, as in Rel-15 and Rel-16, by the base station. In particular, upon allocation of a PDSCH for a specific UE as in DCI format 1_1, it is possible to dynamically support the direction indication of beamforming or the direction change instruction of beamforming using the TCI field.

The beamforming direction indication or the beamforming direction change instruction mean operations applied when the UE identifying the TCI states field in DCI format 1_1 receives the PDSCH on the downlink after a predetermined time, and the direction of beamforming means a corresponding beamforming set direction in association with the DL RS of the QCLed base station/TRP.

First, the base station or the UE may determine to use the Rel-15 MAC CE for the Rel-15 DCI format and the Rel-16 MAC CE for the Rel-16 DCI format. As such, different solutions are proposed depending on the Rel-15 MAC CE structure and the Rel-16 MAC CE structure.

FIG. 10A is a view schematically illustrating an MAC CE structure for TCI state activation of a UE-specific PDCCH in a wireless communication system according to an embodiment of the disclosure.

Referring to FIG. 10A, 10-00 of FIG. 10A indicates the structure of the MAC CE for TCI state activation of the Rel-15-based UE-specific PDCCH.

The meaning of each field in the MAC CE and value that may be set in each field are shown in Table B-1 below.

TABLE B-1

Serving Cell ID (Serving cell identifier): This field indicates the identity of the Serving Cell for which the MAC CE applies. The length of the field is 5 bits;
CORESET ID (CORESET identifier): This field indicates a Control Resource Set identified with ControlResourceSetId as specified in TS 38.331 [5], for which the TCI state is being indicated. In case the value of the field is 0, the fired refers to the Control Resource Set configured by ControlResourceSetZero as specified in TS 38.331 [5], The length of the field is 4 bits;
TCI State ID (Transmission configuration indication identifier): This field indicates the TCI State identified by TCI-StateId as specified in TS 38.331 [5] applicable to the Control Resource Set identified by the CORESET ID field. If the field of CORESET ID is set to 0, this field indicates a TCI-StateId for a TCI state of the first 64 TCI-States configured by tci-States-ToAddModList and tci-States-ToReleastList in the PDSCH-Config in the active BWP. If the field of CORESET ID is set to the other value than 0, this field indicates a TCI-StateId configured by tci-StatesPDCCH-ToAddModList and tci-StatesPDCCH-ToReleastList in the controlResourceSet identified by the indicated CORESET ID. The length of the field is 7 bits.

10-50 of FIG. 10A indicates the structure of the MAC-CE for TCI state activation/deactivation of Rel-15-based UE-specific PDSCH.

The meaning of each field in the MAC CE and value that may be set in each field are shown in Table B-2 below.

TABLE B-2

Serving Cell ID (Serving cell identifier): This field indicates the identity of the Serving Cell for which the MAC CE applies. The length of the field is 5 bits;
BWP ID (Bandwidth part identifier): This field indicates a DL BWP for which the MAC CE applies as the codepoint of the DCI bandwidth part indicator field as specified in TS 38.212 [9], The length of the BWP ID field is 2 bits;
Ti (TCI state identifier i): If there is a TCI state with TCI-StateId as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId is shall be activated and mapped to the codepoint of the DCI transmission Configuration Indication field, as specified in TS 38.214 [7], The Ti field is set to 0 to indicate that the TCI state with TCI-StateId is shall be deactivated and is not mapped to the codepoint of the DCI transmission Configuration Indication field. The codepoint to which the TCI State is mapped is determined by its ordinal position among all the TCI States with Ti field set to 1, i.e., the first TCI State with Ti field set to 1 shall be mapped to the codepoint value 0, second TCI State with Ti field set to 1 shall be mapped to the codepoint value 1 and so on. The maximum number of activated TCI states is 8;
R (Redundant bit): Reserved bit, set to 0.

The MAC CE of Rel-16 may be configured in the form of extending the MAC CE message of rel-15. In this embodiment of the disclosure, all the TCI states activated by the Rel-15 MAC CE may be included in the TCI states activated by the Rel-16 MAC CE. This is described below with reference to FIG. 10B.

Figure 10B:
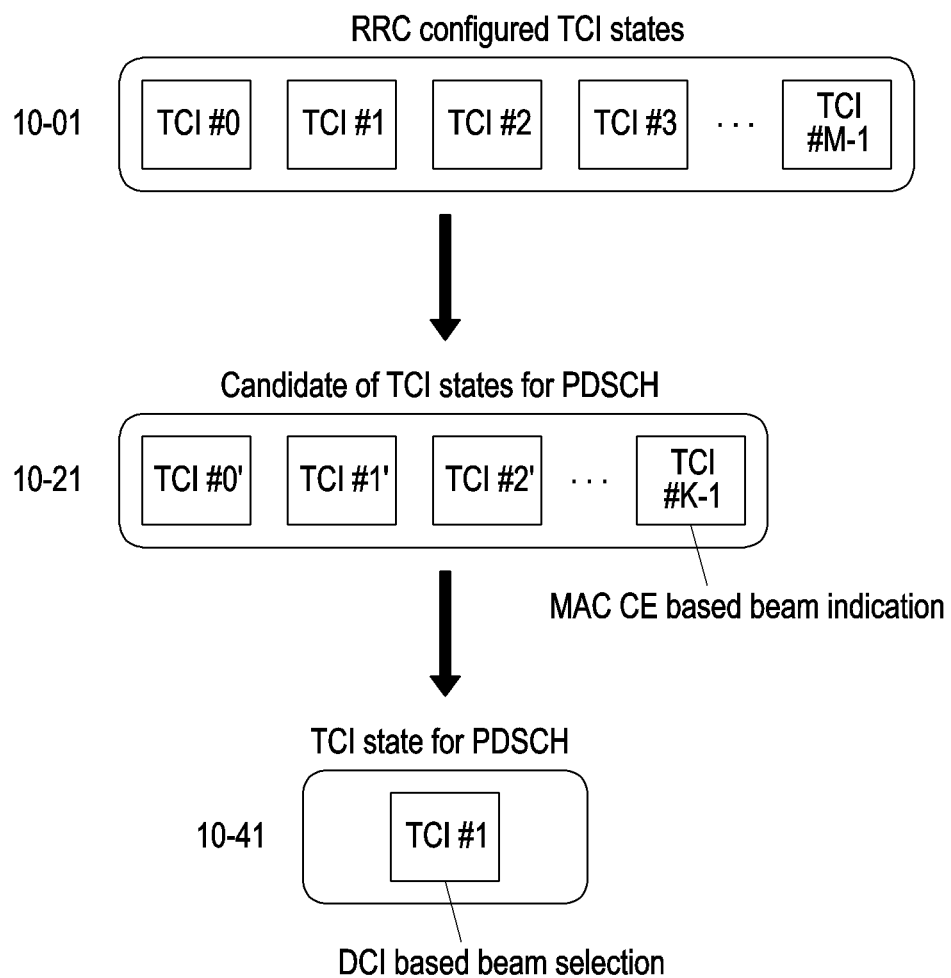
FIG. 10B is a view illustrating a beamforming indication and a configuration of TCI states according to an embodiment of the disclosure.

FIG. 10B is a view illustrating a TCI state configuration and beamforming indication operation according to an embodiment of the disclosure.

Referring to FIG. 10B, the base station may determine that all the TCI states of RRC configured TCI states 10-01 of Rel-15 include M TCI states, such as TCI #0, TCI #1, TCI #2, ..., TCI #M−1 and select TCI #0', TCI #1', TCI #2', TCI #K−1 as a subset 10-21 of TCI states selected by the MAC CE of Rel-15 from among the M TCI states.

In contrast, the base station and the UE supporting Rel-16 may separately set the RRC configured TCI states supporting Rel-16 or use the RRC configured TCI states set in Rel-15 as it is. In this case, the RRC configured TCI states supporting Rel-16 may include some or all of the RRC configured TCI states set in Rel-15. If M=128, the number of TCI states of Rel-16 may be equal to or greater than 128. If the base station or UE increases the number of TCI states supported by Rel-15 in proportion to the number of base stations/TRPs operating as C-JT/NC-JT in Rel-16, and two TRPs operate, up to 256 TCI states may be set. Here, the Rel-16 MAC CE may include some or all of the TCI states supported by the MAC CE of Rel-15 in the RRC configured TCI states for Rel-16 use. Specifically, if Rel-16 MAC CE includes all of the TCI states supported by the MAC CE of Rel-15, and the number of TCI states is increased in proportion to the number of base stations/TRPs operating as C-JT/NC-JT in Rel-16, and if two TRPs operate, up to 2K TCI states may be set.

Table 14 illustrates details of the tci-StatePDSCH parameters described above in connection with the above-de scribed embodiments. Specifically, the FR2 mandatory value of the parameter maxNumberConfiguredTCIstates-PerCC may be modified from 64 to 128 or 256, or may separately add 64, 128 or 256 for C-JT/NC-JT purposes.

station and the UE supporting Rel-15 and the maximum value of K for the base station and UE supporting Rel-16 may be set to a value less than 8. Although in the above embodiment of the disclosure, the maximum value K of the

TABLE 14

| Definitions for parameters | Per | M | FDD-TDD DIFF | FR1-FR2 DIFF |
|---|---|---|---|---|
| tciStatePDSCH<br>Defines support of TCI-States for PDSCH. The capability signalling comprises the following parameters:<br>maxNumberConfigured TCIstatesPerCC indicates the maximum number of configured TCI-states per CC for PDSCH. For FR2, the UE is mandated to set the value to 64 128. For FR1, the UE is mandated to set these values to the maximum number of aallowed SSBs in the supported band; maxNumberActiveTCI-PerBWP indicates the maximum number of activated TCI-states per BWP per CC, including control and data. If a UE reports X active TCI state(s), it is not expected that more than X active QCL type D assumption(s) for any PDSCH and any CORESETs for a given BWP of a serving cell become active for the UE.<br>Note the UE is required to track only the active TCI states. | Band | Yes | No | No |

For example, the base station or UE supporting Rel-15 and Rel-16 may set the maximum value for each of Rel-15 and Rel-16 for setting TCI states via the MAC CE and set the number of TCI states as a value equal to or smaller than the set maximum value. Various embodiments below may be proposed as a method for setting the number of TCI states to a value equal to or smaller than the maximum value.

The number of TCI states activated by the MAC CE messages of Rel-15 and Rel-16 may be set by the UE capability value reported by the UE. As another example, the number of TCI states activated by the MAC CE messages of Rel-15 and Rel-16 may be determined as a value preset by the base station. As another example, the number of TCI states activated by the MAC CE messages of Rel-15 and Rel-16 may be determined as a value previously agreed on between the base station and the UE.

As an example, as illustrated in FIG. 10B, the base station and the UE may determine that all the TCI states of RRC configured TCI states 10-01 of Rel-15 include M TCI states, such as TCI #0, TCI #1, TCI #2, . . . , TCI #M−1 and select TCI #0', TCI #1, TCI #2', . . . , TCI #K−1 as a subset 10-21 of TCI states selected by the MAC CE of Rel-15 from among the M TCI states. If TCI #0 is selected from among the M TCI states, TCI #0 may be placed on TCI #0'. Here, as an example, the maximum value of K for the base station and the UE supporting Rel-15 may be set or determined to be 8, and the maximum value of K for the base station and UE supporting Rel-16 may also be set to 8. If the maximum value of K for the base station and the UE supporting Rel-15 and the maximum value of K for the base station and UE supporting Rel-16 are set to 8, the base station may instruct the UE to select a beam for PDSCH via DCI-based beam selection for one CORESET. The selection of a beam may be determined by identifying the TCI field information 10-41 in the DCI among up to eight beams. TCI field #I indicated in FIG. 10B may be selected as a value of 0 to 7. For example, if the TCI field in the DCI is indicated as 000, it may be determined that among TCI #0', TCI #1', TCI #2', TCI #3', TCI #4', TCI #5', TCI #6', and TCI #7', TCI #0' (TCI #I=TCI #0') is indicated. Although in the above embodiment of the disclosure, the maximum value of K for the base station and the UE supporting Rel-15 and the maximum value of K for the base station and UE supporting Rel-16 are each set to 8 (K=8), the maximum value of K for the base MAC CE for Rel-15 and the maximum value K of the MAC CE for Rel-16 are the same, the maximum value K of the MAC CE for Rel-15 and the maximum value K of the MAC CE for Rel-16 may be set to different values.

As another example, if the number of TCI states increases in proportion to the number of base stations/TRPs operating as C-JT/NC-JT, when two TRPs operate, the maximum value of K for the base station and UE supporting Rel-16 may be set to 16. When the maximum value of K is set to 16, the base station may instruct the UE to select one or two or more beams for PDSCH via DCI based beam selection for one CORESET. TCI field #I selected and indicated by the base station may be selected as a value of 0 to 15 when K is 16. Although in the above embodiment of the disclosure, the maximum value K of the MAC CE for Rel-15 and the maximum value K of the MAC CE for Rel-16 are set to 16 (K=16), the maximum value K of the MAC CE for Rel-15 and the maximum value K of the MAC CE for Rel-16 may be set to values smaller than 16.

Table 15 shows the characteristics of the UE capability reporting parameters for QCL-TypeD "PDSCH beam switching (or timeDurationForQCL, UE capa 2-2)" and "Max number of downlink RS resources used for QCL type-D in the active TCI states and active spatial relation info (or UE capa 2-62)".

Referring to Table 15, the UE may report the time interval required to change the reception beam from a minimum of 7 symbols to a maximum of 28 symbols based on a 60 kHz subcarrier spacing (SCS) to the base station through timeDurationForQCL or may report a time interval required to change the reception beam from a minimum of 14 symbols to a maximum of 28 symbols based on a 120 kHz subcarrier spacing (SCS). The 60 kHz and 120 kHz SCSs are values that may be set only in FR2, and according to Table 15, it may be identified that timeDurationForQCL is also available only in FR2.

Further, the UE may inform the base station of how many downlink reference signals to the maximum may be used as a reference RS for the QCL type-D of the activated TCI state through "UE capa 2-62". For example, if the value of "UE capa 2-62" is 1, this means that there is only one reference RS of QCL type-D in the activated TCI state-namely, it may be interpreted as incapability of dynamically changing the reception beam. On the other hand, if the value of "UE capa 2-62" is 2 or more, this means that there are two or more reference RSs of QCL type-D in the activated TCI state, and it may be interpreted as capability of dynamically changing the reception beam.

TABLE 15

| 2-2 | PDSCH beam switching | 1) Time duration (definition follows clause 5.1.5 in TS 38.214), Xi, to determine and apply spatial QCL information for corresponding PDSCH reception. Time duration is defined counting from end of last symbol of PDCCH to beginning of the first symbol of PDSCH. Xi is the number of OFDM symbols, i is the index of SCS, l = 1, 2, corresponding to 60, 120 kHz SCS. | Applicable only to FR2 | Mandatory with capability signaling for FR2 Candidate value set for X1 is {7, 14, 28}, Candidate value set for X2, {14, 28} |
|---|---|---|---|---|
| 2-62 | Max number of downlink RS resources used for QCL type-D in the active TCI states and active spatial relation info | Max number of downlink RS resources in the active TCI states and active spatial relation info per CC | FR1. FR2 | Optional with capability signaling Candidate value set: {1, 2, 4, 8, 14} |

The Rel-15-based base station may allocate data considering a scheduling time offset (t_so) from the time when reception of the PDCCH in CORESET is completed to the time when the PDSCH scheduled by the PDCCH is transmitted. The scheduling time offset (t_so) is the time (or duration) from the last symbol (or the next symbol) of the PDCCH for allocating the PDSCH to the previous symbol where the PDSCH for transmitting data starts in the corresponding slot indicated by k0 described above in connection with FIG. 8. The start symbol of the PDSCH may be determined based on the start and length indicator (SLIV) index set in startSymbolAndLength (0 to 127) of the PDSCH-TimeDomainResourceAllocation set in the higher layer. The application of beamforming may differ for each UE according to the capability of the UE, and the capability is transferred as a timeDurationForQCL value to the base station during the RRC configuration process with the base station. In an embodiment of the disclosure, the timeDurationForQCL may be referred to as a time interval for the UE to apply the QCL or a time interval for applying the QCL.

Basically, the UE may perform the following operations according to the scheduling time offset (t_so) and the value of timeDurationForQCL based on the capability of the UE to be set in the higher layer.

When the tci-PresentinDCI field is not set to 'enabled' in the higher layer configuration, the UE may identify whether the scheduling offset/scheduling timing offset between PDCCH and PDSCH is equal to or larger than the timeDurationForQCL reported via the UE capability report regardless of the DCI format.

When the tci-PresentinDCI field is set to 'enabled' in the higher layer configuration, and the UE receives DCI format 1_1 from the base station, the UE may assume that the TCI field is present in the DCI and identify whether the scheduling time offset between PDCCH and PDSCH is equal to or larger than the timeDurationForQCL reported by the UE capability report.

When the scheduling offset/scheduling timing offset between PDCCH and PDSCH is smaller than the timeDurationForQCL, the UE may determine the DMRS port of the received PDSCH based on the QCL parameter used in the CORESET associated with the monitored search space having the lowest CORESET ID in the latest slot.

Further, as an example, when the scheduling offset/scheduling timing offset between the PDCCH and the PDSCH is greater than or equal to timeDurationForQCL, the UE applies the same QCL assumption as the QCL assumption for CORESET used to transmit the PDCCH to the corresponding PDSCH DMRS port.

As another example, when the scheduling offset/scheduling timing offset between the PDCCH and the PDSCH is greater than or equal to timeDurationForQCL, the UE applies the QCL assumption indicated by the TCI field in the corresponding PDCCH (DCI) to the corresponding PDSCH DMRS port.

When none of the TCI states set in the UE "for all the BWPs" include the QCL-TypeD, the UE may obtain the QCL assumption according to the TCI state always indicated regardless of the interval between the DCI and the PDSCH where the DCI is allocated. The structure of the PDCCH transmitted according to at least one CORESET and search space set by the base station is described below with reference to FIGS. 11, 12, 13, and 14.

Figure 11:
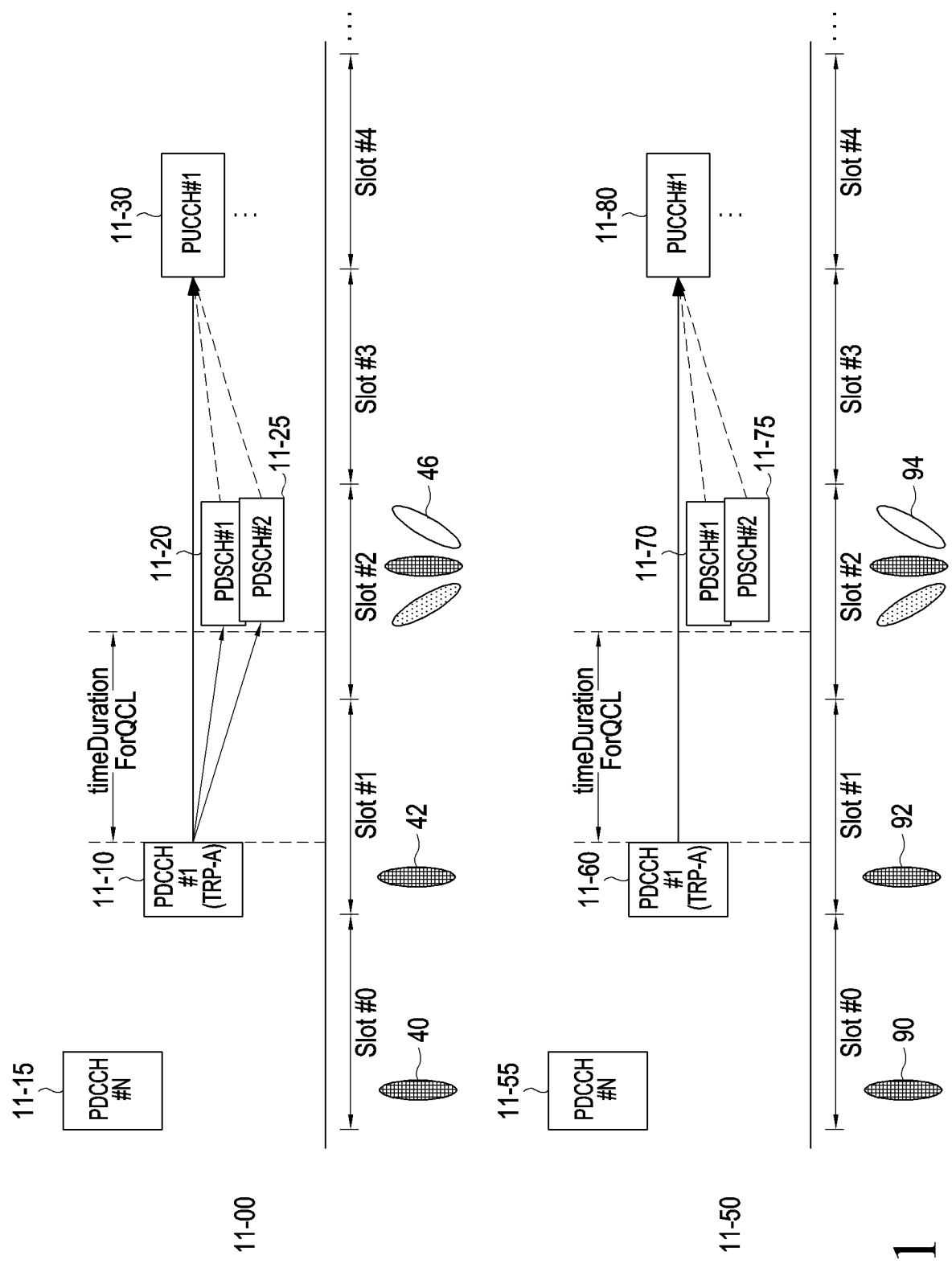
FIG. 11 is a view illustrating a method of single PDCCH-based cooperative communication according to an embodiment of the disclosure.

FIG. 11 is a view illustrating a method of single PDCCH-based cooperative communication according to an embodiment of the disclosure.

Figure 12:
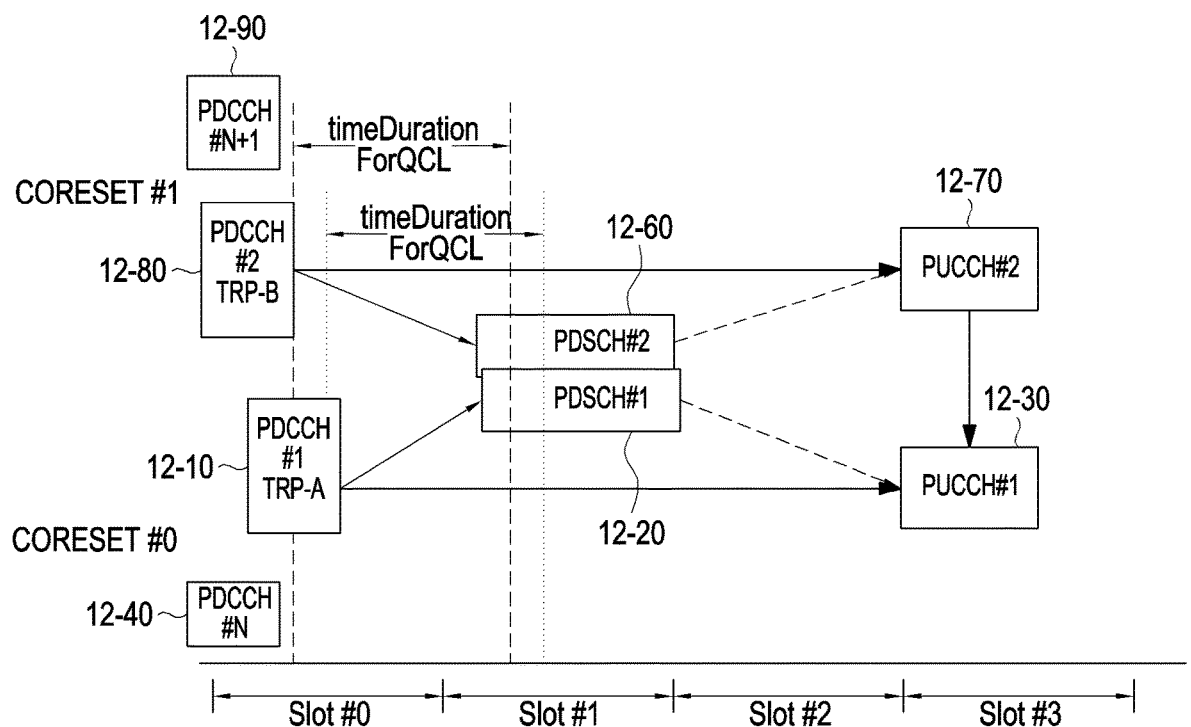
FIG. 12 is a view illustrating multiple PDCCH-based cooperative communication according to an embodiment of the disclosure.

FIG. 12 is a view illustrating multiple PDCCH-based cooperative communication according to an embodiment of the disclosure.

Figure 13:
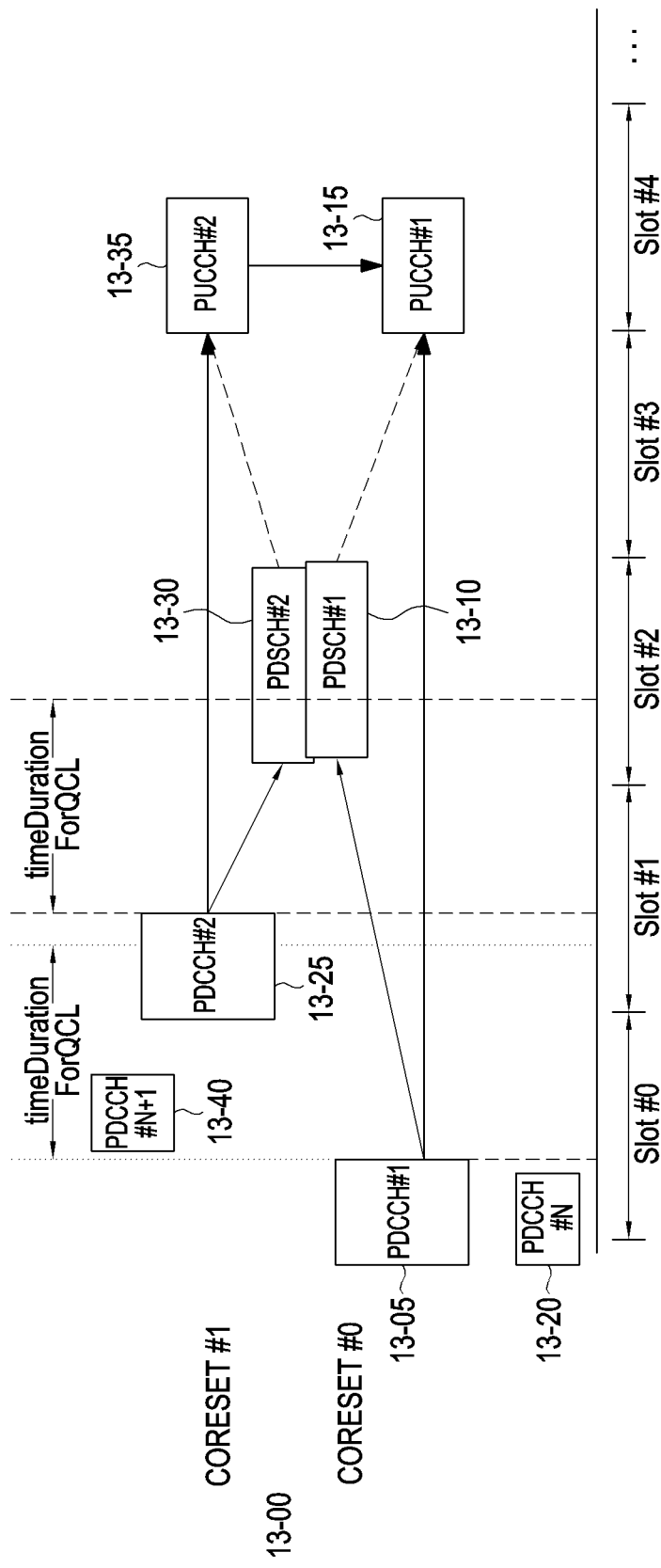
FIG. 13 is a view illustrating multiple PDCCH-based cooperative communication according to an embodiment of the disclosure.

FIG. 13 is a view illustrating multiple PDCCH-based cooperative communication according to an embodiment of the disclosure.

Figure 14:
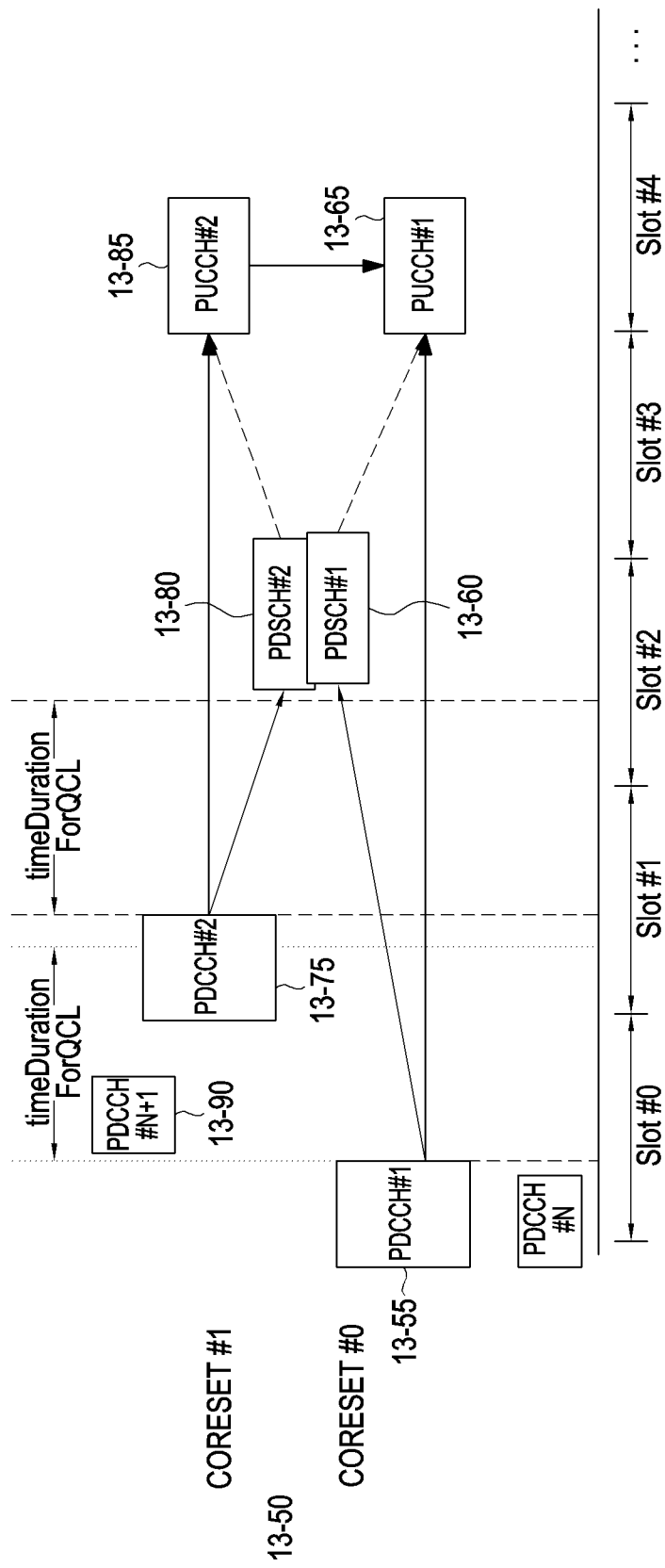
FIG. 14 is a view illustrating multiple PDCCH-based cooperative communication according to an embodiment of the disclosure.

FIG. 14 is a view illustrating multiple PDCCH-based cooperative communication according to an embodiment of the disclosure.

Referring to FIGS. 11, 12, 13, and 14, they illustrate an embodiment in which the base station transmits a first PDCCH in one CORESET (e.g., a first CORESET or PDCCH #1) as illustrated in FIG. 8. Specifically, the first PDCCH transmitted in TRP-A may schedule one or more PUCCH resources and at least two or more PDSCHs. The DMRS ports in different CDM groups may be individually applied to the plurality of PDSCHs transmitted from the base station, and the DMRS transmission symbol transmitted along with each PDSCH may be positioned in the same symbol.

The base station may maintain the PDCCH beam direction (TCI-states) in a specific CORESET transmitted by the base station for a specific UE in the same beam direction unless separately updated by the MAC CE. In FIGS. 11, 12, 13, and 14, the Nth PDCCH (PDCCH #N) 11-15 transmitted from the base station/TRP A indicates the PDCCH in the CORESET associated with the monitored search space having the lowest CORESET ID in the latest slot. In other words, if the UE does not receive the PDCCH beam change update message, the UE applies the QCL parameter used to receive the Nth PDCCH in the CORESET associated with the monitored search space having the lowest CORESET ID in the latest slot even in receiving the first PDCCH in the same manner. Although it has been described above that the Nth PDCCH is transmitted in different search spaces in the same CORESET and is transmitted in the previous slot to the first PDCCH, it may also be possible to transmit in a different search space in the same slot.

In FIGS. 11, 12, 13, and 14, the first PDCCH and the second PDCCH may indicate allocation of the first PDSCH and the second PDSCH for NC-JT transmission in which case the beamforming direction for the PDSCHs may be varied depending on the beamforming information configured in the higher layer, TCI information for the DCI in the first PDCCH or second PDCCH, antenna port information, or RNTI information. The UE may identify the beamforming direction changed by the base station based on the received beamforming information and DCI information.

Referring to FIG. 11, the beamforming direction of the first PDCCH may differ from the beamforming direction of the first PDSCH for NC-JT transmission and the beamforming direction of the second PDSCH. As another example, the beamforming direction of the first PDCCH may be identical to the beamforming direction of the first PDSCH or the beamforming direction of the second PDSCH for NC-JT transmission. As another example, the base station may set the beamforming direction of the first PDSCH and the beamforming direction of the second PDSCH to differ from each other, considering the spatial beamforming gain.

Described in connection with FIG. 11 are operations of the base station and UE according to the relationship between the timeDurationForQCL and the scheduling timing offset including the number of symbols or duration between the start symbol of the PDSCHs and the last symbol of the first PDCCH received by the UE.

Although the scheduling timing offset is defined herein as the number of symbols between the start symbol of the PDSCH corresponding to the PDCCH and the last symbol of the PDCCH, embodiments of the disclosure are not limited thereto, and it may be defined in other various manners, such as a predetermined number of symbol units or slot units.

Embodiment 1-1

As an example, the base station may not support NC-JT-based transmission, which schedules with a single PDCCH, for a UE in which the tci-PresentinDCI field is not set to 'enabled'. In other words, the base station may allocate only one PDSCH in one PDCCH for the UE in which the tci-PresentinDCI field is not set to 'enabled'. After all, when the base station allocates two or more PDSCHs by scheduling with a single PDCCH for a specific UE, NC-JT-based transmission may be performed only on the UE in which the tci-PresentinDCI field is set to 'enabled'. However, it may be possible to perform NC-JT-based transmission by scheduling with multi-PDCCH, and a description related thereto will be additionally described in connection with Embodiment 5-1.

As another example, the base station may indicate, to the UE in which the tci-PresentinDCI field is not set to 'enabled', NC-JT-based transmission scheduled with a single PDCCH using antenna port information within the single PDCCH. Specifically, the base station may indicate, to the UE, information related to the DMRSs mapped to different CDM groups in the antenna port information to thereby provide information related to the plurality of PDSCHs that the base station are to transmit.

Embodiment 1-2

The base station may support NC-JT-based transmission by scheduling in DCI format 1_1 in a single PDCCH for the UE in which the tci-PresentinDCI field is set to 'enabled'. Further, in the NC-JT-based transmission, the base station may perform data transmission to the UE considering a scheduling time offset (t_so) between the single PDCCH and a plurality of PDSCHs.

11-00 of FIG. 11 indicates an example where the value of t_so scheduled by the base station is 14 or more. When the calculated value of t_so is 14 or more, the base station may determine and operate using at least one of the methods proposed below.

As an example, the base station may transmit the first PDCCH (DCI format 1_1) and the first PDSCH 11-20 and second PDSCH 11-25 allocated by the first PDCCH 11-10 to a specific UE in which the tci-PresentinDCI field is set to 'enabled.' In this case, the base station may transmit both the first PDSCH 11-20 and the second PDSCH 11-25 based on a scheduling algorithm of the base station without considering the timeDurationForQCL of the UE. For example, the base station may indicate a beamforming direction in which the PDSCHs, i.e., the first PDSCH and the second PDSCH, are transmitted using the antenna port information and TCI information in the DCI of the first PDCCH 11-10. In this case, the capability of the UE is not considered during scheduling.

As another example, if the base station determines that it is possible for the UE to receive at least one PDSCH based on the timeDurationForQCL information for the UE and the TCI state-related information for the first PDSCH and the second PDSCH as indicated, the base station may transmit the first PDCCH and the first PDSCH and the second PDSCH allocated by the first PDCCH to the UE for the UE's NC-JT based transmission.

As another example, if the base station determines that it is possible for the UE to receive the two PDSCHs based on the timeDurationForQCL information for the UE and the TCI state-related information for the first PDSCH and second PDSCH as indicated, the base station may transmit the first PDCCH and the first PDSCH and second PDSCH allocated by the first PDCCH to the UE.

Embodiment 2-1

As an example, when the tci-PresentinDCI field is not set to 'enabled', the UE may not expect NC-JT-based transmission. In other words, when the tci-PresentinDCI field is not set to 'enabled' or when DCI format 1_0 is received, the UE may regard it as only one PDSCH corresponding to one PDCCH being transmitted. For example, the UE may determine that the beamforming direction of the first PDCCH is identical to the beamforming direction of the PDSCH indicated by the first PDCCH.

As another example, when the tci-PresentinDCI field is not set to 'enabled', the UE may determine whether to perform NC-JT transmission based on the antenna port information included in the DCI. In other words, the antenna port information may include information on whether the base station transmits a single PDSCH or a plurality of PDSCHs. For example, the UE may determine that at least one of the beamforming direction of the first PDCCH, the beamforming direction of the first PDSCH indicated by the first PDCCH, and the beamforming direction of the second PDSCH is the same. Alternatively, the UE may determine that the beamforming direction of the first PDCCH, the beamforming direction of the first PDSCH indicated by the first PDCCH, and the beamforming direction of the second PDSCH are TCI states set as default.

Embodiment 2-2

When the UE receives a message in which the tci-PresentinDCI field is set to 'enabled' from the base station and receives the DCI format 1_1 of the first PDCCH, the UE may calculate the scheduling time offset (t_so) and compare the calculated time offset (t_so) with the UE capability parameter timeDurationForQCL (e.g., S14) reported to the base station.

11-00 of FIG. 11 indicates an example where the value of t_so calculated by the UE is 14 or more. When the value of t_so is 14 or more, the UE may operate using at least one of the methods proposed below.

As an example, the UE may assume that the TCI field is present in the corresponding DCI and apply the QCL parameters (or QCL parameter sets) of the TCI states indicating the beamforming directions for at least one or more PDSCHs indicated by the TCI codepoint.

As another example, if the information indicated by the TCI codepoint includes one TCI state, the UE may assume that the TCI states for one PDSCH of the two PDSCHs are the same as the TCI of the PDCCH. The UE may receive data by applying QCL parameters for the first PDSCH and the second PDSCH based on the information for the configured TCI field.

11-50 of FIG. 11 shows an example in which the t_so value between the PDCCH and PDSCHs transmitted by the base station is less than 14. When the value of t_so is less than 14, the base station may determine and operate using at least one of the methods proposed below.

Embodiment 3-1

In this embodiment of the disclosure, when the base station does not set the tci-PresentinDCI field to 'enabled', the base station may operate in the same manner as described in Embodiment 1-1.

Embodiment 3-2

In this embodiment of the disclosure, operations when the base station sets the tci-PresentinDCI field to 'enabled' and transmits DCI format 1_1 through the first PDCCH are described.

As an example, the base station may transmit all of the first PDCCH and the first PDSCH and the second PDSCH allocated by the first PDCCH based on a scheduling algorithm of the base station without considering the UE's timeDurationForQCL for NC-JT-based transmission for a specific UE.

For example, the base station may indicate the beamforming direction applied to the PDSCHs, i.e., the first PDSCH and the second PDSCH, using the antenna port information and the TCI information in the DCI transmitted through the first PDCCH. In this case, the UE's capability is not considered in scheduling.

As another example, upon determining that the UE is unable to receive at least one PDSCH based on the TCI state-related information for the first PDSCH and the second PDSCH as indicated and the UE's timeDurationForQCL information for transmission of the first PDCCH and transmission of the first PDSCH and the second PDSCH allocated by the first PDCCH for NC-JT-based transmission for a specific UE, the base station may transmit only receivable PDSCHs (e.g., the first PDSCH (PDSCH #1 of FIG. 11)) to the UE.

As another example, upon determining that the UE is unable to receive at least one PDSCH based on the TCI state-related information for the first PDSCH and the second PDSCH as indicated and the UE's timeDurationForQCL information for transmission of the first PDCCH and transmission of the first PDSCH and the second PDSCH allocated by the first PDCCH for NC-JT-based transmission for a specific UE, the base station may transmit at least one of the first PDSCH and the second PDSCH based on the TCI state (e.g., the TCI state used to receive the first PDCCH (e.g., PDCCH #1 of FIG. 11) or the Nth PDCCH (e.g., PDCCH #N of FIG. 11)) that may be received by the UE, considering the UE's timeDurationForQCL.

As another example, upon determining that the UE is unable to receive at least one PDSCH when only the UE's timeDurationForQCL information is considered, for transmission of the first PDCCH and transmission of the first PDSCH and the second PDSCH for NC-JT-based transmission of a specific UE, the base station may refrain from performing transmission of all the PDSCHs (e.g., the first PDSCH and second PDSCH (PDSCH #1 and PDSCH #2 of FIG. 11)) which are supposed to be transmitted in the PDCCH.

When the UE receives a message in which the tci-PresentinDCI field is set to 'enabled' from the base station and receives DCI format 1_1 through the first PDCCH, the UE may calculate the scheduling time offset (t_so) and compare the calculated scheduling time offset (t_so) with the UE capability parameter timeDurationForQCL (e.g., S14) reported by the UE to the base station.

11-50 of FIG. 11 indicates an example where the value of t_so calculated by the UE is less than 14. When the value of t_so is less than 14, the UE may operate using at least one of the methods proposed below.

Embodiment 4-1

If the scheduling time offset (t_so) value calculated by the UE is smaller than the UE capability parameter timeDurationForQCL (e.g., S14) reported to the base station, the UE may not expect NC-JT-based transmission of the base station.

For example, if the timeDurationForQCL required to apply the TCI state-related QCL parameter indicating the beamforming direction for the PDSCH is not met, the UE may skip all PDSCH reception operations indicated in the PDCCH.

As another example, if the timeDurationForQCL required for the UE to apply the TCI state-related QCL parameter indicating the beamforming direction for the PDSCH is not met, the UE may apply the QCL parameter used to receive the Nth PDCCH in the CORESET associated with the monitored search space having the lowest CORESET ID in the latest slot in receiving the first PDSCH or the second PDSCH. Specifically, the UE may perform decoding, with the QCL parameter applied to both the first PDSCH and the second PDSCH. As a result, if the base station performs NC-JT transmission to which different beamforming directions are applied, the UE may expect to successfully receive, selectively, only one PDSCH of the two PDSCHs, i.e., the first PDSCH and the second PDSCH.

Embodiment 4-2

If the scheduling time offset (t_so) value calculated by the UE is smaller than the UE capability parameter timeDurationForQCL (e.g., S14) reported to the base station, the UE may expect single transmission-based transmission in the base station.

As an example, if the timeDurationForQCL required for the UE to apply the TCI state-related QCL parameter indicating the beamforming direction for the PDSCH is not met, the UE may use the QCL parameter used to receive the Nth PDCCH in the CORESET associated with the monitored search space having the lowest CORESET ID in the latest slot. Accordingly, the UE may receive data in the PDSCH (e.g., the first PDSCH/second PDSCH) allocated to the lowest/highest resource RB of the first PDSCH and the second PDSCH and, at this time, the QCL parameter may be used. As another example, if the timeDurationForQCL required for the UE to apply the TCI state-related QCL parameter indicating the beamforming direction for the PDSCH is not met, the UE may apply the QCL parameter used to receive the Nth PDCCH in the CORESET associated with the monitored search space having the lowest CORESET ID in the latest slot to both the first PDSCH or the second PDSCH. The DMRS port configuration for receiving the first PDSCH and the second PDSCH may be received based on the antenna port information in the DCI.

In the above-described embodiments of the disclosure, the UE expects that one default QCL is set in single PDCCH-based NC-JT transmission in one CORESET.

Additionally, in single PDCCH-based NC-JT within one CORESET, the UE may expect that two or more default QCLs are configured. When the two or more default QCLs are configured, it means that the UE may apply the QCL parameter to the two PDSCHs (e.g., the first PDSCH and the second PDSCH) based on information previously configured by the base station. The QCL parameter to be applied may be implicitly or externally set by the DCI information (e.g., antenna port information and TCI information), MAC CE or RRC information indicated to the UE.

As an example, when the base station configures at least two or more default QCLs per CORESET or per PDCCH-config, the base station may set the respective beamforming directions of the TRPs based on at least two or more default QCLs to be the same beamforming direction on the side of the UE performing the reception operation. Alternatively, each of the plurality of TRPs may set the TCI state assuming that the UE performs the same beamforming. In this case, the UE may determine that the TCI states are the same based on the MAC CE or RRC information internally or externally set by the base station and may perform a reception operation based on the TCI states being the same. The TCI states may be the same or different from each other considering the position and channel of the TRP. In other words, the UE may perform reception beamforming in the same direction by applying the QCL parameter to the two PDSCHs (e.g., the first PDSCH and the second PDSCH).

As another example, when the base station sets at least two or more default QCLs per CORESET or per PDCCH-config, the base station may set the two or more default QCLs to be identical to each other. In other words, although two default QCLs are explicitly set, the two default QCLs may be set to indicate the same beamforming direction. In this case, the UE may identify the same TCI states set by the base station and perform the same beamforming. Alternatively, the UE may perform a reception operation based on one TCI state under the assumption that the plurality of TCI states for the default QCL set by the base station are the same. In other words, the UE may perform reception beamforming in the same direction by applying the QCL parameters, which are set to be the same, to the two PDSCHs (e.g., the first PDSCH and the second PDSCH).

Meanwhile, the base station may sequentially set at least two or more default QCLs per CORESET or per PDCCH-conFIG. Alternatively, in some cases, there may be a state in which two or more default QCLs are not completely set but only one default QCL is set.

As an example, the base station may set the default QCL for the first PDSCH at a first time and may set the default QCL for the second PDSCH at a second time, which is later than the first time, or may set no default QCL for the second PDSCH. In the case where no default QCL for the second PDSCH is not set, if only the default QCL for the first PDSCH set in one ServingCell, PDCCH-config or CORESET (group) per TRP is configured, the UE may determine that the default QCL for the second PDSCH is the same as the default QCL for the first PDSCH. Alternatively, the UE may determine that a default QCL for the second PDSCH is unnecessary and thus determine that it is not scheduled within the scheduling time offset. Alternatively, the UE may determine that transmission of the second PDSCH is not to be performed. In other words, unless the base station configures at least two default QCLs, the UE may assume that at least two or more PDSCHs are not to be transmitted within one slot in the single-DCI-based multi-TRP and determine that at least two or more PDSCHs are to be transmitted within one slot in the plurality of TRPs after at least two default QCLs are configured. FIG. 12 illustrates an embodiment in which the base station transmits the first PDCCH in one CORESET (e.g., CORESET #0 or PDCCH #1) and additionally transmits the second PDCCH in another CORESET (e.g., CORESET #1 or PDCCH #2).

Specifically, the first PDCCH transmitted in TRP-A may schedule one or more PUCCH resources (first PUCCH) and one or more PDSCHs (first PDSCH), and the second PDCCH transmitted in TRP-B may schedule one or more PUCCH resources (second PUCCH) and one or more PDSCHs (second PDSCH). The DMRS ports of different CDM groups may be applied to the PDSCHs transmitted from the base station, and the DMRS transmission symbol transmitted along with each of the PDSCHs may be positioned in the same symbol as the symbol where each PDSCH is transmitted. Although it is assumed that each of the PDSCHs is transmitted in the same symbol as the DMRS transmission symbol, the disclosure is not limited to where each of the PDSCHs is transmitted necessarily in the same symbol as the DMRS transmission symbol.

The plurality of CORESETs may be separately set for the base station to perform multi-DCI-based NC-JT transmission. Alternatively, the plurality of CORESETs may be configured in the form of a set, like a CORESET group, and may be indicated via L1/L2 signaling or higher layer for UEs supporting NC-JT.

As an example, the base station may configure one CORESET group including at least one or more CORESET(s) in a specific UE for multi-DCI-based NC-JT-based transmission. Specifically, the base station may configure four CORESETs in one CORESET group in a specific UE, and thus, the UE may receive two PDCCHs by monitoring the four CORESETs and receive PDSCHs allocated by the received PDCCH.

Referring to FIG. 12, one CORESET group (e.g., CORESET group #0) may be configured in a specific UE by the base station and, among up to five CORESETs (e.g., CORESET #0 to CORESET #4) included in the CORESET group, the UE may monitor CORESET #0 and CORESET #1 for NC-JT purposes. In this case, the CORESET to be monitored by the UE in the CORESET group may be determined according to the configuration of the base station or the configuration of the UE, or arbitrarily. Such method for determining CORESETs to be monitored by the UE within a specific CORESET group may be applied to other embodiments of the disclosure.

As another example, the base station may configure at least two or more CORESET groups including at least one or more CORESET(s) in a specific UE for multi-DCI-based NC-JT-based transmission. For example, the base station may configure two CORESET groups in a specific UE and configure or indicate CORESET(s) in one CORESET group or two CORESET groups from among the configured CORESET groups. Accordingly, the UE may receive two PDCCHs by monitoring the configured CORESET(s) and receive PDSCHs allocated by the received PDCCH. As illustrated in FIG. 12, two CORESET groups (e.g., CORESET group #0 and CORESET group #1) may be configured in a specific UE by the base station and, among the CORESETs in the two CORESET groups, CORESET #0 in CORESET group #0 and CORESET #1 in CORESET group #1 may be monitored by the UE for NC-JT purposes. In this case, the CORESET to be monitored by the UE in the CORESET group may be determined according to the configuration of the base station or the configuration of the UE, or arbitrarily.

CORESET #0 may include a first PDCCH and an Nth PDCCH, and CORESET #1 may include a second PDCCH and an N+1th PDCCH. The CORESETs configured for each CORESET group may be different (e.g., CORESET group #0 may include CORESET #0 and #2, and CORESET group #1 may include CORESET #1, #3, and #5), and the sum of the numbers of the CORESETs configured in all the CORESET groups may be not more than the maximum number of CORESETs that may be configured in the UE, i.e., reported in a UE capability. In the above-described embodiment of the disclosure, the maximum number of CORESETs may be 5 or less.

The base station may maintain the PDCCH beam direction (TCI-states) in a specific CORESET transmitted by the base station for a specific UE to be the same unless updated by the MAC CE.

FIG. 12 illustrates the Nth PDCCH (PDCCH #N)/N1th PDCCH (PDCCH #N 1) transmitted by TRP-A/TRP-B which are PDCCHs in the CORESET associated with the monitored search space having the lowest CORESET ID in the latest slot of the CORESET of each of TRP-A/TRP-B. In other words, if the UE does not receive the PDCCH beam change update message, the UE applies the QCL parameter used to receive the Nth PDCCH/N+1th PDCCH in the CORESET associated with the monitored search space having the lowest CORESET ID in the latest slot even in receiving the first PDCCH/second PDCCH in the same manner.

Although such an example is described above in connection with FIG. 12 that the Nth PDCCH (PDCCH #N)/N1th PDCCH (PDCCH #N 1) are transmitted in the same slot of the first PDCCH/second PDCCH as an embodiment in which they are transmitted in different search spaces in the same CORESET, embodiments of the disclosure do not exclude such a case where they are transmitted in different search spaces in the prior slot.

The first PDCCH and the second PDCCH respectively indicate the allocation of the first PDSCH and the second PDSCH for NC-JT transmission and, in this case, the beamforming directions for the first PDSCH and the second PDSCH may be varied depending on the beamforming information set in the higher layer, the TCI information for the DCI in the first PDCCH and the second PDCCH, antenna port information, or RNTI information. The UE may identify the beamforming direction changed by the base station based on the received beamforming information and DCI information.

As an example, the beamforming direction of the first PDCCH may be different from the beamforming direction of the first PDSCH for NC-JT transmission, and the beamforming direction of the second PDCCH may be different from the beamforming direction of the second PDSCH for NC-JT transmission.

As another example, the beamforming direction of the first PDCCH may be identical to the beamforming direction of the first PDSCH for NC-JT transmission or the beamforming direction of the second PDCCH may be identical to the beamforming direction of the second PDSCH for NC-JT transmission.

As another example, given the spatial beamforming gain, the base station may set the beamforming direction of the first PDSCH to be different from the beamforming direction of the second PDSCH. FIGS. 12, 13, and 14 illustrate operations of the base station and UE depending on the relationship between the timeDurationForQCL and the scheduling timing offset which is duration between the last symbol of the first PDCCH received by the UE and the start symbol of the first PDSCH and the relationship between the timeDurationForQCL and the scheduling time offset which is duration between the last symbol of the second PDCCH and the start symbol of the second PDSCH.

Embodiment 5-1

When the tci-PresentinDCI field is not set to 'enabled' for a specific UE, the base station may perform a scheduling operation for the specific UE without considering the timeDurationForQCL reported in the UE capability report and the scheduling time offset (t_so) for NC-JT-based transmission.

Embodiment 5-2

As an example, when the tci-PresentinDCI field is set to 'enabled' for a specific UE, the base station may perform a scheduling operation for the specific UE without considering the timeDurationForQCL reported in the UE capability report and the scheduling time offset (t_so) for NC-JT-based transmission. The base station may determine whether to change the transmission beam for the NC-JT-based first PDSCH and second PDSCH without considering the capability of the UE. Accordingly, the base station may transmit the first PDSCH and the second PDSCH based on the TCI field information for the PDCCH that allocates the first PDSCH and the second PDSCH.

As another example, when the tci-PresentinDCI field is set to 'enabled' for a specific UE, the base station may perform a scheduling operation for the specific UE, considering the timeDurationForQCL reported in the UE capability report and the scheduling time offset (t_so) for NC-JT-based transmission. The base station may determine the beamforming direction of the first PDSCH and the second PDSCH depending on whether the transmission beams for the NC-JT-based first PDSCH and the second PDSCH are changed.

For example, as illustrated in FIG. 12, the base station may configure, in the UE, CORESET #0 in CORESET group #0 and CORESET #1 in CORESET group #1, for NC-JT purposes, of CORESET group #0 and CORESET group #1 (e.g., CORESET group #0 includes CORESET #0 and #2, and CORESET group #1 includes CORESET #1, #3, and #5), and a beam change occurs for the first PDSCH and the second PDSCH among the PDSCHs to be transmitted in association with the PDCCHs in CORESET #0 and CORESET #1. Here, the base station may perform at least one of comparison between the timeDurationForQCL and the first scheduling time offset which is duration between the first PDCCH and the first PDSCH where a PDSCH beam change occurs in a specific UE or comparison between the timeDurationForQCL and the second scheduling time offset which is duration between the second PDCCH and the second PDSCH. Thus, if the first scheduling time offset and the second scheduling time offset according to the beam change are smaller than the timeDurationForQCL, the base station may operate as follows. According to an embodiment of the disclosure, the base station may apply the QCL parameter used to transmit the Nth PDCCH in the CORESET associated with the monitored search space having the lowest CORESET ID (e.g., CORESET #0 and CORESET #1) in the latest slot in each CORESET group (e.g., CORESET group #0 and CORESET group #1) in transmitting the first PDSCH and apply the QCL parameter used to transmit the N+1th PDCCH in transmitting the second PDSCH.

Specifically, as illustrated in FIG. 12, if PDSCH #1 is scheduled from CORESET group #0, the QCL parameter used for PDCCH #N corresponding to the monitored search space for the lowest CORESET ID in the latest slot in CORESET group #0 is used to transmit PDSCH #1.

If PDSCH #2 is scheduled from CORESET group #1, the QCL parameter used for PDCCH #N+1 is used to transmit PDSCH #2, like in the case where PDSCH #1 is scheduled from CORESET group #0. In other words, the base station may set two CORESET groups for NC-JT and match each CORESET group to a corresponding TRP. The QCL assumption for each PDSCH may be referenced from the corresponding lowest CORESET-ID in the CORESET group.

In an embodiment of the disclosure, the QCL parameter used to transmit the Nth PDCCH in the CORESET associated with the monitored search space with the lowest CORESET ID (e.g., CORESET #0) in the latest slot in the lowest CORESET group (e.g., CORESET group #0) may be applied to each of the transmissions of the first PDSCH and the second PDSCH.

In an embodiment of the disclosure, the QCL parameter used to transmit the Nth PDCCH in the CORESET associated with the monitored search space with the lowest CORESET ID (CORESET #0) in the latest slot in the lowest CORESET group (CORESET group #0) may be applied in transmitting the first PDSCH, and transmission of the second PDSCH may be dropped or may not be performed. In other words, transmission of the PDSCH may be prioritized according to the lowest CORESET ID.

As another example, the base station may set a CORESET for NC-JT purposes in one CORESET group #0 (e.g., CORESET group #0 includes CORESET #0 and CORESET #1). In FIG. 12, it is assumed that CORESET #0 and CORESET #1 are set). An example in which a beam change for the first PDSCH and the second PDSCH occurs among PDSCHs to be transmitted in association with the PDCCH in CORESET #0 and CORESET #1 is described below. When a beam change for the PDSCH occurs in a specific UE, the base station may compare the timeDurationForQCL with the first scheduling time offset which is duration between the first PDCCH and the first PDSCH and compare the timeDurationForQCL with the second scheduling time offset which is duration between the second PDCCH and the second PDSCH. Therefore, in the case where a beam change for the PDSCH occurs, if the first scheduling time offset or the second scheduling time offset is smaller than the timeDurationForQCL, the base station may operate as in various embodiments as follows.

According to an embodiment of the disclosure, the base station may apply the QCL parameter used to transmit the Nth PDCCH in the CORESET associated with the monitored search space based on information for the lowest ID (e.g., CORESET #0) or the next lowest ID (e.g., CORESET #1) in the latest slot in the CORESET group (e.g., CORESET group #0) where a beam change occurs in transmitting the first PDSCH and apply the QCL parameter used to transmit the N+1th PDCCH 12-90 in transmitting the second PDSCH.

According to an embodiment of the disclosure, the base station may apply the QCL parameter used to transmit the Nth PDCCH in the CORESET associated with the monitored search space based on the lowest ID (e.g., CORESET #0) in the latest slot in the CORESET group (e.g., CORESET group #0) where a beam change occurs in transmitting the first PDSCH or the second PDSCH where a beam change occurs.

According to an embodiment of the disclosure, the base station may apply the QCL parameter used to transmit the Nth PDCCH in the CORESET associated with the monitored search space based on information for the lowest ID (e.g., CORESET #0) in the latest slot in the CORESET group (e.g., CORESET group #0) where a beam change occurs in transmitting the first PDSCH and drop or refrain from transmission of the second PDSCH. In other words, transmission of the PDSCH may be prioritized according to the lowest CORESET ID.

In the above-described embodiment of the disclosure, there is a CORESET group (e.g., CORESET group #0 includes CORESET #0 and CORESET #2). In some cases, however, no CORESET group may be present, or no CORESET group is set while only CORESETs are present. Therefore, it may be apparent that the solutions in the above-described embodiments are performed based on CORESET ID, except that no CORESET group is present or set excluded in the operations according to the above-described embodiments.

Although in the above-described embodiments of the disclosure, the lowest CORESET/CORESET group ID is provided, the disclosure may encompass other various embodiments in which a highest CORESET/CORESET group ID is used or provided, as well as the lowest CORESET/CORESET group ID.

As another example, when a beam change occurs for at least one PDSCH of the PDSCHs, e.g., the first PDSCH and the second PDSCH, to be transmitted, the base station may perform at least one of comparison between the first scheduling time offset which is duration between the first PDCCH and the first PDSCH and the timeDurationForQCL or comparison between the second scheduling time offset which is duration between the second PDCCH and the second PDSCH and the timeDurationForQCL on a specific UE and, if both the first scheduling time offset and the second scheduling time offset are smaller than the timeDurationForQCL and the timeDurationForQCL is a specific value (e.g., s7), the base station may select one of the QCL parameter used to transmit the Nth PDCCH and the QCL parameter used to transmit the N+1th PDCCH and commonly apply the selected one to the beam directions for the first PDSCH and the second PDSCH. Methods for selecting one of the QCL parameter used to transmit the Nth PDCCH and the QCL parameter used to transmit the N+1th PDCCH may specifically include selecting the lowest/highest CORESET ID, selecting the PDCCH index allocated in the latest search space, or selecting the longest one considering the time difference in transmission between the PDSCH and the PUCCH transmitting an ACK/NACK of the PDSCH. According to an implementation, the plurality of PDSCHs may be transmitted from TRP-A or TRP-B.

When the UE receives a message in which the tci-PresentinDCI field is set to 'enabled' from the base station and receives DCI format 1_1 through the first PDCCH, the UE may calculate the scheduling time offset (t_so) and compare the calculated time offset (t_so) with the UE capability parameter timeDurationForQCL (e.g., S14) reported to the base station. FIG. 12 illustrates an example where the value of t_so1 and the value of t_so2 calculated by the UE are both less than 14. When the value of t_so is less than 14, the UE may operate according to the methods proposed below.

Embodiment 6-1

As an example, in the case where the UE receives a message in which the tci-PresentinDCI field is set to 'enabled' from the base station and receives DCI format 1_1 through the first PDCCH or the second PDCCH, if the calculated scheduling time offset (t_so) value is smaller than the UE capability parameter timeDurationForQCL (e.g., S14) reported to the base station, the UE may not expect NC-JT-based transmission. For example, if the timeDurationForQCL required to apply the TCI state-related QCL parameter indicating the beamforming direction for the PDSCH is not met, the UE may skip all PDSCH reception operations indicated in the PDCCH, e.g., the first PDCCH or the second PDCCH.

As another example, if none of the timeDurationForQCLs necessary for applying the TCI state-related parameter indicating the beamforming directions for the first PDSCH and the second PDSCH where a beam change occurs are met, the UE may operate as follows, corresponding to embodiment 5-2.

The UE may be configured with a plurality of CORESET groups. In this embodiment of the disclosure, it is assumed that the first PDSCH is allocated in association with the PDCCH in the CORESET in CORESET group #0, and the second PDSCH is allocated in association with the PDCCH in the CORESET in CORESET group #1.

According to an embodiment of the disclosure, the UE may apply first QCL parameter-related information used to receive the Nth PDCCH in the CORESET associated with the monitored search space having the lowest CORESET ID (e.g., CORESET #0 or CORESET #1) in the latest slot in the CORESET group (e.g., CORESET group #0 or CORESET group #1) where a beam change occurs in receiving the first PDSCH and apply second QCL parameter-related information used to receive the N+1th PDCCH in receiving the second PDSCH. Specifically, the UE may perform decoding by applying the first QCL parameter-related information and the second QCL parameter-related information to the first PDSCH and the second PDSCH, respectively.

As an embodiment of the disclosure, the UE may apply the first QCL parameter-related information used to receive the Nth PDCCH in the CORESET associated with the monitored search space having the lowest CORESET ID (e.g., CORESET #0) in the latest slot in the lowest CORESET group among CORESET groups (e.g., CORESET group #0 and CORESET group #1) where a beam change occurs in both reception of the first PDSCH and reception of the second PDSCH.

According to an embodiment of the disclosure, the UE may apply the first QCL parameter-related information used to receive the Nth PDCCH in the CORESET associated with the monitored search space having the lowest CORESET ID (e.g., CORESET #0) in the latest slot in the lowest CORESET group among the CORESET groups (e.g., CORESET group #0 and CORESET group #1) where a beam change occurs in receiving the first PDSCH and drop or refrain from reception of the second PDSCH. In other words, reception of the PDSCH may be prioritized according to the lowest CORESET ID.

As another example, if none of the timeDurationForQCLs necessary for applying the TCI state-related parameter indicating the beamforming directions for the first PDSCH and the second PDSCH where a beam change occurs are met, the UE may operate as follows, corresponding to embodiment 5-2.

The UE may be configured with a plurality of CORESET groups. In this embodiment of the disclosure, it is assumed that the first PDSCH and the second PDSCH are allocated in association with the PDCCHs in CORESET group #0 (e.g., CORESET group #0 includes CORESET #0 to CORESET #4).

According to an embodiment of the disclosure, the UE may apply the QCL parameter used to receive the Nth PDCCH in the CORESET associated with the monitored search space based on information for the lowest CORESET ID (e.g., CORESET #0) or/and the next lowest ID (e.g., CORESET #1) in the latest slot in the CORESET group (e.g., CORESET group #0) where a beam change occurs in receiving the first PDSCH or/and apply the QCL parameter used to receive the N+1th PDCCH in receiving the second PDSCH.

Specifically, in FIG. 12, if PDSCH #1 is scheduled from CORESET group #0, the UE uses the QCL parameter used for PDCCH #N corresponding to the monitored search space for the lowest CORESET ID in the latest slot in CORESET group #0 in receiving PDSCH #1. If PDSCH #2 is scheduled from CORESET group #1, the UE uses the QCL parameter used for PDCCH #N+1 in receiving PDSCH #2, like in the description of reception of PDSCH #1.

According to an embodiment of the disclosure, the UE may apply the QCL parameter used to receive the Nth PDCCH in the CORESET associated with the monitored search space based on information for the lowest ID (e.g., CORESET #0) in the latest slot in the CORESET group (e.g., CORESET group #0) where a beam change occurs in receiving the first PDSCH or/and the second PDSCH where a beam change occurs.

According to an embodiment of the disclosure, the UE may apply the QCL parameter used to receive the Nth PDCCH in the CORESET associated with the monitored search space based on information for the lowest ID (e.g., CORESET #0) in the latest slot in the CORESET group (e.g., CORESET group #0) where a beam change occurs in receiving the first PDSCH and drop or refrain from reception of the second PDSCH. In other words, reception of the PDSCH may be prioritized according to the lowest CORESET ID.

Although the above-described embodiments consider the lowest CORESET ID, the disclosure may also encompass embodiments in which the highest CORESET ID is considered, as well as the lowest CORESET ID.

In the above-described embodiment of the disclosure, there is a CORESET group (e.g., CORESET group #0 includes CORESET #0 through CORESET #4). In some cases, however, no CORESET group may be present, or no CORESET group is set while only CORESETs are present. Therefore, it may be apparent that the solutions in the above-described embodiments are performed based on CORESET ID, except that no CORESET group is present or set excluded in the operations according to the above-described embodiments.

As another example, if none of the timeDurationForQCLs necessary for the UE to apply the TCI state-related QCL parameter indicating the beamforming directions for the first PDSCH and the second PDSCH, the UE may select at least one of the first QCL parameter-related information and second QCL parameter-related information used to receive the Nth PDCCH in the CORESET associated with the monitored search space having the lowest CORESET ID in the latest slot in each CORESET and apply the selected QCL parameter-related information to both the first PDSCH and the second PDSCH to thereby perform decoding. Methods for selecting at least one of the first QCL parameter-related information and the second QCL parameter-related information may specifically include selecting the lowest/highest CORESET ID among the plurality of CORESETs, selecting the PDCCH index allocated in the latest search space, or selecting the longest one considering the time difference in transmission between the PDSCH and the PUCCH transmitting an ACK/NACK of the PDSCH. According to an implementation, the plurality of PDSCHs may be transmitted from TRP-A or TRP-B.

Embodiment 6-2

As an example, when the tci-PresentinDCI field is not set to 'enabled' or the UE receives DCI format 1_0 from the base station, the UE may receive a plurality of PDSCHs based on NC-JT transmission without considering the timeDurationForQCL reported via the UE capability report. In other words, when the tci-PresentinDCI field is not set to 'enabled' or when the UE receives DCI format 1_0 from the base station, the UE may regard it as only one PDSCH being allocated and transmitted in one PDCCH. For example, the UE may determine that the beamforming direction for the first PDCCH and the beamforming direction for the first PDSCH indicated by the first PDCCH are identical to each other and that the beamforming direction for the second PDCCH and the beamforming direction for the second PDSCH indicated by the second PDCCH are identical to each other.

As another example, if the tci-PresentinDCI field is not set to 'enabled,' the UE may determine that NC-JT transmission-based PDSCH transmission is not supported.

13-00 of FIG. 13 illustrates an example where one of the values of t_so1 and t_so2 calculated by the UE is less than 14. According to an embodiment of the disclosure, when the value of t_so2 of the plurality of t_so values, i.e., the value of t_so1 and the value of t_so2, is less than 14, the base station and the UE may operate based on the method proposed below.

Embodiment 7-1

As described above in connection with embodiment 5-1, if the tci-PresentinDCI field is not set to 'enabled' for a specific UE, the base station may perform scheduling without the scheduling time offset (t_so) and the timeDurationForQCL reported in the UE capability report, for NC-JT-based transmission.

Embodiment 7-2

As an example, as described above in connection with embodiment 5-2, when the tci-PresentinDCI field is set to 'enabled' for a specific UE, the base station may perform a scheduling operation without considering the timeDurationForQCL reported in the UE capability report and the scheduling time offset (t_so) for NC-JT-based transmission.

As another example, when the tci-PresentinDCI field is set to 'enabled' for a specific UE, the base station may perform a scheduling operation, considering the timeDurationForQCL reported in the UE capability report and the scheduling time offset (t_so) for NC-JT-based transmission. The base station may determine the beamforming direction of the first PDSCH and the second PDSCH depending on whether the transmission beams for the NC-JT-based first PDSCH and the second PDSCH are changed.

Referring to FIG. 13, the base station may configure CORESET #0 included in CORESET group #0 and CORESET #1 included in CORESET group #1, as the UE's CORESETs, for NC-JT purposes, of CORESET group #0 and CORESET group #1 (e.g., CORESET group #0 includes CORESET #0 and #2, and CORESET group #1 includes CORESET #1, #3, and #5), and a beam change occurs for the first PDSCH and the second PDSCH among the PDSCHs to be transmitted in association with the PDCCHs in the CORESETs, i.e., CORESET #0 included in CORESET group #0 and CORESET #1 included in CORESET group #1. Here, the base station may perform at least one of comparison between the first scheduling time offset (t_so1) which is duration between the first PDCCH and the first PDSCH and the timeDurationForQCL or comparison between the second scheduling time offset (t_so2) which is duration between the second PDCCH and the second PDSCH and the timeDurationForQCL. When one of the first scheduling time offset and the second scheduling time offset is less than timeDurationForQCL, the following operations may be performed. In this embodiment of the disclosure, it is assumed that t_so2 is less than timeDurationForQCL.

According to an embodiment of the disclosure, the base station may apply the QCL parameter used to transmit the N+1th PDCCH in the CORESET associated with the monitored search space having the lowest CORESET ID (e.g., CORESET #1) in the latest slot based on the CORESET group (e.g., CORESET group #1) in which the scheduling time offset value is smaller than the timeDurationForQCL among the CORESET groups (e.g., CORESET group #0 and the CORESET group #1) and the CORESET ID in the group in transmitting the second PDSCH.

Specifically, in FIG. 13, when PDSCH #2 is scheduled from CORESET group #1, the QCL parameter used for PDCCH #N+1 corresponding to the monitored search space for the lowest CORESET ID in the latest slot in the CORESET group is used to transmit PDSCH #2.

According to an embodiment of the disclosure, the base station may apply the QCL parameter used to transmit the Nth PDCCH in the CORESET associated with the monitored search space having the lowest CORESET ID (e.g., CORESET #0) in the latest slot in the lowest CORESET group (CORESET group #0) among the CORESET groups (e.g., CORESET group #0 and CORESET group #1) in transmitting the second PDSCH.

According to an embodiment of the disclosure, the base station may apply the QCL parameter according to the beamforming direction indicated in the CORESET (e.g., CORESET #0) in the CORESET group (e.g., CORESET group #0) in which the scheduling time offset value is equal to or larger than the timeDurationForQCL, i.e., information for the TCI field via the second PDCCH, the beamforming direction of the PDSCH (second PDSCH) scheduled in the CORESET (e.g., CORESET #1) in the CORESET group (e.g., CORESET group #1) in which the scheduling time offset value is smaller than timeDurationForQCL. In this case, if the change in beamforming direction is not indicated via the first PDCCH, the base station may apply the QCL parameter of the first PDCCH (or first PDSCH) to the second PDSCH.

According to an embodiment of the disclosure, the base station may compare t_so1 with timeDurationForQCL or compare t_so2 with timeDurationForQCL regardless of each CORESET group and, if either t_so1 or t_so2 is smaller than timeDurationForQCL, the base station may refrain from (stop or skip) transmission of the PDSCH (e.g., the second PDSCH) scheduled in the CORESET (e.g., CORESET #1) corresponding to the scheduling time offset smaller than the timeDurationForQCL to a specific UE.

As another example, such a case is described in which the base station may configure CORESETs (CORESET #0 and CORESET #1) for NC-JT purposes in one CORESET group #0 (e.g., CORESET group #0 includes CORESET #0 and CORESET #1) for a specific UE and a beam change occurs for at least one PDSCH among the PDSCHs to be transmitted in association with the PDCCH in the CORESETs, i.e., CORESET #0 and CORESET #1. Here, the base station may perform at least one of comparison between the first scheduling time offset which is duration between the first PDSCH and first PDCCH where a beam change occurs for the PDSCH and the timeDurationForQCL or comparison between the second scheduling time offset which is duration between the second PDCCH and the second PDSCH and the timeDurationForQCL. If the first scheduling time offset or the second scheduling time offset when a beam change occurs for the PDSCH is smaller than the timeDurationForQCL, the base station may operate as in various embodiments as follows.

According to an embodiment of the disclosure, the base station may apply the QCL parameter used to transmit the Nth PDCCH in the CORESET associated with the monitored search space having the lowest CORESET ID (e.g., CORESET #0) in the latest slot based on the CORESET ID corresponding to the scheduling time offset smaller than the timeDurationForQCL in the CORESET group (e.g., CORESET group #0) in transmitting the second PDSCH.

According to an embodiment of the disclosure, the base station may apply the QCL parameter used to transmit the Nth PDCCH in the CORESET associated with the monitored search space having the lowest CORESET ID (e.g., CORESET #0) in the latest slot in the lowest CORESET group (CORESET group #0) among the CORESET groups (e.g., CORESET group #0) in transmitting the second PDSCH.

According to an embodiment of the disclosure, the base station may apply the QCL parameter according to the beamforming direction indicated in the CORESET (e.g., CORESET #0) corresponding to the scheduling time offset equal to or larger than the timeDurationForQCL, i.e., information for the TCI field indicated via the second PDCCH, the beam direction of the PDSCH (second PDSCH) scheduled in the CORESET (e.g., CORESET #1) corresponding to the scheduling time offset smaller than the timeDurationForQCL for NC-JT transmission. In this case, if the base station does not indicate a change in beam direction via the first PDCCH, the second PDSCH may apply the QCL parameter of the first PDCCH (or first PDSCH).

According to an embodiment of the disclosure, the base station may compare t_so1 with timeDurationForQCL or compare t_so2 with timeDurationForQCL, for a specific UE, regardless of each CORESET group for NC-JT transmission and, if either t_so1 or t_so2 is smaller than timeDurationForQCL, the base station may not transmit the PDSCH (e.g., the second PDSCH) scheduled in the CORESET (e.g., CORESET #1) corresponding to the scheduling time offset smaller than the timeDurationForQCL.

In the above-described embodiment of the disclosure, there is a CORESET group (e.g., CORESET group #0 includes CORESET #0 and CORESET #2). In some cases, however, no CORESET group may be present, or no CORESET group is set while only CORESETs are present. Therefore, it may be apparent that the solutions in the above-described embodiments are performed based on CORESET ID, except that no CORESET group is present or set excluded in the operations according to the above-described embodiments.

Although the above-described embodiments consider the lowest CORESET/CORESET group ID, the disclosure may also encompass embodiments in which the highest CORESET/CORESET group ID is considered, as well as the lowest CORESET/CORESET group ID.

Embodiment 8-1

In the case where the UE receives a message in which the tci-PresentinDCI field is set to 'enabled' from the base station and receives DCI format 1_1 through the first PDCCH or the second PDCCH, if the calculated scheduling time offset (t_so) value is smaller in one CORESET than the UE capability parameter timeDurationForQCL (e.g., S14) reported to the base station, the UE may not expect NC-JT-based transmission. For example, when the value of t_so1 is 14 or more and the value of t_so2 is less than 14, the UE may determine that the base station does not perform NC-JT-based transmission. In other words, if the timeDurationForQCL required to apply the TCI state-related QCL parameter indicating the beamforming direction for the second PDSCH is not met, the UE may skip the second PDSCH reception operation indicated in the second PDCCH.

Embodiment 8-2

In the case where the UE receives a message in which the tci-PresentinDCI field is set to 'enabled' from the base station and receives DCI format 1_1 through the first PDCCH or the second PDCCH, if the calculated scheduling time offset (t_so) value in one CORESET is smaller than the UE capability parameter timeDurationForQCL (e.g., S14) reported to the base station, the UE may consider NC-JT-based transmission of the base station as follows, corresponding to embodiment 7-2. The UE may be configured with a plurality of CORESET groups. In this embodiment of the disclosure, it is assumed that the first PDSCH is allocated in association with the PDCCH in the CORESET in CORESET group #0, and the second PDSCH is allocated in association with the PDCCH in the CORESET in CORESET group #1.

According to an embodiment of the disclosure, when the value of t_so1 in the CORESET in CORESET group #0 is 14 or more and the value of t_so2 in the CORESET in CORESET group #1 is less than 14, the UE may determine that the base station performs NC-JT-based transmission. In other words, if the timeDurationForQCL necessary for applying the TCI state-related QCL parameter indicating the beamforming direction for the second PDSCH is not met, the UE may apply the QCL parameter used to receive the N+1th PDCCH in the CORESET associated with the monitored search space having the lowest CORESET ID (e.g., CORESET #1) in the latest slot based on the CORESET group (e.g., CORESET group #1) in which the timeDurationForQCL is smaller than t_so2 and the CORESET ID in receiving the second PDSCH.

In an embodiment of the disclosure, when the value of t_so1 in the CORESET in CORESET group #0 is 14 or more and the value of t_so2 in the CORESET in CORESET group #1 is less than 14, the UE determine that the base station performs NC-JT-based transmission. In other words, the UE may apply the QCL parameter used to receive the Nth PDCCH in the CORESET associated with the monitored search space having the lowest CORESET ID (e.g., CORESET #0) in the latest slot in the lowest CORESET group (CORESET group #0) among the CORESET groups (e.g., CORESET group #0 and CORESET group #1) in receiving the second PDSCH.

In an embodiment of the disclosure, when the value of t_so1 in the CORESET in CORESET group #0 is 14 or more and the value of t_so2 in the CORESET in CORESET group #1 is less than 14, the UE determine that the base station performs NC-JT-based transmission. In other words, the UE may apply the QCL parameter according to the beamforming direction indicated in the CORESET (e.g., CORESET #0) in the CORESET group (e.g., CORESET group #0) corresponding to the scheduling time offset equal to or smaller than the timeDurationForQCL, i.e., information for the TCI field indicated in the second PDCCH, the beam direction of the PDSCH (second PDSCH) scheduled in the CORESET (e.g., CORESET #1) in the CORESET group (e.g., CORESET group #1) corresponding to the scheduling time offset smaller than the timeDurationForQCL. In this case, if the base station does not indicate a change in beam direction in the first PDCCH, the second PDSCH may apply the QCL parameter of the first PDCCH (or first PDSCH).

According to an embodiment of the disclosure, the base station may compare t_so1 with timeDurationForQCL or compare t_so2 with timeDurationForQCL regardless of each CORESET group and, if either t_so1 or t_so2 is smaller than timeDurationForQCL, the base station may not transmit the PDSCH (e.g., the second PDSCH) scheduled in the CORESET (e.g., CORESET #1) corresponding to the scheduling time offset smaller than the timeDurationForQCL to a specific UE.

As another example, in the case where the UE receives a message in which the tci-PresentinDCI field is set to 'enabled' from the base station and receives DCI format 1_1 through the first PDCCH or the second PDCCH, if the calculated scheduling time offset (t_so) value in one CORESET is smaller than the UE capability parameter timeDurationForQCL (e.g., S14) reported to the base station, the UE may consider NC-JT-based transmission of the base station as follows, corresponding to embodiment 7-2. Described below is a case in which CORESETs (e.g., CORESET #0 and CORESET #1) may be configured in the UE in one CORESET group, e.g., CORESET group #0 (e.g., CORESET group #0 includes CORESET #0 through CORESET #4) for NC-JT purposes, and a beam change occurs in at least one PDSCH among the PDSCHs to be transmitted in association with the PDCCHs in the CORESETs. However, the disclosure is not limited to thereto, and the number of CORESETs configured in the UE may be changed according to the settings of the base station.

According to an embodiment of the disclosure, the UE may apply the QCL parameter used to receive the Nth PDCCH in the CORESET associated with the monitored search space having the lowest CORESET ID (e.g., CORESET #0) in the latest slot based on the CORESET ID corresponding to the scheduling time offset smaller than the timeDurationForQCL in the configured CORESET group (e.g., CORESET group #0) in receiving the second PDSCH.

According to an embodiment of the disclosure, the UE may apply the QCL parameter used to receive the Nth PDCCH in the CORESET associated with the monitored search space having the lowest CORESET ID (e.g., CORESET #0) in the latest slot in the lowest CORESET group (CORESET group #0) among the CORESET groups (e.g., CORESET group #0) in receiving the second PDSCH.

According to an embodiment of the disclosure, the UE may apply the QCL parameter according to the beamforming direction indicated in the CORESET (e.g., CORESET #0) corresponding to the scheduling time offset equal to or larger than the timeDurationForQCL, i.e., information for the TCI field indicated in the second PDCCH, the beam direction of the PDSCH (second PDSCH) scheduled in the CORESET (e.g., CORESET #1) corresponding to the scheduling time offset smaller than the timeDurationForQCL for NC-JT transmission. In this case, if the base station does not indicate a change in beam direction in the first PDCCH, the QCL parameter of the first PDCCH (or first PDSCH) may be applied to the second PDSCH.

According to an embodiment of the disclosure, the base station may compare t_so1 with timeDurationForQCL or compare t_so2 with timeDurationForQCL regardless of each CORESET group for NC-JT transmission and, if either t_so1 or t_so2 is smaller than timeDurationForQCL, the base station may not transmit the PDSCH (e.g., the second PDSCH) scheduled in the CORESET (e.g., CORESET #1) corresponding to the scheduling time offset smaller than the timeDurationForQCL to a specific UE.

In the above-described embodiment of the disclosure, there is a CORESET group (e.g., CORESET group #0 includes CORESET #0 and CORESET #2). In some cases, however, no CORESET group may be present, or no CORESET group is set while only CORESETs are present. Therefore, it may be apparent that the solutions in the above-described embodiments are performed based on CORESET ID, except that no CORESET group is present or set excluded in the operations according to the above-described embodiments.

Although the above-described embodiments consider the lowest CORESET/CORESET group ID, the disclosure may also encompass embodiments in which the highest CORESET/CORESET group ID is considered, as well as the lowest CORESET/CORESET group ID.

Embodiment 8-3

As an example, when the tci-PresentinDCI field is not set to 'enabled' or the UE receives DCI format 1_0 from the base station, the UE may receive a plurality of PDSCHs based on NC-JT transmission without considering the time-DurationForQCL reported via the UE capability report. In other words, when the DCI format 1_0 is received, the UE may consider that only one PDSCH allocated by one PDCCH is transmitted by the base station. For example, the UE may determine that the beamforming direction of the first PDCCH is identical to the beamforming direction of the first PDSCH indicated by the first PDCCH and that the beamforming direction of the second PDCCH is identical to the beamforming direction of the second PDSCH indicated by the second PDCCH.

As another example, if the tci-PresentinDCI field is not set to 'enabled,' the UE may determine that NC-JT transmission-based PDSCH transmission is not supported.

13-50 of FIG. 14 shows an example in which both the value of duration (t_so1) between the last symbol of the first PDCCH and the start symbol of the first PDSCH, calculated by the UE and the value of duration (t_so2) between the last symbol of the first PDCCH and the start symbol of the first PDSCH are 14 or more in which case the base station and the UE may operate according to at least one of the methods proposed below.

Embodiment 9-1

As an example, when the above condition is met, i.e., when the value of duration (t_so1) between the last symbol of the first PDCCH and the start symbol of the first PDSCH, calculated by the UE, and the value of duration (t_so2) between the last symbol of the first PDCCH and the start symbol of the first PDSCH both are 14 or more, the base station may always set the tci-PresentinDCI field to 'enabled' upon NC-JT transmission. Alternatively, when the tci-PresentinDCI field is set to 'enabled', the base station may set a scheduling time so that the above time condition is always met during NC-JT transmission.

In the case where the tci-PresentinDCI field is set to 'enabled' by the base station, and DCI format 1_1 is received via the first PDCCH or the second PDCCH, if the scheduling time offset (t_so) value calculated by the UE is equal to or larger than the UE capability parameter timeDuration-ForQCL (e.g., S14) reported to the base station, the UE applies the QCL assumption indicated by the TCI field in the PDCCH (or DCI) to the PDSCH DMRS port. For example, the UE may apply TCI state-related QCL parameters for the first PDSCH and the second PDSCH based on the TCI field information for each DCI in the first PDCCH and the second PDCCH to change the beamforming direction for the PDSCH. Even if a CORESET group is configured, the operations in embodiment 9-1 may be easily inferred and applied as described in connection with embodiment 8.

Embodiment 9-2

For example, when the base station does not set the tci-PresentinDCI field to 'enabled' or transmits DCI format 1_0 to the UE, the base station may not perform scheduling for NC-JT transmission. As a result, when the tci-PresentinDCI field is not set to 'enabled' or when DCI format 1_0 is received from the base station, the UE may regard it as the base station transmitting only one PDSCH allocated by one PDCCH. For example, the UE may determine that the beamforming direction of the first PDCCH is identical to the beamforming direction of the first PDSCH indicated by the first PDCCH and that the beamforming direction of the second PDCCH is identical to the beamforming direction of the second PDSCH indicated by the second PDCCH.

In the above-described embodiments of the disclosure, the UE may expect to set one or more default QCLs in NC-JT transmission based on multiple PDCCHs within one CORE-SET.

Figure 15:
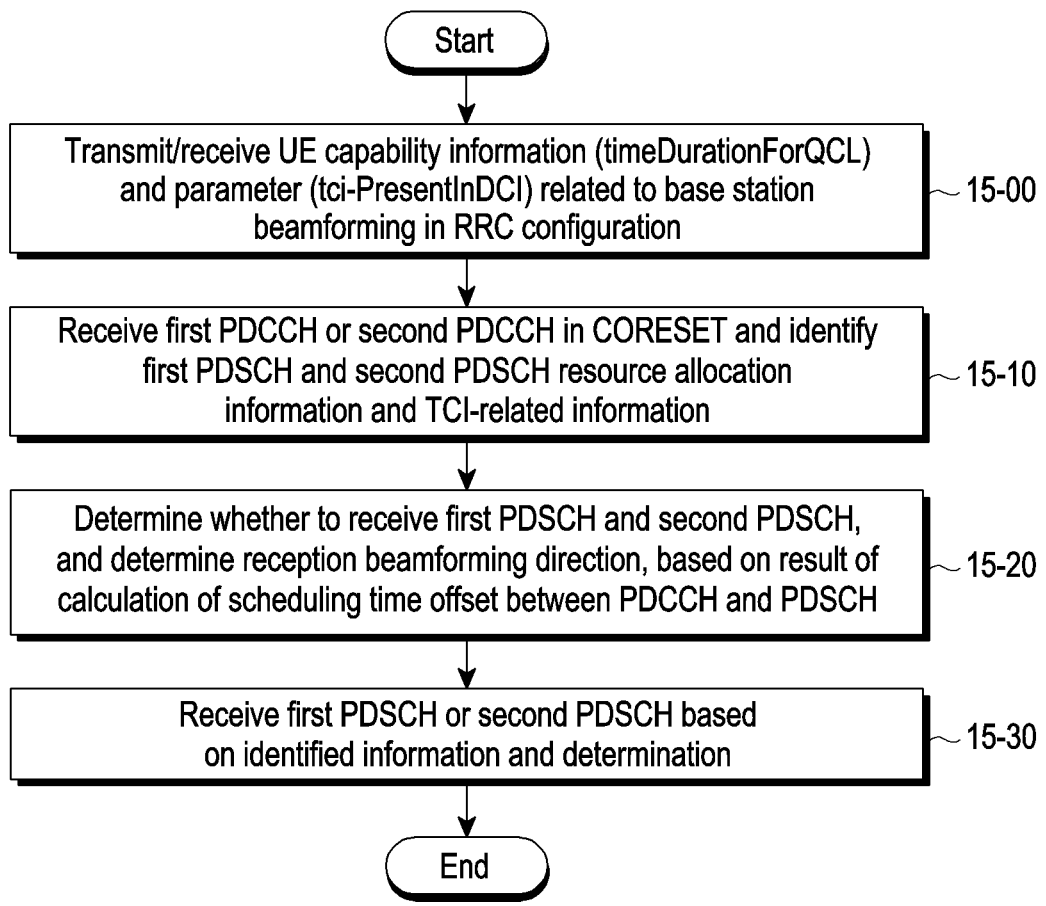
FIG. 15 is a flowchart illustrating a method for operating a UE according to an embodiment of the disclosure.

FIG. 15 is a flowchart illustrating a method for operating a UE according to an embodiment of the disclosure.

Referring to FIG. 15, a method for receiving a PDSCH based on NC-JT transmission by a UE and a default QCL assumption.

In operation 15-00, the UE may receive at least one configuration information including at least one of parameters (e.g., tci-PresentinDCI) related to base station beamforming and parameters or configuration information (e.g., PDDCH-config and PDSCH-config) for a control channel and a data channel during an RRC setup process with the base station.

Further, in operation 15-00, the UE may transmit UE capability information (e.g., timeDurationForQCL) to the base station. The UE may transmit the UE capability information at a request of the base station or at a predetermined time (e.g., during an RRC setup process with the base station). Accordingly, when the base station receives the capability information for the UE, the operation of receiving the capability of the UE by the base station may be omitted. Alternatively, the operation of receiving the capability of the UE by the base station may be omitted according to the configuration information.

Thereafter, the UE receives the first PDCCH or the second PDCCH in a specific CORESET based on the configuration information from the base station.

Further, in operation 15-10, the UE may identify at least one of resource allocation information for the first PDSCH or the second PDSCH, TCI-related information, and antenna port information based on the first PDCCH or the second PDCCH.

Based on the identified information, the UE may calculate a scheduling time offset between the PDCCH and the PDSCH (at least one of between the first PDDCH and the first PDSCH or between the second PDCCH and the second PDSCH) and, based on a result of the calculation, in operation 15-20, the UE may determine at least one of a reception operation (or reception operation method) for the first PDSCH or the second PDSCH or a reception beamforming direction for the first PDSCH or the second PDSCH. In this case, the operation of determining a reception operation method for the first PDSCH or the second PDSCH by the UE may include determining at least one of the operation of determining whether to receive data via at least one of the first PDSCH or the second PDSCH or, when it is determined to receive data via at least one of the first PDSCH or the second PDSCH, a method for receiving data via at least one of the first PDSCH or the second PDSCH.

In operation 15-30, the UE may receive data via the first PDSCH or the second PDSCH corresponding to the first PDCCH or the second PDCCH based on at least one of the identified information in operation 15-10 and the result of determination in operation 15-20.

The UE may perform decoding on the received data.

Table 16 shows a simplified abstract syntax notation (ASN. 1) structure of a serving cell. The following embodiments are described based on the high-level information elements and field information described in connection with Table 16 to distinguish between the configuration of multi-TRP and multi-TRP for NC-JT-based transmission.

In Table 16, ServingCell may be mapped to each cell index through ServingCellIndex. Here, ServingCellIndex means the ID of the serving cell and may be 0 when the serving cell is the primary cell (PCell) of the master cell group, a value set as the servCellIndex of the SpCellConfig information element (IE) when it is the primary secondary cell group (SCG) cell (primary SCG cell (PSCell)), or the SCellIndex of the SCellConfig IE when it is a secondary cell (SCell).

Further, physCellId indicates the physical cell identifier for the serving cell, and the corresponding cell identifier may be a value set in the ServingCellConfigCommon IE. A transmission resource configuration, such as the downlink transmission channel-related configuration of the serving cell and BWP, may be defined by IEs, such as absolute radio-frequency channel number (ARFCN), PDSCH-ServingCellConfig, BWP, PDCCH-Config, and PDSCH-ConFIG. Similarly, an uplink transmission-related component of the corresponding serving cell may be defined by IEs, such as ARFCN, PUSCH-ServingCellConfig, BWP, PUCCH-Config, and PUSCH-ConFIG. For NC-JT-based multi-TRP transmission, a pair or set of TRPs may be configured based on the parameters or IEs of Table 16.

For example, for NC-JT-based multi-TRP transmission, the pair or set of TRPs may configure or classify TRPs in units of ServingCell IE. In this case, when the TRPs are classified based on each ServingCell, NC-JT-based transmission may constitute a pair or set of different ServingCells, and if a change is required, an additional combination and change may be performed. In other words, a plurality of base stations may be operated, with each TRP mapped to a different ServingCell object. Further, a pair or set of ServingCells may be configured and separate higher layer parameters may be configured. Here, multi-TRPs for NC-JT may have the same SSB carrier or SCS-SpecificCarrier. Further, the multi-TRPs may include the same SCS, the same carrier BW, and the same point A (a common reference point for resource block grids or the lowest subcarrier of common RB 0).

As another example, for NC-JT-based multi-TRP transmission, the pair or set of TRPs may configure or classify TRPs in units of PDCCH-conFIG. In this case, since the multi-TRPs are already configured with the same ServingCell, the UE may determine that the multi-TRPs are the same cell. If the base station configures a pair or set of TRPs for the NC-JT based on the PDDCH-config, the UE may determine a configuration and change of the TRP through a configuration and change of the PDCCH-config through an RRC configuration or reconfiguration process. In other words, at least two or more TRPs may set a plurality of CORESETs and SearchSpaces through the PDCCH-config and may additionally allocate different scrambling IDs or different time/frequency resources. In this case, up to 5 CORESETs may be used per PDCCH-config for URLLC purposes, and TCI states independent from each other may be set for PDCCH diversity performance.

As another example, for NC-JT-based multi-TRP transmission, the pair or set of TRPs may configure or classify TRPs in units of CORESETs or CORESET groups. In this case, since the multi-TRPs are already configured with the same ServingCell, the UE may determine that the multi-TRPs are the same cell. If the base station configures a pair or set of TRPs for the NC-JT in CORESET or CORESET group units, the UE may determine a configuration and change of the TRP through a configuration and change of the PDCCH-config CORESET (index) or CORESET group (index) through an RRC configuration or reconfiguration process. In other words, for transmission of at least two or more TRPs, the CORESET indexes may be associated with each other, or the CORESETs of the TRPs may be operated in association with each other using the CORESET group index set to each CORESET.

The maximum number of CORESETs that may be set in the same TRP may be determined by the capability of the UE, and the base station may set a candidate of the maximum number of the CORESETs to 3 to the minimum or 5 (e.g., in a URLLC scenario case) to the maximum considering the value of the capability of the UE. Further, the maximum number of CORESET groups (index) supported by the UE may be set to be less than or equal to the maximum number of CORESETs set in the UE. UEs that support NC-JT in Rel-16 supports up to two CORESET groups. The UE may store the set CORESET group (index) in a memory according to the capability value of the UE and perform management based thereupon.

When a higher layer index is set for each CORESET, in the case of multi-DCI-based operation, if multiple dataScramblingIdentityPDSCH parameters are set, each dataScramblingIdentityPDSCH is associated with a higher layer index for each CORESET and is applied to the PDSCH that has scheduled the DCI identified in the CORESET having the same higher layer index.

TABLE 16

```
1> ServingCell
    2> ServingCellIndex
    2> physCellId
    2> downlink
        3> ARFCN
        3> PDSCH-ServingCellConfig
            4> pucch-Cell
        3> BWP
            4> PDCCH-Config
                5> CORESET
                    6> pdcch-DMRS-ScramblingID
                5> SearchSpace
            4> PDSCH-Config
                5> dataScramblingIdentityPDSCH
                5> DMRS
                    6> scramblingID0
                    6> scramblingID1
                5> TCI-States
    2> uplink
        3> ARFCN
        3> BWP
            4> PUCCH-Config
            4> PUSCH-Config
                5> dataScramblingIdentityPUSCH
                5> DMRS
                    6> scramblingID0
                    6> scramblingID1
            4> SRS-Config
            4> RACH-Config
```

Various embodiments of the disclosure describe operations for determining a default QCL in the base station and the UE. In the description of various embodiments above, a situation in which the beam for transmitting the PDCCH and the beam for transmitting the PDSCH are the same has been considered. Meanwhile, the TRP may be configured (decoupled) so that the PDCCH beam (the beam transmitting the PDCCH) and the PDSCH beam (the beam transmitting the PDSCH) are different from each other depending on the settings in the TRP. Such examples may include when the PDCCH beam and the PDSCH have different beam widths, e.g., when the width of the PDCCH beam is broad while the width of the PDSCH beam is narrow, or when different beams or adjacent beams are set although their beam widths are the same. At least two or more beam widths, as operated by the base station, may be set (e.g., level 1: broad beam, level 2: normal beam, level 3: narrow beam, or the like) and, in this case, the base station may primarily set and use a broad beam, such as of level 1 and, for beams for transmitting the PDSCH, set and use narrow beams of level 2 or 3, as well as level 1, for UE(s) requiring an increased throughput.

As such, although the beam for the TRP to transmit the PDCCH and the beam for the TRP to transmit the PDSCH are set to be different from each other, the UE may perform a PDSCH reception operation in a similar manner to the method specified in Rel-15. As an example, if the scheduling time offset (t_so) value calculated from the time of reception of control information including the information of allocating the PDSCH via the CORESET to the time of reception of the allocated PDSCH is smaller than the UE capability parameter timeDurationForQCL (e.g., 14 symbols) reported to the base station, the UE may apply the QCL assumption (i.e., the same QCL parameter) applied to the lowest CORESET ID in the latest monitoring time (slot or occasion) in receiving the PDSCH.

However, the above-described embodiment may be appropriate for the contexts where the beams transmitting different PDCCHs and the beam transmitting the PDSCH are the same. If the base station sets the beam transmitting the PDCCH and the beam transmitting the PDSCH to differ from each other for the purpose of enhancing throughput, when t_so is smaller than timeDurationForQCL, the UE may use the default spatial QCL for PDSCH reception and, in the disclosure, a method for determining the default spatial QCL is proposed.

Embodiment A1

The base station and the UE may set a beam to be applied to the default QCL via MAC CE-based signaling. The UE may identify default (spatial) QCL-related information of MAC CE received from the base station and apply the identified information to the operation of receiving the PDSCH. In other words, the UE may receive the MAC CE from the base station and identify information related to the default QCL. If the reception t_so value between the PDCCH and the PDSCH is smaller than timeDurationForQCL, the UE may apply information related to the default QCL set in the MAC CE for PDSCH reception to the beam receiving the PDSCH and receive the PDSCH. In this case, the default QCL-related information may include at least one of the QCL parameter, TCI states-related information, and information associated with the DL-RS or UL-RS.

For the MAC CE structure configured by the base station, at least one of the structures of MAC CE discussed in Rel-15/16 may be (re)used and (re)interpreted.

As an example, if receiving a TCI States Activation/Deactivation MAC CE message for Rel-15-based PDSCH as in 10-00 of FIG. 10A, the UE may determine that the beam indicated as the default QCL of PDSCH and the beam transmitting the PDCCH are set to differ from each other. Specifically, upon receiving the TCI States Activation/Deactivation message, the UE may appreciate one TCI state according to a predetermined rule, among the activated TCI states, as the TCI state corresponding to the default QCL. For example, the TCI state corresponding to the default QCL according to the predetermined rule may be defined as the TCI state indicated by the lowest/highest index among the activated TCI states in the MAC CE message. Upon receiving a MAC CE message where serving cell ID #2, BWP #4, and T0 to T7 values all are indicated to be in the activated state (1), the UE may determine that the TCI state corresponding to the default QCL in serving cell #2 and BWP #4 is the lowest TCI index (T0) or highest index (T7) among the activated TCI indexes.

As another example, the UE may receive a TCI state indication MAC CE message for Rel-15-based PDCCH as in 10-50 of FIG. 10A and appreciate the TCI state ID indicated together with CORESET 0 in the message as the TCI state corresponding to the default QCL for the beam transmitting the PDSCH. Here, the TCI state ID of the MAC CE message means the ID of the TCI states for the PDSCH set in the higher layer (e.g., the TCI states ID included in tci-StatesToAddModList). In other words, the UE may receive the TCI state indication MAC CE for PDCCH from the base station and identify information related to the default QCL. If the reception t_so value for the PDCCH and PDSCH is smaller than timeDurationForQCL, the UE may apply the TCI state indicated together with CORESET 0 for PDSCH reception to the beam receiving the PDSCH. Resultantly, when the UE receives the PDSCH scheduled via the PDCCH transmitted in CORESET 0, the default QCL beam for the PDSCH may be identical to the beam set for CORESET 0. Meanwhile, if the beam for CORESET 0 is not set as MAC CE, the default beam for receiving the PDSCH may be a preset TCI state as in various embodiments described above.

As another example, if part of the beam list (e.g., a beam list set and released via, tci-StatesPDCCH-ToAddList and tci-StatesPDCCH-ToReleaseList) for PDCCH reception set in the UE is set as a duplicate of a beam list for PDSCH reception (e.g., a beam list set and released via tci-StatesToAddModList and tci-StatesTo ReleaseList), the base station and the UE may exclude the duplicate beam upon setting the default QCL for PDSCH reception. In other words, the UE may compare the reference RS and QCL type for each beam set for PDCCH reception with the reference RS and QCL type for each beam set for PDSCH reception and, if the duplicate reference RSs and QCL types exist in the PDCCH reception beam list and the PDSCH reception beam list, the UE may exclude the duplicate from the default QCL configuration for PDSCH reception. Alternatively, the UE may not expect to set the beam that may be repeatedly used for PDCCH reception and PDSCH reception as the default QCL for PDSCH reception.

The MAC CE structure set by the base station may be configured of a new control element message (signaling) structure.

The new message may be configured in the form of a message setting a default QCL for supporting a single-TRP. For example, the MAC CE message for setting the default QCL may include information (e.g., TCI index) indicating at least one of TCI states for default QCL assumption of PDSCH. As another example, the message may directly or indirectly indicate the direction of the beam transmitted from the base station using such information as, e.g., QCL type A/B/C/D or DL-RS/UL-RS index. The information means a beam direction assumed for PDSCH reception by the base station and the UE when the time for the UE to decode the DCI including beam information for PDSCH reception transmitted by one TRP is insufficient or when the time for the UE to switch beams and receive the PDSCH is insufficient.

The message may be configured in the form of a message setting a default QCL for supporting multi-TRP. For example, the MAC CE message for setting the default QCL may include information (e.g., TCI index #1 or TCI index

2) indicating at least one of TCI states for default QCL assumption of PDSCH(s). In this case, if the message includes one TCI state, the UE may determine that the multi-TRP indicates one same default QCL or the single-TRP indicates one default QCL and, if the message includes two or more TCI states which differ from each other, the UE may determine that the multi-TRP indicates two or more different default QCLs. Specifically, if the message indicates two or more TCI indexes, the UE may determine that the order of TCI indexes is mapped according to the order of TRPs or the order of HigherLayerIndexPerCORESET index. Alternatively, the TRP index/HigherLayerIndexPerCORESET index and the corresponding TCI index each may be indicated. Further, when the message may include two or more TCI states and the indicated TCI states are the same, the UE may determine that the same default QCL is indicated.

As another example, the MAC CE message for setting the default QCL may include information (e.g., TCI set index) indicating at least one TCI set (e.g., a pair of two or a set of three) among the TCI states for the default QCL assumption of the PDSCH(s) transmitted from the multi-TRP. In this case, upon receiving the TCI set index, the UE may determine that the multi-TRP has indicated pre-designated TCI states as the default QCL.

As another example, the message may directly or indirectly indicate the direction of the beam transmitted from the base station using such information as, e.g., multiple QCL types A/B/C/D or DL-RS/UL-RS index. The information means a beam direction assumed for PDSCH reception by the base station and the UE when the time for the UE to perform beam switching on the PDSCH transmitted from one TRP and receive the PDSCH is insufficient.

Alternatively, separate messages may be set for single-TRP and multi-TRP or a single integrated message may be set which is configured in one type.

As an example, a MAC CE message for setting a multi-TRP-based default beam may be separately set for a single-DCI-based multi-TRP. As another example, a MAC CE message for setting a multi-TRP-based default beam may be separately set for a multi-DCI-based multi-TRP.

Besides, separate messages for the single-TRP and multi-TRP may be determined depending on the UE's supported TRP transmission/reception capability. Further, the MAC CE may be used to set an initial default QCL and may be considered to be further updated.

Embodiment A2

The MAC CE message may be configured per component carrier (CC) or per BWP.

First, the MAC CE message may be configured as a CC unit. As an example, the MAC CE message may indicate default QCL-related information applied in one CC (e.g., a Primary CC/PCell/PSCell, a secondary CC/SCell or a across CC) and activated BWP. As another example, the MAC CE message may indicate default QCL-related information applied in one CC and at least one or more configured BWP(s). As another example, the MAC CE message may indicate default QCL-related information applied in one CC and all BWP(s) supported by the CC.

Second, the MAC CE message may be simultaneously configured for a plurality of CCs. As an example, the MAC CE message may indicate default QCL-related information applied in at least two or more CCs (e.g., including a Primary CC/PCell/PSCell, a secondary CC/SCell or a across CC) and activated BWP. As another example, the MAC CE message may indicate default QCL-related information applied in at least two or more CCs and at least one or more configured BWP(s). As another example, the MAC CE message may indicate default QCL-related information applied in at least two or more CCs and all BWP(s) supported by the CCs.

Third, in the above-described embodiment of the disclosure, the MAC CE message may be configured for each combination of Ccs set in the UE and/or for each combination of BWPs. Specifically, a factor indicating some or all of preset CC(s)/activated Ccs may be set by higher layer signaling in the MAC CE message. The CC indication factor may indicate at least one as illustrated in Table 17.

TABLE 17

When a set of CCs for beam configuration/change is set by higher layer signaling
Factor indicating a set for indexes of the CC set or an index of the CC set →
applies MAC CE to the indicated CC set
Factor indicating the CC index included in the CC set → applies MAC CE to the
CCs in all or some CC sets including the CC index
When no CC set for beam configuration/change is set by higher layer signaling
Applies factor indicating a set/list of CC indexes in MAC CE
Applies factor indicating a combination of CCs in MAC CE The MAC CE message may include default QCL-related information applied to the CC indicated as above. Further, the MAC CE message may be applied to all the BWP/activated BWP/BWP sets in the indicated CC. Here, the BWP set may be explicitly indicated or may be an implicitly agreed on and, when explicitly indicated, may be indicated through higher layer configuration or MAC CE.

Fourth, in the above embodiment of the disclosure, the MAC CE message may be configured upon switching CCs or BWPs or further updated. Specifically, the MAC CE message may indicate default QCL-related information per BWP when a CC switching occurs, e.g., such as when an additional CC is activated for the UE or when the CC in connection is deactivated, and a new CC is activated. As an example, the MAC CE message may indicate default QCL-related information applied in the CC(s) and activated BWP switched or updated, as well as the CC currently in communication between the UE and the base station. As another example, the MAC CE message may indicate default QCL-related information applied in switched or updated CCs and at least one or more configured BWP(s). As another example, the MAC CE message may indicate default QCL-related information applied in switched or updated CCs and all BWP(s) supported by the CC.

Embodiment A3

The method for designating and updating a beam for a default QCL based on a MAC CE message may be effectively used from the time when a MAC CE mesh is set. For example, after the initial access process by the UE, duration when the default QCL configuration-related MAC CE message is not activated from the base station. The duration may include a period during which a default QCL configuration-related MAC CE message is not received and a predefined period from the time when the UE receives a MAC CE message to the time when the MAC CE is activated. Upon receiving the PDSCH before and after the duration, the default QCL may be set as follows.

First, the UE may determine that the beam transmitting the PDCCH and the beam transmitting the PDSCH transmitted from the base station are the same until before the MAC CE message setting the default QCL-related information transmitted from the base station is activated. If the scheduling time offset (t_so) value calculated from the time of reception of the CORESET including the PDCCH for allocating the PDSCH to the time of reception of the allocated PDSCH is smaller than the UE capability parameter timeDurationForQCL (e.g., 14 symbols) reported to the base station, the UE may apply the QCL assumption applied to the lowest CORESET ID in the latest monitoring time (slot or occasion) in receiving the PDSCH. Alternatively, when the condition is met, the UE may apply the QCL assumption applied to the lowest CORESET ID in the latest monitoring time (slot or occasion) in the CORESET group where the PDCCH for allocating the PDSCH is transmitted in receiving the PDSCH. The above-described operation may also be applied to the CC or BWP not activated, when the MAC CE message for setting the PDSCH default QCL configuration is activated in a specific CC or BWP, but the MAC CE message is not activated in the remaining CCs or BWPs.

Second, the UE may receive the PDSCH based on the default QCL-related information set in the MAC CE message as described above in connection with embodiments 1 and 2 after the MAC CE message setting the default QCL-related information transmitted from the base station is activated. In other words, if the scheduling time offset (t_so) value calculated from the time of reception of control information for allocating the PDSCH via the CORESET to the time of reception of the allocated PDSCH is smaller than the UE capability parameter timeDurationForQCL (e.g., 14 symbols) reported to the base station, the UE may apply the QCL parameter to receive the PDSCH based on the QCL-related information indicated in the MCE CE.

Third, if the code point value of the transmission configuration indication (TCI) field is indicated in DCI format 1_1 after receiving the MAC CE message setting the default QCL-related information transmitted from the base station, the UE may receive the PDSCH based on the default QCL-related information set in the MAC CE message as described above in connection with embodiment A1 and embodiment A2. The TCI field may be applied where the higher layer parameter tci-PresentInDCI is enabled.

Fourth, if the base station does not set the higher layer parameter tci-PresentInDCI to enabled for the UE or changes it to disabled, the UE may not expect default QCL configuration based on MAC CE message. Alternatively, if the base station does not set the higher layer parameter tci-PresentInDCI to enabled for the UE, the UE may not apply the default QCL-related information indicated in the MAC CE in receiving the PDSCH although receiving the MAC CE message for setting the default QCL transmitted from the base station. Resultantly, if the scheduling time offset (t_so) value calculated from the time of reception of control information for allocating the PDSCH via the CORESET to the time of reception of the allocated PDSCH is smaller than the UE capability parameter timeDuration-ForQCL (e.g., 14 symbols) reported to the base station, the UE may apply the QCL assumption applied to the lowest CORESET ID in the latest monitoring time (slot or occasion) in receiving the PDSCH. Alternatively, when the condition is met, the UE may apply the QCL assumption applied to the lowest CORESET ID in the latest monitoring time (slot or occasion) in the CORESET group where the PDCCH for allocating the PDSCH is transmitted in receiving the PDSCH.

Fifth, if the base station performs cross-carrier scheduling or cross-BWP scheduling for the PDSCH and does not set the PDSCH default QCL via MAC CE in a specific CC or BWP, the UE may perform the same operations as those before the above-described MAC CE message activation in the specific CC or BWP.

For example, if the scheduling time offset (t_so) value calculated from the time of reception of the control information for scheduling the PDSCH allocated in the cross-carrier or cross-BWP via the CORESET to the time of reception of the PDSCH allocated to the cross-carrier or cross-BWP is smaller than the UE capability parameter timeDurationForQCL (e.g., 14 symbols) reported to the base station, the UE may apply the QCL assumption applied to the lowest CORESET ID in the latest monitoring time (slot or occasion), the same QCL parameter, in receiving the PDSCH. Alternatively, if the scheduling time offset (t_so) value calculated from the time of reception of the CORESET in the CORESET group including the PDCCH scheduling the PDSCH allocated in the cross-carrier or cross-BWP to the time of reception of the PDSCH allocated in the cross-carrier or cross-BWP is smaller than the UE capability parameter timeDurationForQCL (e.g., 14 symbols) reported to the base station, the UE may apply the QCL assumption applied to the lowest CORESET ID in the latest monitoring time (slot or occasion) in the CORESET group where the PDCCH for allocating the PDSCH, the same QCL parameter, in receiving the PDSCH.

FIGS. 11, 16 to 18 illustrate an example in which a plurality of TRPs transmit a plurality of PDSCHs to a specific UE through a single PDCCH according to various embodiments of the disclosure. Here, various schemes may exist according to the aspect of PDSCHs allocated by the TRPs to the UE. The schemes according to PDSCH transmissions may be divided as follows.

Scheme 1 (Spatial Domain Multiplexing (SDM)): A scheme in which the base station allocates the PDSCH to the UE based on n TCI states which are fewer than $N_s$ (the maximum number of TCI states supportable) in a single slot, where the PDSCHs transmitted overlap in the time and frequency domains.

Scheme 2 (Frequency Domain Multiplexing (FDM)): A scheme in which the base station allocates the PDSCH to the UE based on n TCI states, which are fewer than $N_f$ (the maximum number of TCI states supportable) in a single slot, where the PDSCHs do not overlap in the frequency domain.

Scheme 3 (Time Domain Multiplexing (TDM): A scheme in which the base station allocates the PDSCH to the UE based on n TCI states, which are fewer than $N_{t1}$ (the maximum number of TCI states supportable) in a single slot, where the PDSCHs transmitted do not overlap in the time domain.

Scheme 4 (Time Domain Multiplexing (TDM)): A scheme in which the base station allocates the PDSCH to the UE based on n TCI states which are fewer than $N_{t2}$ (the maximum number of TCI states supportable) in multiple single slots, where the PDSCHs transmitted overlap on the time and frequency axes (domains).

In scheme 3 or 4, the maximum number of TCI states may be, e.g., 2 or more in the case of 3GPP Rel-16. Further, the TRP may support the same number of consecutive symbols upon one transmission. For example, if the first PDSCH transmitted to the UE includes two symbols, the second and subsequent PDSCHs may be all including two symbols. Further, the maximum number of layers transmitted per TRP may be at least two or more. The maximum supported TB size may be determined based on the capability of the UE.

In scheme 3, the number of times in which the PDSCH is transmitted may be determined by the number of TCI states indicated in the codepoint of the TCI field in the DCI. For example, if the number of states is identified as 1 from the TCI field in the DCI received by the UE, it may mean that the PDSCH allocated by the base station is transmitted once and, if 2, it may mean that the PDSCH is transmitted twice. In this case, in the first PDSCH transmission and second and subsequent PDSCH transmissions, an offset value Koffset may be set to indicate an offset of a predetermined number of symbols or an offset between the PDSCHs in the time domain. For example, the first symbol in the second transmission may be allocated, Koffset symbols away from the last symbol in the first transmission. In this case, Koffset may be set by a relevant RRC parameter in which case the UE regards Koffset as 0 unless set otherwise in the RRC.

In scheme 4, the base station may indicate, to the UE, the number of times in which the PDSCH is transmitted using the PDSCH-TimeDomainResourceAllocation field for time domain resource allocation (TDRA). In this case, as a method for indicating PDSCH resource allocation, information for the SLIV field indicating, e.g., the start position of the PDSCH symbol, length, and offset, may be directly or indirectly utilized. Further, the SLIV value applied to the first PDSCH allocated by the base station may also be applied to a plurality of PDSCHs in the second or its subsequent transmissions.

RVid indicated by the DCI may indicate a selection of one redundancy version (RV) sequence. The base station transmits data according to the set RVid and, in this case, data having the same $RV_{id}$ are the same. In general, a transmission sequence of RV is repeatedly transmitted four times as default and, in each transmission, data having the $RV_{id}$ of 0, 2, 3, and 1, or 0, 0, 0, and 0, or 0, 3, 0, and 3 may be transmitted. Such sequence may be performed to obtain the gain via soft combining when the UE receives the retransmitted data. The RV sequence transmitted from each TRP may be defined as follows.

- The selected RV sequence is linked to the first TRP (first TCI state), and the RV sequence linked to the second TRP is determined by the RV offset from the selected RV sequence.
- RV offset is determined by the set RRC value
- TCI state mapping for PDSCH transmission supports 2 options, and switching is determined by RRC
- Option 1: cyclical mapping (If two TCI states are indicated, map to #1#2#1#2)
- Option 2: sequential mapping (If 2 TCI states are indicated, map to #1#1#2#2)

Figure 16:
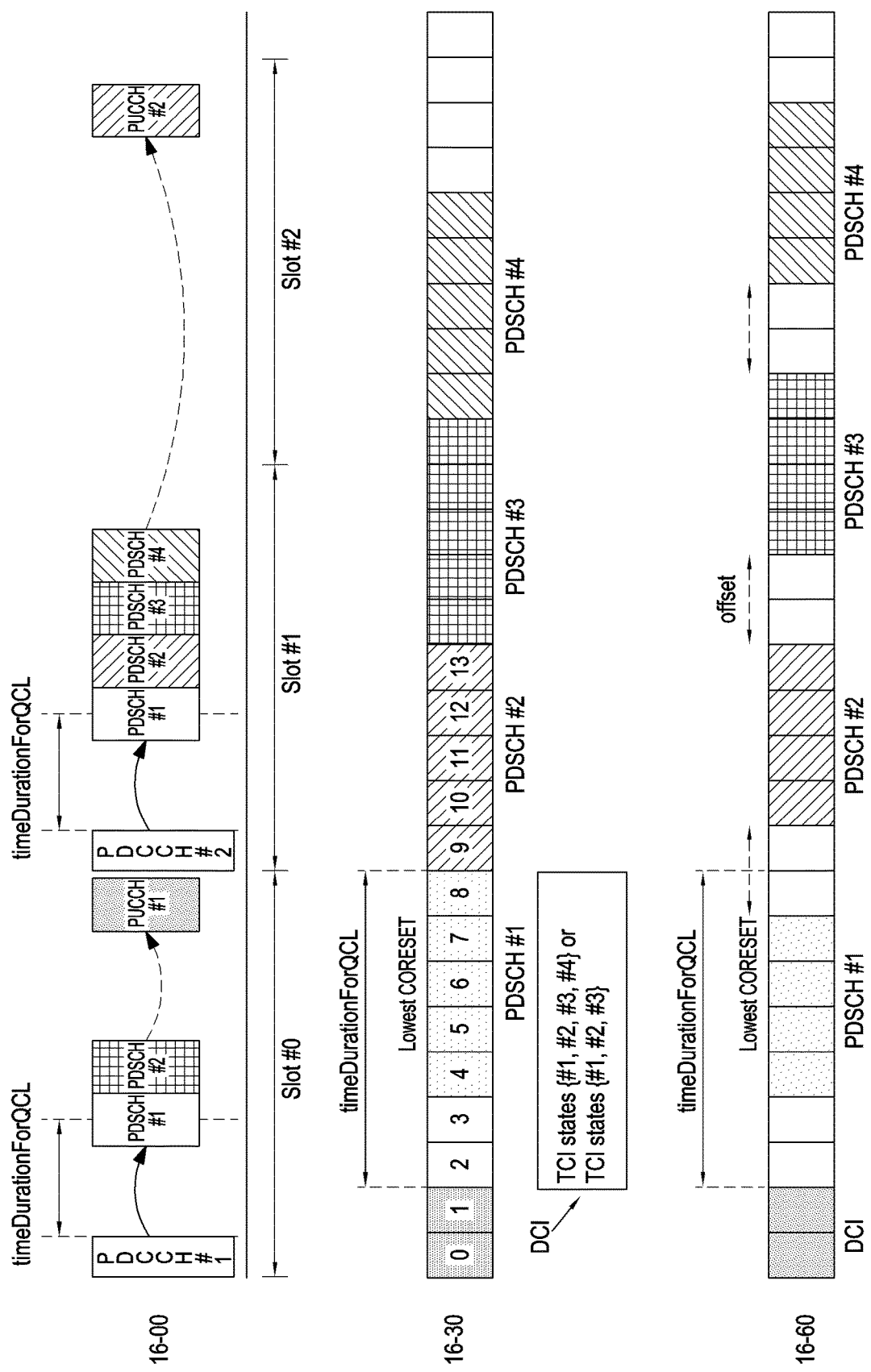
FIGS. 16, 17, and 18 are views illustrating a process for transmitting a plurality of PDSCHs from a plurality of transmission and reception points (TRPs) to a specific UE via a single PDCCH according to various embodiments of the disclosure.
Figure 17:
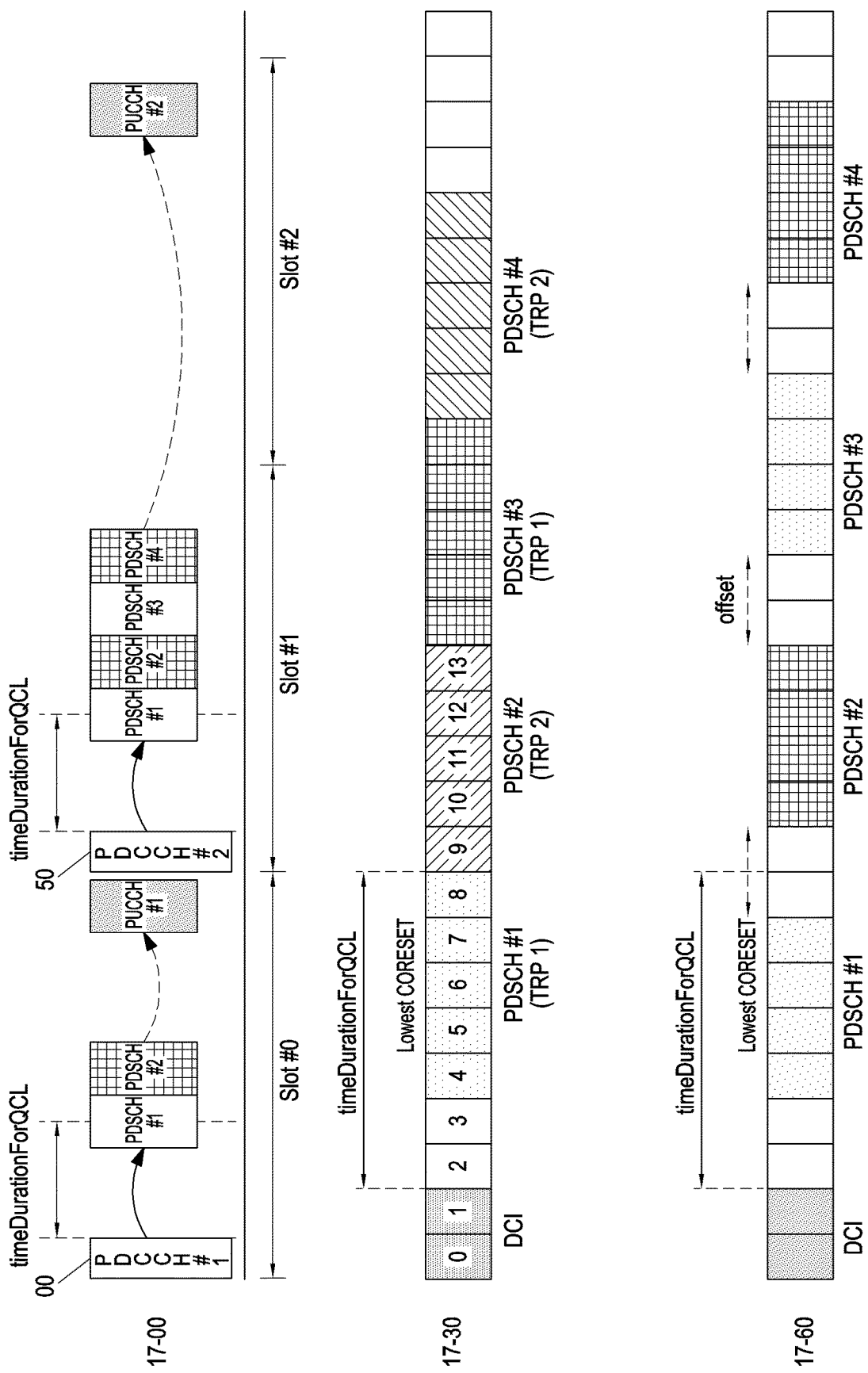
Figure 18:
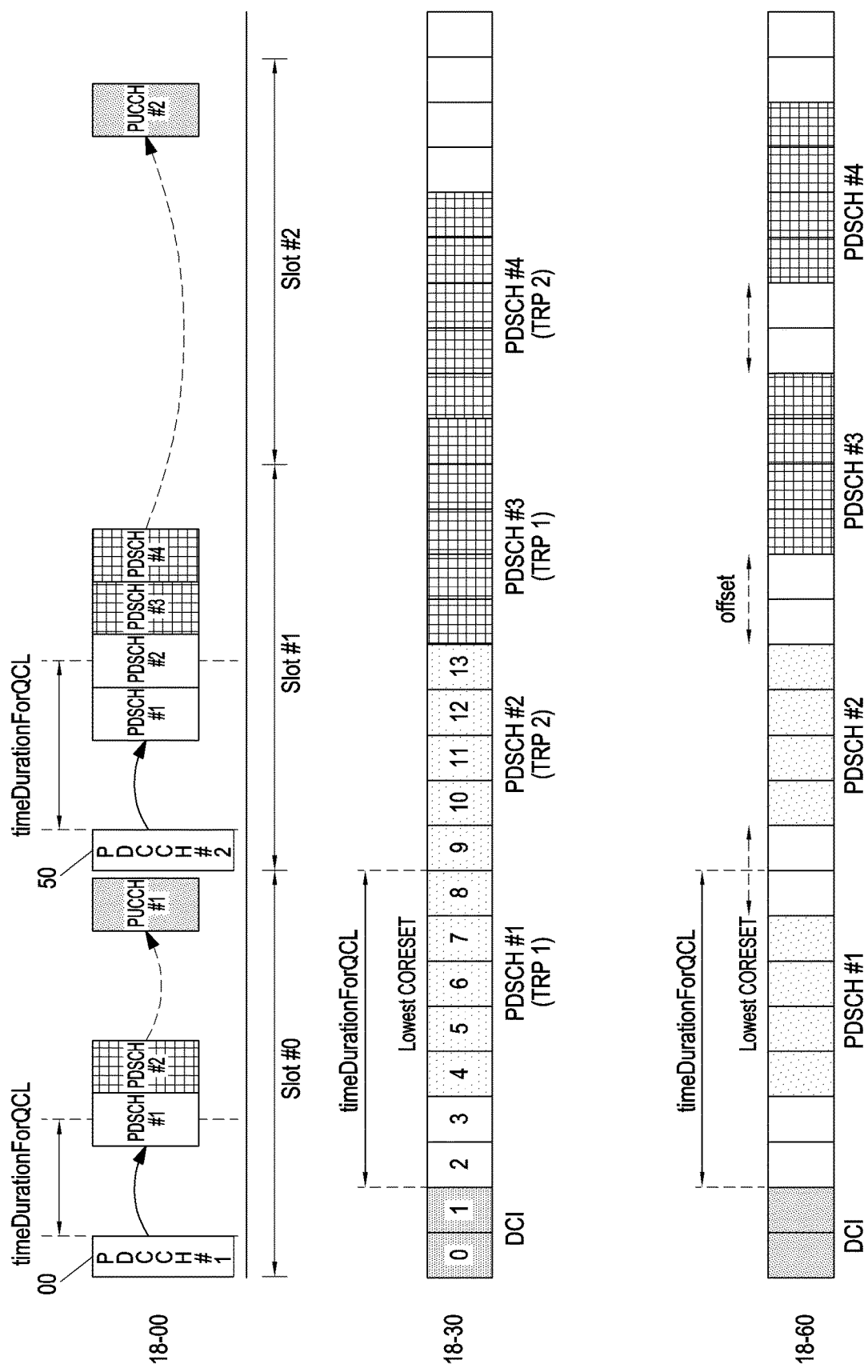

FIGS. 16, 17, and 18 are views illustrating a process for transmitting a plurality of PDSCHs from a plurality of TRPs to a specific UE via a single PDCCH according to various embodiments of the disclosure.

Referring to FIGS. 16, 17, and 18, FIGS. 16-00, 17-00, and 18-00 correspond to a case in which Koffset between a plurality of PDSCHs allocated to the UE by the base station is 0 based on scheme 3 or 4. In particular, the base station may transmit the first PDCCH and the first and second PDSCHs corresponding thereto to the UE and, in some cases, may transmit the second PDCCH and the first to fourth PDSCHs corresponding thereto, continuously or after a predetermined time. The UE may receive the plurality of PDSCHs and transmit an HARQ ACK/NACK to PUCCHs #1 and #2 indicated in the PDCCH set by the base station according to whether decoding is successful. A plurality of PDSCHs scheduled in a single PDCCH may repeatedly transmit the same data (e.g., when the indicated RV value is the same).

Alt 1-1

Specifically, the number of TCI states transmitted by TRPs or the number of TRPs transmitting PDSCH may be the same as the number of PDSCHs repeatedly transmitted as in pattern 1.

Here, pattern 1 is as follows.

Pattern 1: number of TCI states (number of TRPs)=number of repetitions (Pattern 1: Number of TCI states (number of TRPs) =number of repetitions)

For example, the UE identifies that the TCI states {#1, #2, #3, #4} are indicated through the TCI codepoint within the DCI, and it may be identified as illustrated in 16-00 that it is instructed to apply TCI state #1 to the first PDSCH, TCI state #2 to the second PDSCH, TCI state #3 to the third PDSCH, and TCI state #4 to the fourth PDSCH. The UE identifying the DCI as such may determine the direction of reception beam through the following determination process as to whether to apply the indicated states.

First, if the number of TCI states indicated by the TCI in the DCI from the base station is the same as the number of PDSCHs repeatedly transmitted, the position of the time domain resource of the PDSCH(s) to which the TCI states are applied is compared with the timeDurationForQCL to thereby determine whether to apply the TCI states.

As an example, if the time when the TCI states are applied to the PDSCHs is after a position based on the set timeDurationForQCL, the UE may sequentially allocate all TCI state information indicated in the DCI to the PDSCHs. In other words, the UE identifying that the last symbol index of the PDCCH transmitted from the base station is 2, and the set timeDurationForQCL value is 7, if the transmission time (start time) of the PDSCHs scheduled to have the TCI states applied thereto is equal to or larger than symbol no. 9, may perform reception, with TCI state #1, TCI state #2, TCI state #3, and TCI state #4 sequentially applied to the first PDSCH, the second PDSCH, the third PDSCH, and the fourth PDSCH.

As another example, the UE identifying that the last symbol index of the PDCCH transmitted from the base station is 2, and the set timeDurationForQCL value is 14, if the transmission time (start time) of the PDSCH(s) scheduled to have the TCI states applied thereto is equal to or larger than symbol no. 1 of the next slot, may perform reception, with TCI state #1, TCI state #2, TCI state #3, and TCI state #4 sequentially applied to the first PDSCH, the second PDSCH, the third PDSCH, and the fourth PDSCH.

Alt 1-2

If the time when the TCI states are applied to the PDSCHs is before a position based on the set timeDurationForQCL, the UE, which receives the plurality of PDSCHs where the TCI states are indicated from the base station, may not completely sequentially allocate all TCI state information indicated in the DCI to the PDSCHs.

As an example, if at least one symbol of the first PDSCH (e.g., the first PDSCH) among the plurality of PDSCHs is present in the timeDurationForQCL-based position, the UE receiving the plurality of PDSCHs where the TCI states are indicated from the base station may apply the default spatial QCL, rather than applying TCI state #1 indicated in the first PDSCH. The default spatial QCL means the QCL parameter used to receive the PDCCH in the CORESET associated with the monitored search space having the lowest CORESET ID in the latest slot. Further, the UE may perform reception, with TCI state #2, TCI state #3, and TCI state #4 sequentially applied to the second PDSCH, the third PDSCH, and the fourth PDSCH, respectively. In other words, although the base station instructs the UE to apply TCI state #1 to the first PDSCH as in 16-30, if the start symbol of the first PDSCH is symbol no. 4, and the symbol length is 5, the UE identifying that the last symbol index of the PDCCH is 2, and timeDurationForQCL is 7, may apply the default spatial QCL to the first PDSCH and TCI state #2 to TCI state #4 indicated in the TCI in the DCI to the other PDSCHs, i.e., the second PDSCH to the fourth PDSCH, thereby performing beamforming for PDSCH reception.

As another example, if at least one symbol of the second PDSCH (e.g., the second PDSCH) among the plurality of PDSCHs is present in the timeDurationForQCL-based position, the UE receiving the plurality of PDSCHs where the TCI states are indicated from the base station may apply the default spatial QCL, rather than applying TCI states #1 and #2 indicated in the first PDSCH and the second PDSCH. The default spatial QCL means the QCL parameter used to receive the PDCCH in the CORESET associated with the monitored search space having the lowest CORESET ID in the latest slot. Further, the UE may perform reception, with TCI state #3 and TCI state #4 sequentially applied to the third PDSCH and the fourth PDSCH, respectively. In other words, although the base station instructs the UE to apply TCI states #1 and #2 to the first and second PDSCHs, if the start symbol of the first PDSCH is symbol no. 5, and the symbol length is 3, the UE identifying that the last symbol index of the PDCCH is 2, and timeDurationForQCL is 7, may apply the default spatial QCL to the first and second PDSCHs and TCI state #3 and TCI state #4 indicated in the TCI in the DCI to the other PDSCHs, i.e., the third PDSCH and the fourth PDSCH, thereby performing beamforming for PDSCH reception.

The default spatial QCL may be extended to mean the following.

1) The above-described meaning, i.e., the QCL parameter used to receive the PDCCH in the CORESET associated with the monitored search space having the lowest CORESET ID in the latest slot.

2) Default spatial QCL for PDSCH set by, e.g., MAC-CE. In this case, the same default spatial QCL may be set for all the TRPs, or a different default spatial QCL may be set for each TRP.

3) Default spatial QCL for PDSCH may mean a value having the lowest ID among the TCI states for PDSCH set by RRC or a value having the lowest ID among the TCI states for PDSCH activated by MAC-CE.

Different default spatial QCLs may be applied depending on contexts. For example, in case of cross-carrier scheduling or cross-BWP scheduling, 3) may be applied, and in other cases, 1) or 2) may be applied. In the case of a UE supporting MAC-CE for configuring a default spatial QCL for PDSCH, 1) may be applied before activating the corresponding MAC-CE and, thereafter, 2) may be applied.

Alt 1-3

As another example, if the start positions of all the PDSCHs repeated are smaller than timeDurationForQCL, the UE receiving the PDSCH where the TCI states are indicated from the base station in slot 0/1 as in 16-00, particularly in scheme 3, may apply the default spatial QCL, rather than the TCI states indicated for the first PDSCH and second PDSCH or the first PDSCH to the fourth PDSCH. Here, one, two, or four default QCLs may be set and operated based on the single-PDCCH default QCL enhancement. In other words, although the base station instructs the UE to apply TCI state #1 to TCI state #4 to the first to fourth PDSCHs in slot 1, if the start symbol of the first PDSCH is symbol no. 4, and the symbol length is 1, the UE identifying that the last symbol index of the PDCCH is 2, and the timeDurationForQCL is 7 may apply the default spatial QCL to the first to fourth PDSCHs since the symbol indexes of the start positions of all of the plurality of PDSCHs repeated are smaller than the symbol index (no. 9) in the position considering the timeDurationForQCL. In this case, one, two, or four default QCLs may be set or determined and, by applying the same, the PDSCHs may be received.

Alt 1-4

The UE receiving the plurality of PDSCHs where the TCI states are indicated from the base station, if the time when the TCI states are applied to the PDSCHs is before the position based on the timeDurationForQCL where the time of applying the PDSCHs is set, may apply the default spatial QCL to the first to fourth PDSCHs, rather than the TCI states indicated for the first PDSCH to the fourth PDSCH regardless of the overlapping PDSCH positions.

Alt 2

As an example, if at least one symbol of the first PDSCH among the plurality of PDSCHs is present in the position based on the timeDurationForQCL, the UE receiving the plurality of PDSCHs where the TCI states are indicated from the base station may apply the default spatial QCL, rather than applying TCI state #1 indicated in the first PDSCH, and may sequentially apply TCI state #1, TCI state #2, and TCI state #3 to the second PDSCH, the third PDSCH, and the fourth PDSCH, respectively, while performing reception. In other words, although the base station instructs the UE to apply TCI state #1 to the first PDSCH as in 16-30, if the start symbol of the first PDSCH is symbol no. 4, and the symbol length is 5, the UE identifying that the last symbol index of the PDCCH is 2, and timeDurationForQCL is 7, may apply the default spatial QCL to the first PDSCH and TCI state #2 to TCI state #4 indicated in the TCI in the DCI to the other PDSCHs, i.e., the first PDSCH to the third PDSCH, thereby performing beamforming for PDSCH reception. As such, the base station may vary and indicate the TCI-related information in the DCI previously considering the UE's default QCL. In other words, the base station may predict the default QCL in which the UE is operated and indicate {#1, #2, #3}, {#1, #2} or {#1} considering the default QCL, but not {#1, #2, #3, #4}, for the TCI states. In this case, the base station may dummy-pad the TCI field or TCI states-related higher layer parameter field.

16-60 of FIG. 16 shows an example in which Koffset between the plurality of PDSCHs allocated to the UE by the base station is not zero (e.g., when Koffset is set to 2) in various embodiments of Alt1 and Alt2. Here, as a condition under which a change is made to Koffset, if the timeDurationForQCL-based position is present in the offset area located between the PDSCHs in the time domain, the UE may consider the PDSCH(s) present before the offset as an area for determining whether to apply the default QCL. As an example, the UE identifying that the last symbol index of the PDCCH transmitted from the base station is 2, and the set timeDurationForQCL value is 7, if the transmission time (start time) of the PDSCHs scheduled to have the TCI states applied thereto is equal to or larger than symbol no. 9, may perform reception, with TCI state #1, TCI state #2, TCI state #3, and TCI state #4 sequentially applied to the first PDSCH, the second PDSCH, the third PDSCH, and the fourth PDSCH.

As another example, although the base station instructs the UE to apply TCI state #1 to the first PDSCH, if the start symbol of the first PDSCH is symbol no. 4, and the symbol length is 4, and Koffset is 2, the UE identifying that the last symbol index of the PDCCH is 2, and timeDurationForQCL is 7 may additionally identify that the timeDurationForQCL is present in the offset area between the first PDSCH and the second PDSCH or before the second PDSCH and apply the default spatial QCL to the first PDSCH while applying the above-described embodiments (Alts 1 to 2) to the other PDSCHs, i.e., the second PDSCH to the fourth PDSCH.

As another example, if the start positions of all the PDSCHs repeated are smaller than timeDurationForQCL, the UE receiving the PDSCH where the TCI states are indicated from the base station in slot 0/1 as in 17-00, particularly in scheme 3, may apply the default spatial QCL, rather than the TCI states indicated for the first PDSCH and second PDSCH or the first PDSCH to the fourth PDSCH. Here, one or two default QCLs may be set and operated based on the single-PDCCH default QCL enhancement. In other words, although the base station instructs the UE to apply TCI state #1 and TCI state #2 to the first to fourth PDSCHs in slot 1, if the start symbol of the first PDSCH is symbol no. 4, and the symbol length is 1, the UE identifying that the last symbol index of the PDCCH is 2, and the timeDurationForQCL is 7 may apply the default spatial QCL to the first to fourth PDSCHs since the symbol indexes of the start positions of all of the plurality of PDSCHs repeated are smaller than the symbol index (no. 9) in the position considering the timeDurationForQCL. In this case, two default QCLs may be set or determined and, by applying the same, the PDSCHs may be received.

The default spatial QCL may be extended to mean the following.

1) The above-described meaning, i.e., the QCL parameter used to receive the PDCCH in the CORESET associated with the monitored search space having the lowest CORESET ID in the latest slot.

2) Default spatial QCL for PDSCH set by, e.g., MAC-CE. In this case, the same default spatial QCL may be set for all the TRPs, or a different default spatial QCL may be set for each TRP.

3) Default spatial QCL for PDSCH may mean a value having the lowest ID among the TCI states for PDSCH set by RRC or a value having the lowest ID among the TCI states for PDSCH activated by MAC-CE.

Different default spatial QCLs may be applied depending on contexts. For example, in case of cross-carrier scheduling or cross-BWP scheduling, 3) may be applied, and in other cases, 1) or 2) may be applied. In the case of a UE supporting MAC-CE for configuring a default spatial QCL for PDSCH, 1) may be applied before activating the corresponding MAC-CE and, thereafter, 2) may be applied.

Alt 3, Alt 4

First, as illustrated in FIGS. 17 and 18, the number of TCI states transmitted by multiple TRPs or the number of TRPs transmitting the PDSCH may be smaller than the number of PDSCHs repeatedly transmitted as in pattern 2.

Here, pattern 2 is as follows.

Pattern 2: number of TCI states (number of TRPs)<number of repetitions (Pattern 2: Number of TCI states (number of TRPs) <number of repetitions)

For example, the UE may identify the PDCCH and identify that the TCI states {#1, #2} are indicated through the TCI codepoint in the DCI and that the PDSCH is repeatedly transmitted four times in total. Here, methods for the base station to transmit the PDSCH four times may be classified as follows according to methods for applying the TCI state.

Method 1: Cyclic mapping method (e.g. $1^{st}$ occasion-TCI state #1 for TRP1, $2^{nd}$ occasion-TCI state #2 for TRP2, $3^{rd}$ occasion-TCI state #1 for TRP1, $4^{th}$ occasion-TCI state #2 for TRP2), where the corresponding TCI states are indicated as many times as the number of times in which each TRP repeatedly transmits (e.g., 2 times)

Method 2: Sequential mapping method (e.g., $1^{st}$ occasion-TCI state #1 for TRP1, $2^{nd}$ occasion-TCI state #1 for TRP1, $3^{rd}$ occasion-TCI state #2 for TRP2, $4^{th}$ occasion-TCI state #2 for TRP2), where each TRP repeatedly transmits (e.g., 2 times) corresponding to one TCI state Referring to FIG. 17, when method 1 (Cyclic mapping method) is applied, TRP1 may apply TCI state #1 to the first PDSCH (PDSCH #1) and transmit the same to the UE, and TRP2 may continuously apply TCI state #2 to the second PDSCH (PDSCH #2) and transmit the same to the UE. Continuously, TRP1 may apply TCI state #1 to the third PDSCH (PDSCH #3) and transmit to the UE, and TRP2 may apply TCI state #2 to the fourth PDSCH (PDSCH #4) and transmit to the UE.

In contrast, when method 2 (Sequential mapping method) is applied as illustrated in FIG. 18, TRP1 may apply TCI state #1 to the first PDSCH (PDSCH #1) and the second PDSCH (PDSCH #2) and transmit to the UE. Subsequently, TRP2 may apply TCI state #2 to the third PDSCH (PDSCH #3) and the fourth PDSCH (PDSCH #4) and transmit to the UE.

The base station may set a higher layer parameter so that the UE may identify method 1 and method 2. For example, the base station may allow methods 1 and 2 to be identified via the tciMapping field included in the RepetititionSchemeConfig IE which is an RRC information element (IE). Here, the tciMapping field enables the TCI state mapping method for PDSCH transmission occasions and is set to either cyclicMapping or sequentialMapping. When the value of the tciMapping field is set to 'cyclicMapping', the UE may identify that method 1, i.e., the Cyclical mapping method, is applied and, when the value of the tciMapping field is set to 'sequentialMapping', the UE may identify that method 2, i.e., the Sequential mapping method, is applied.

The base station may use a separate field included in the DCI, as well as the tciMapping field as described above, or use the existing TCI field so as to identify methods 1 and 2. Alternatively, the base station may utilize a parameter or bit resource capable of distinguishing between method 1 and method 2 in RRC. In other words, the UE identifying the DCI may determine the direction of reception beam through the following identification process as to whether to apply the indicated TCI states.

Alt 3-1

If the number of TCI states indicated in each TRP is smaller than the number of PDSCHs repeatedly transmitted as illustrated in FIG. 17, the UE may identify whether method 1 is applied and compare the position of the time domain resource of the PDSCH(s) where the TCI states are applied with the timeDurationForQCL to thereby identify whether the TCI states are applied.

As an example, if the time when the TCI states are applied to the PDSCHs in method 1 is after a time based on the set timeDurationForQCL, the UE may consider that all the TCI states indicated in the DCI are cyclically mapped to the PDSCH. In other words, the UE identifying that the last symbol index of the PDCCH transmitted from the base station is 2, and the set timeDurationForQCL value is 7, if the transmission time (start time) of the PDSCHs scheduled to have the TCI states applied thereto is identical to or after the symbol of symbol index 9, may sequentially apply TCI state #1 to the first PDSCH allocated from TRP1, TCI state #2 to the second PDSCH allocated from TRP2, TCI state #1 to the third PDSCH allocated from TRP 1, and TCI state #2 to the fourth PDSCH allocated from TRP2 upon reception.

As another example, the UE identifying that the last symbol index of the PDCCH transmitted from the base station is 2, and the set timeDurationForQCL value is 14, if the transmission time (start time) of the PDSCH(s) scheduled to have the TCI states applied thereto is equal to or after the symbol of symbol index 1 in the next slot, may sequentially apply TCI state #1 to the first PDSCH allocated from TRP1, TCI state #2 to the second PDSCH allocated from TRP2, TCI state #1 to the third PDSCH allocated from TRP1, and TCI state #2 to the fourth PDSCH allocated from TRP2 upon reception.

Alt 3-2

Embodiments related to default QCL are described as an example in Alt 3-2.

If the time when the TCI states are applied to the PDSCHs is before a position based on the set timeDurationForQCL, the UE, which receives the plurality of PDSCHs where the TCI states are indicated from the base station, may not completely sequentially allocate all TCI state information indicated in the DCI to the PDSCHs.

As an example, if at least one symbol of the first PDSCH (e.g., PDSCH #1) among the plurality of PDSCHs is present in the timeDurationForQCL-based position as illustrated in 17-00 of FIG. 17, the UE receiving the plurality of PDSCHs where the TCI states are indicated from the base station may apply the default spatial QCL, rather than applying TCI state #1 indicated in the first PDSCH. Here, the default spatial QCL means the QCL parameter used to receive the PDCCH in the CORESET associated with the monitored search space having the lowest CORESET ID in the latest slot. The UE may sequentially apply TCI state #2 to the second PDSCH (PDSCH #2) allocated from TRP2, TCI state #1 to the third PDSCH (PDSCH #3) allocated from TRP1, and TCI state #2 to the fourth PDSCH (PDSCH #4) allocated from TRP2 upon reception. In other words, although the base station instructs the UE to apply TCI state #1 to the first PDSCH as illustrated in 17-30 of FIG. 17, if the start symbol of the first PDSCH is symbol no. 4, and the symbol length is 5, the UE identifying that the last symbol index of the PDCCH is 2, and the timeDurationForQCL is 7 may apply the default spatial QCL to the first PDSCH, TCI state #2 to the second PDSCH where the symbol index starts from 9, as allocated from TRP2, TCI state #1 to the third PDSCH which starts from symbol no. 0 in the next slot, as allocated from TRP1, and TCI state #2 to the fourth PDSCH which starts from symbol no. 5 in the next slot, upon reception.

The default spatial QCL of the first PDSCH or the second PDSCH may correspond to at least one of TRP1, TRP2, or TRP transmitting DCI.

Alt 3-3

Embodiments related to default QCL are described as an example in Alt 3-3.

As an example, if at least one symbol of the first PDSCH (e.g., PDSCH #1) among the plurality of PDSCHs is present in the position based on the timeDurationForQCL, the UE receiving the plurality of PDSCHs where the TCI states are indicated from the base station may apply the default spatial QCL, rather than TCI state #1, to the first PDSCH. The UE may sequentially apply TCI state #2 to the second PDSCH (PDSCH #2) allocated from TRP2, the default QCL applied to the first PDSCH, rather than TCI state #1, to the third PDSCH (PDSCH #3) allocated from TRP1, and TCI state #2 to the fourth PDSCH allocated from TRP2, upon reception.

As another example, if at least one symbol of the second PDSCH (e.g., PDSCH #2) among the plurality of PDSCHs is present in the timeDurationForQCL-based position, the UE receiving the plurality of PDSCHs where the TCI states are indicated from the base station, the UE may apply the default spatial QCL, rather than TCI state #1 and TCI state #2, to the first and second PDSCHs. The UE may sequentially apply the default QCL, which is applied to the first PDSCH, rather than TCI state #1, to the third PDSCH allocated from TRP1 and the default spatial QCL, which is applied to the second PDSCH, rather than TCI state #2, to the fourth PDSCH allocated from TRP2. The default spatial QCL applied to the first PDSCH and the default spatial QCL applied to the second PDSCH may be the same or different. The default spatial QCL of the first PDSCH may correspond to at least one of TRP1, TRP2, or TRP transmitting DCI.

Alt 3-4

Embodiments related to default QCL are described as an example in Alt 3-3.

For example, in scheme 3, if the start positions of all of the plurality of PDSCHs repeated before the timeDurationForQCL-based position, the UE receiving the PDSCH where the TCI states are indicated from the base station in slot #0/#1 of 18-00 of FIG. 18 may apply the default spatial QCL, rather than the TCI states indicated for the first PDSCH and the second PDSCH or the first PDSCH to the fourth PDSCH. Here, one or two default QCLs may be set and operated based on the single-PDCCH default QCL enhancement. In other words, although the base station instructs the UE to apply TCI state #1 to TCI state #2 to the first to fourth PDSCHs in slot #1, if the start symbol of the first PDSCH is symbol no. 4, and the symbol length is 1, the UE identifying that the last symbol index of the PDCCH is 2, and the timeDurationForQCL is 7 may apply the default spatial QCL to the first to fourth PDSCHs since the symbol indexes (nos. 4, 5, 6 and 7) of the start positions of all of the plurality of repeated PDSCHs are smaller than the symbol index (no. 9) of the timeDurationForQCL-based position. In this case, two default QCLs may be set or determined and, by applying the same, the PDSCHs may be received.

Alt 4-1

If the number of TCI states indicated in each TRP is smaller than the number of PDSCHs repeatedly transmitted as illustrated in FIG. 18, the UE may identify whether method 2 is applied and compare the position of the time domain resource of the PDSCH(s) where the TCI states are applied with the timeDurationForQCL to thereby identify whether the TCI states are applied.

As an example, if the time when the TCI states are applied to the PDSCHs in case 1 is after a position based on the set timeDurationForQCL, the UE may consider that all the TCI states indicated in the DCI are sequentially mapped to the PDSCH. In other words, the UE identifying that the last symbol index of the PDCCH transmitted from the base station is 2, and the set timeDurationForQCL value is 7, if the transmission time (start time) of the PDSCHs scheduled to apply the TCI states are identical to or after symbol no. 9, may sequentially apply TCI state #1 to the first PDSCH (PDSCH #1) allocated from TRP1, TCI state #1 to the second PDSCH (PDSCH #2) allocated from TRP1, TCI state #2 to the third PDSCH (PDSCH #3) allocated from TRP2, and TCI state #2 to the fourth PDSCH (PDSCH #4) allocated from TRP2, upon reception.

As another example, the UE identifying that the last symbol index of the PDCCH transmitted from the base station is 2, and the set timeDurationForQCL value is 14, if the transmission time (start time) of the PDSCH(s) scheduled to have the TCI states applied thereto is equal to or after symbol no. 1 in the next slot, may sequentially apply TCI state #1 to the first PDSCH allocated from TRP1, TCI state #1 to the second PDSCH allocated from TRP1, TCI state #2 to the third PDSCH allocated from TRP1, and TCI state #2 to the fourth PDSCH allocated from TRP2 upon reception.

Alt 4-2

If the time when the TCI states are applied to the PDSCHs is before a position based on the set timeDurationForQCL, the UE, which receives the plurality of PDSCHs where the TCI states are indicated from the base station, may not completely sequentially allocate all TCI state information indicated in the DCI to the PDSCHs.

As an example, if at least one symbol of the first PDSCH (e.g., PDSCH #1) among the plurality of PDSCHs is positioned in the timeDurationForQCL-based position as in FIG. 18-00, the UE receiving the plurality of PDSCHs where the TCI states are indicated from the base station may apply the default spatial QCL, rather than TCI state #1 indicated in the first PDSCH. The default spatial QCL means the QCL parameter used to receive the PDCCH in the CORESET associated with the monitored search space having the lowest CORESET ID in the latest slot. The UE may sequentially apply TCI state #1 to the second PDSCH allocated from TRP1, TCI state #2 to the third PDSCH allocated from TRP2, and TCI state #2 to the fourth PDSCH allocated from TRP2 upon reception. In other words, although the base station instructs the UE to apply TCI state #1 to the first PDSCH as illustrated in FIG. 18-30, if the start symbol of the first PDSCH is symbol no. 4, and the symbol length is 5, the UE identifying that the last symbol index of the PDCCH is 2, and the timeDurationForQCL is 7 may apply the default spatial QCL to the first PDSCH, TCI state #1 to the second PDSCH where the symbol index allocated from TRP1 starts from 9 and TCI state #2 to the third and fourth PDSCHs which start from symbol no. 0 in the next slot, as allocated from TRP2, upon reception. The default spatial QCL of the first PDSCH may correspond to at least one of TRP1, TRP2, or TRP transmitting DCI. The default spatial QCL may be the default spatial QCL mentioned in Alt 3-2.

Alt 4-3

As an example, if at least one symbol of the first or second PDSCH (e.g., PDSCH #1 or #2) among the plurality of PDSCHs is present in the timeDurationForQCL-based position, the UE receiving the plurality of PDSCHs where the TCI states are indicated from the base station may apply the default spatial QCL, rather than TCI state #1 indicated in the first PDSCH. However, the UE may sequentially apply the default spatial QCL to the second PDSCH allocated from TRP1 and TCI state #2 to the third and fourth PDSCHs allocated from TRP2, upon reception.

As another example, if at least one symbol of the second PDSCH (e.g., PDSCH #2) among the plurality of PDSCHs is present in the timeDurationForQCL-based position, the UE receiving the plurality of PDSCHs where the TCI states are indicated from the base station may commonly apply the default spatial QCL to the first to fourth PDSCHs. The default spatial QCL of the first and third PDSCHs may correspond to at least one of TRP1, TRP2, or TRP transmitting DCI.

Alt 4-4

For example, if the start positions of all the PDSCHs repeated are smaller than timeDurationForQCL, the UE receiving the PDSCH where the TCI states are indicated from the base station in slot 0/1 as in 18-00, particularly in scheme 3, may apply the default spatial QCL, rather than the TCI states indicated for the first PDSCH and second PDSCH or the first PDSCH to the fourth PDSCH. Here, one or two default QCLs may be set and operated based on the single-PDCCH default QCL enhancement. In other words, although the base station instructs the UE to apply TCI state #1 and TCI state #2 to the first to fourth PDSCHs in slot 1, if the start symbol of the first PDSCH is symbol no. 4, and the symbol length is 1, the UE identifying that the last symbol index of the PDCCH is 2, and the timeDurationForQCL is 7 may apply the default spatial QCL to the first to fourth PDSCHs since the symbol indexes of the start positions of all of the plurality of PDSCHs repeated are smaller than the symbol index (no. 9) in the position considering the timeDurationForQCL. In this case, two default QCLs may be set or determined and, by applying the same, the PDSCHs may be received.

Meanwhile, the meaning of the default spatial QCL described in Alt 3/4 may be extended as follows, as well as the above-described meaning, and may be applied to all of the embodiments.

1) The meaning described above in Alt 3/4, i.e., the QCL parameter used to receive the PDCCH in the CORESET associated with the monitored search space having the lowest CORESET ID in the latest slot.

2) Default spatial QCL (default spatial QCL for PDSCH) for PDSCH set by, e.g., MAC-CE. In this case, the same default spatial QCL may be set for all the TRPs, or a different default spatial QCL may be set for each TRP.

3) Default spatial QCL for PDSCH may mean a value having the lowest ID among the TCI states for PDSCH set by RRC or a value having the lowest ID among the TCI states for PDSCH activated by MAC-CE.

Different default spatial QCLs may be applied depending on contexts. For example, in the case of cross-carrier scheduling or cross-BWP scheduling, a default spatial QCL, as described in 3), may be applied and, in other cases, a default spatial QCL, as described in 1) or a default spatial QCL, as described in 2) may be applied. In the case of a UE supporting MAC-CE for configuring a default spatial QCL for PDSCH, a default spatial QCL as described in 1) may be applied before activating the corresponding MAC-CE and, thereafter, a default spatial QCL as described in 2) may be applied.

4) TCI state(s) corresponding to the lowest codepoint among the TCI states set as TCI in the DCI field may be used as the default QCL. As an example, the lowest codepoint may mean that the index value of the codepoint itself has the smallest value among the codepoints of the TCI field. In this case, the lowest codepoint may include two or more TCI states. As another example, the lowest codepoint may mean the smallest value (index) among the codepoints including at least two or more TCI states among the plurality of codepoints of the TCI field.

For example, when the number of the TCI states indicated by the lowest codepoint is 2, both the first TCI state and the second TCI state may be determined as default QCLs. In other words, if both the determined first and second TCI states are determined as default QCLs, the UE may perform beamforming based on both the first and second TCI states. As another example, when the number of TCI states indicated by the lowest codepoint is 2, at least one of the first TCI state and the second TCI state may be determined as a default QCL. In other words, if only the first TCI state is determined as the default QCL, the UE may perform beamforming based on only the first TCI state and if only the second TCI state is determined as the default QCL, the UE may perform beamforming based on only the second TCI state. A method for determining one of the two TCI states may follow the settings of the base station and the UE or follow a predetermined operation.

5) When all the TCI codepoints contain one TCI state and are mapped, Rel-15-based base station/UE operations are followed.

The above-described default QCL operations may be features defined in the UE capability.

As an example, the UE where cyclicMapping is enabled as illustrated in FIG. 17 may apply the first TCI state of the lowest codepoint as the default spatial QCL applied to the first PDSCH transmitted from TRP1 in the case of Alt 3-2 to Alt 4 described above and apply the second TCI state of the lowest codepoint as the default spatial QCL applied to the second PDSCH transmitted from TRP2. Further, the UE may apply the TCI states indicated in the scheduling DCI or the first TCI state of the lowest codepoint as the default spatial QCL applied to the first PDSCH transmitted from TRP3 and apply the TCI states indicated in the scheduling DCI or the second TCI state of the lowest codepoint as the default spatial QCL applied to the second PDSCH transmitted from TRP4.

As another example, referring to FIG. 18, the UE where cyclicMapping is enabled may apply the first TCI state of the lowest codepoint as the default spatial QCL applied to the first and second PDSCHs transmitted from TRP1 and apply the TCI states indicated in the scheduling DCI or the second TCI state of the lowest codepoint as the default spatial QCL applied to the second PDSCH transmitted from TRPs 3 and 4, under the conditions shown in Alt 4-2 to Alt 4-4.

18-60 of FIG. 18 shows an example in which Koffset between the plurality of PDSCHs allocated to the UE by the base station is not zero (e.g., when Koffset is set to 4) in various embodiments of Alt3 and Alt4. Here, as a condition under which a change is made to Koffset, if the timeDurationForQCL-based position is present in the offset area (including the borders) located between the PDSCHs on the time axis, the UE may consider the PDSCH(s) present before the offset as an area for determining whether to apply the default QCL. As an example, the UE identifying that the last symbol index of the PDCCH transmitted from the base station is 2, and the set timeDurationForQCL value is 7, if the transmission time (start time) of the PDSCHs scheduled to have the TCI states applied is equal to or larger than symbol no. 9, may apply TCI state #1 to the first PDSCH allocated from TRP1, TCI state #2 to the second PDSCH allocated from TRP2, TCI state #1 to the third PDSCH allocated from TRP1, and TCI state #2 to the fourth PDSCH allocated from TRP2, upon reception.

As another example, although the base station instructs the UE to apply TCI state #1 to the first PDSCH, if the start symbol of the first PDSCH is symbol no. 4, and the symbol length is 4, and Koffset is 2, the UE identifying that the last symbol index of the PDCCH is 2 and the timeDurationForQCL is 7 may additionally identify that the timeDurationForQCL is present in the offset area between the first PDSCH and the second PDSCH or an area before the second PDSCH and may apply the default spatial QCL to the first PDSCH and the above-described various embodiments (Alt 3 and Alt 4) to the second PDSCH to the fourth PDSCH.

Figure 19:
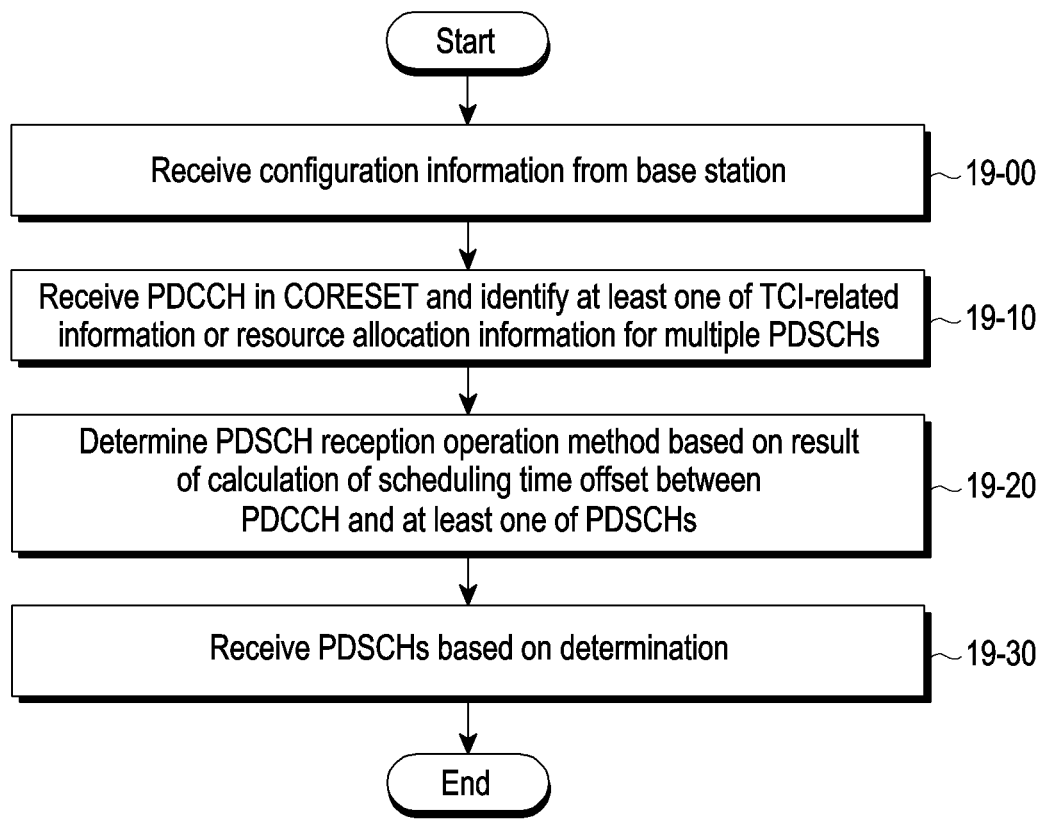
FIG. 19 is a flowchart illustrating a method for operating a UE according to an embodiment of the disclosure.

FIG. 19 is a flowchart illustrating a method for operating a UE according to an embodiment of the disclosure.

Referring to FIG. 19, a method for receiving a PDSCH based on NC-JT transmission by a UE and a default QCL assumption.

In operation 19-00, the UE may receive at least one configuration information including at least one of parameters (e.g., tci-PresentinDCI or RepTCIMapping) related to base station beamforming and parameters or configuration information (e.g., PDDCH-config and PDSCH-config) for a control channel and a data channel during an RRC setup process with the base station. According to the set value of the RepTCIMapping parameter, the UE may identify, e.g., data, resource-related information, and beamforming patterns repeatedly transmitted from the base station.

Further, in operation 19-00, the UE may transmit UE capability information (e.g., timeDurationForQCL) to the base station. The UE may transmit the UE capability information at a request of the base station or at a predetermined time (e.g., during an RRC setup process with the base station). Accordingly, when the base station receives the capability information for the UE, the operation of receiving the capability may be omitted. Alternatively, the operation of receiving the capability may be omitted according to the configuration information.

Thereafter, the UE receives the first PDCCH in a specific CORESET based on the configuration information from the base station.

Further, in operation 19-10, the UE may identify at least one of resource allocation information for the PDCCH and the plurality of PDSCHs, TCI-related information, and antenna port information. The plurality of PDSCHs (e.g., two PDSCHs or four PDSCHs) may be repeatedly transmitted based on the repeatedly transmitted data, resource-related information, and beamforming patterns described above in connection with FIGS. 16 to 18.

Based on the identified information, the UE may calculate a scheduling time offset between the PDCCH and at least one of the PDSCHs (e.g., between the PDDCH and the N-th PDSCH, where N is an integer of 2, 4 or more), and in operation 19-20, the UE may determine at least one of the reception beamforming direction or reception operation (or reception operation method) of the Nth PDSCH (e.g., N is an integer of 2, 4, or more) based on the result of calculation. As an example, determining a reception operation method by the UE may include determining at least one of determining whether to receive data via at least one of the first PDSCH or the second PDSCH or, when it is determined to receive data, a method for receiving data. As another example, determining a reception operation method by the UE may include determining whether to receive data via at least one of the Nth PDSCHs or, when it is determined to receive data via the Nth PDSCH, determining the data, resource-related information, and beamforming pattern repeated transmitted to receive data.

In operation 19-30, the UE may receive data via the first PDSCH or the second PDSCH corresponding to the first PDCCH or the second PDCCH based on at least one of the identified information in operation 19-10 and the result of determination in operation 19-20.

The UE may perform decoding on the received data.

Figure 20:
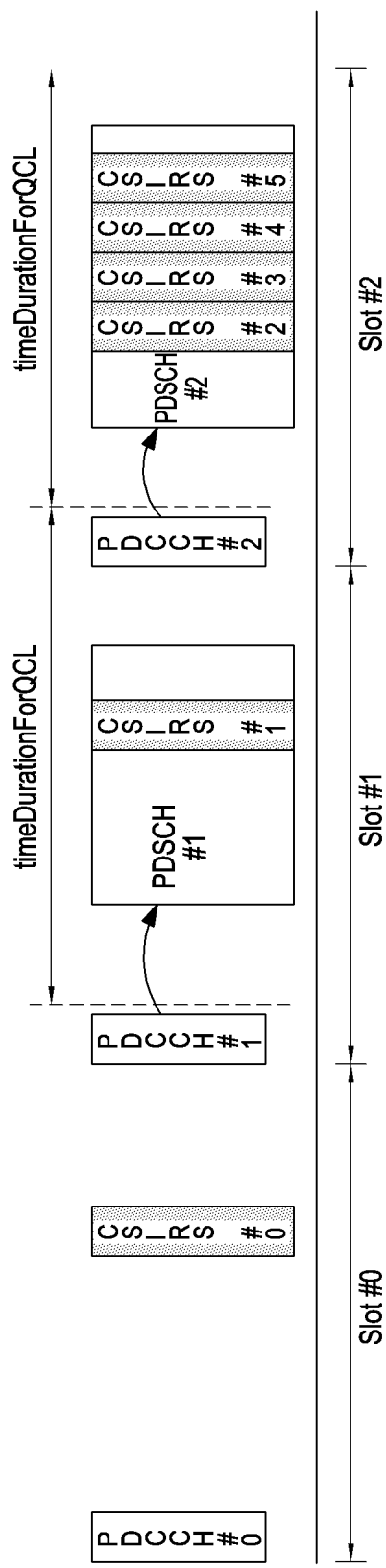
FIG. 20 is a view illustrating a method for receiving a PDSCH based on NC-JT transmission by a UE and a default a quasi co-location (QCL) configuration according to an embodiment of the disclosure.

FIG. 20 is a view illustrating a method for receiving a PDSCH based on NC-JT transmission by a UE and a default QCL assumption according to an embodiment of the disclosure.

Referring to FIG. 20, depending on the UE feature, the UE whose maxNumberActiveTCI-PerBWP is 1 may report relevant UE capability-related information to the base station. The UE may support one active TCI state per CC or per BWP, and the UE may track one active TCI state, as default, to receive the PDCCH and PDSCH. When the CSI-RS(s) (e.g., slot #0) for RLM purposes, CSI-RS(s) (e.g., slot #1) for beam management purposes, CSI-RS(s) for the purpose of beam failure detection, or CSI-RS(s) for tracking purposes are configured, the UE may receive the periodic CSI-RS, SPS CSI-RS, and aperiodic CSI-RS and measure the channel.

If beam switching on the first PDCCH is indicated to the UE, and the scheduled first PDSCH and the first CSI-RS for channel measurement overlap on the same OFDM symbol as in 20-00 of FIG. 20, such an occasion may arise where the default QCL-based default PDSCH beam may conflict with the CSI-RS QCL type-D assumption set in the RRC. In this case, if the start time of the PDSCH is positioned before the timeDurationForQCL-based time, the UE may receive the PDSCH according to the configured default QCL (or enhanced default QCL) so as to receive the PDSCH allocated from the PDCCH indicating beam switching, considering the set timeDurationForQCL value (e.g., 7, 14, or 28 symbols in the case of SCS 60 kHz or 14 or 28 kHz in the case of SCS 120 kHz).

The (enhanced) default QCL may operate based on at least one of various methods as follows.

1) The above-described meaning, i.e., the QCL parameter used to receive the PDCCH in the CORESET associated with the monitored search space having the lowest CORESET ID in the latest slot.

2) Default spatial QCL for PDSCH set by, e.g., MAC-CE. In this case, the same default spatial QCL may be set for all the TRPs, or a different default spatial QCL may be set for each TRP.

3) Default spatial QCL for PDSCH may mean a value having the lowest ID among the TCI states for PDSCH set by RRC or a value having the lowest ID among the TCI states for PDSCH activated by MAC-CE.

Different default spatial QCLs may be applied depending on contexts. For example, in case of cross-carrier scheduling or cross-BWP scheduling, 3) may be applied, and in other cases, 1) or 2) may be applied. In the case of a UE supporting MAC-CE for configuring a default spatial QCL for PDSCH, 1) may be applied before activating the corresponding MAC-CE and, thereafter, 2) may be applied.

4) The QCL type-D assumption of the CSI-RS symbol(s) overlapped on the time domain resource may be applied as the enhanced default QCL to receive the scheduled PDSCH and received.

The instant embodiment may also be applied to various embodiments described above in connection with FIGS. 16 to 18.

As an example, if the plurality of PDSCH resources overlap the CSI-RS on the time domain resource through the plurality of TRPs in a single PDCCH, the QCL type-D assumption of the CSI-RS may be applied to receive the PDSCH.

As another example, if each PDSCH scheduled in the plurality of (e.g., two) PDCCHs is allocated as illustrated in FIGS. 12 and 13, the base station may configure the CSI-RS in a specific UE in association with, e.g., each CORESET index or TRP index where the PDSCHs are allocated. Methods for configuring in association may include directly indicating the CORESET index or TRP index to the CSI-RS or indicating the CORESET index or TRP index to the SSB or RS referenced by the CSI-RS in the QCL relation.

In this case, if the configured CSI-RS resource overlaps the PDSCH transmitted from the same TRP, the UE may apply the QCL type-D assumption of the CSI-RS to receive the overlapped PDSCH. If the configured CSI-RS resource overlaps the PDSCH(s) transmitted from different TRPs, the UE may apply the default spatial QCL (e.g., following at least one of the enhance default QCLs 1), 2), and 3)) of the PDSCH resource or apply the QCL type-D assumption of the CSI-RS.

Additionally, if the configured CSI-RS resource overlaps the PDSCH transmitted from at least one TRP, the UE may commonly apply the default spatial QCL (e.g., following at least one of the enhance default QCLs 1), 2), and 3)) or the QCL type-D assumption of the CSI-RS to receive all the PDSCHs transmitted from the TRPs.

In the case where a plurality of PDSCHs are repeatedly allocated to have an offset as illustrated in 16-60, 17-60, and 18-60, if the plurality of PDSCH resources and the CSI-RS do not overlap on the time domain resource but overlap the offset symbol resource, the QCL type-D assumption of the CSI-RS may be applied to receive the PDSCH.

Figure 21A:
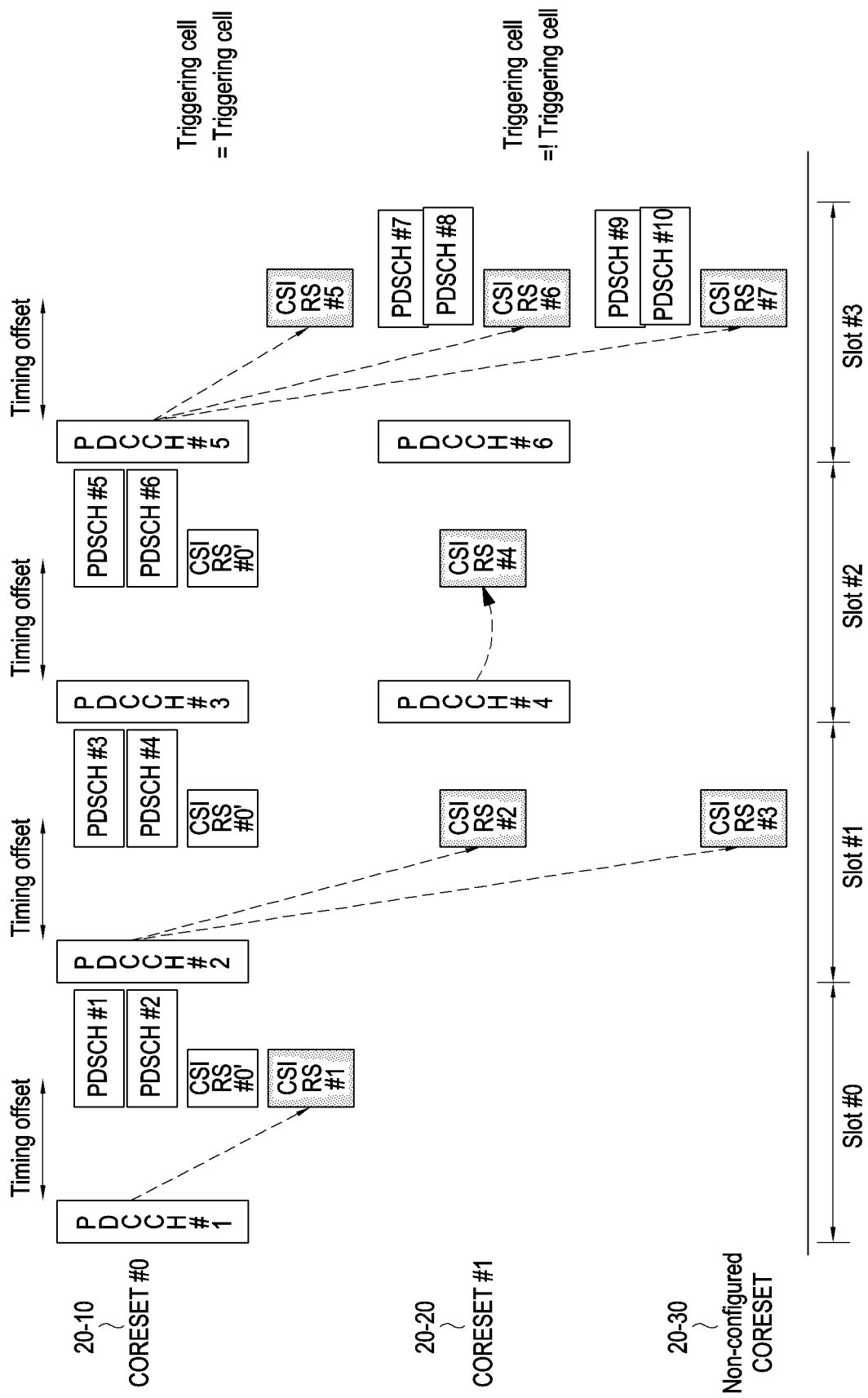

FIGS. 21A and 21B are views illustrating a method for receiving an aperiodic or periodic CSI-RS and a PDSCH based on non-coherent-joint transmission (NC-JT) by a UE and a default QCL configuration according to various embodiments of the disclosure.

Referring to FIG. 21A, 20-10, and 20-20 of FIG. 21A assume that the aperiodic CSI-RS (AP-CSI-RS) is configured in the CORESET in the active BWP of the triggered cell, and 20-30 of FIG. 21A assumes that the aperiodic CSI-RS is not configured in the CORESET in the active BWP of the triggered cell.

20-10 of FIG. 21A illustrates an example in which in slot #0 to slot #3, the first serving cell transmits PDCCH #1, PDCCH #2, PDCCH #3, and PDCCH #5 in the configured CORESET (e.g., CORESET #0), transmits PDSCH(s) (e.g., PDSCH #1 and PDSCH #2) based on a single DCI scheduled in PDCCH #1, particularly in slot #0 to slot #2, transmits PDSCH(s) (e.g., PDSCH #3 and PDSCH #4) based on a single DCI scheduled in PDCCH #2, and transmits PDSCH(s) (e.g., PDSCH #5 and PDSCH #6) based on a single DCI scheduled in PDCCH #3. As an example, the PDSCH(s) scheduled based on the single DCI include one codeword and, if the codeword is transmitted via a plurality of layers, some thereof may be represented as PDSCH #1 while the others are represented as PDSCH #2. Here, one indicated among the plurality of beams or TCI states (e.g., two beams/TCI states) indicated in PDCCH #1 is applied to PDSCH #1, and one indicated among the plurality of beams or TCI states (e.g., two beams/TCI states) indicated in PDCCH #1 is applied to PDSCH #2.

As another example, the PDSCH(s) scheduled based on the single DCI include two codewords, and a plurality of layers transmitting one of the two codewords may be represented as PDSCH #1, and a plurality of layers transmitting the remaining codeword of the two codewords may be represented as PDSCH #2. Here, one indicated among the plurality of beams or TCI states (e.g., two beams/TCI states) indicated in PDCCH #1 is applied to PDSCH #1, and one indicated among the plurality of beams or TCI states indicated in PDCCH #1 is applied to PDSCH #2.

The base station of the first serving cell transmits the periodic CSI-RS (CSI-RS #0 or CSI-RS #0') and the aperiodic CSI-RS (CSI-RS #1 or #5) to measure the UE's downlink channel. In this case, the UE may identify the indication for the aperiodic CSI-RS #1 via PDCCH #1 and the indication for the aperiodic CSI-RS #5 via PDCCH #5.

The serving cells in slot #0 to slot #3 in 20-20 of FIG. 21A denote the serving cells, i.e., the first serving cell and the second serving cell, described above in connection with 20-10 of FIG. 21A. It is assumed that in the second serving cell, the CORESET (e.g., CORESET #1) is configured in a different active BWP. 20-20 of FIG. 21A illustrates an example in which the base station of the second serving cell transmits the aperiodic CSI-RS #2 and CSI-RS #6, indicated based on cross-carrier scheduling in PDCCH #2 of CORESET #0 in slot #1, or the aperiodic CSI-RS #4, indicated based on self-carrier scheduling in PDCCH #4 of a different CORESET #1. The UE may identify the indication for the aperiodic CSI-RS #2, CSI-RS #4, and CSI-RS #6 via PDCCH #2, PDCCH #4, and PDCCH #5. Single TRP-based NC-JT transmission may be configured in the carrier and BWP where CORESET #1 belongs.

The serving cells in slot #0 to slot #3 in 20-30 of FIG. 21A denote the serving cells, i.e., the first serving cell and the third serving cell, described above in connection with 20-10 of FIG. 21A. It is assumed that the third serving cell does not have a separate CORESET configured in another active BWP (non-configured CORESET). The base station of the third serving cell transmits CSI-RS #3 indicated based on cross-carrier scheduling in PDCCH #2 of CORESET #0 in slot #1 and transmits CSI-RS #7 scheduled in PDCCH #5 in slot #3. 20-30 of FIG. 21A may include a case where single TRP-based NC-JT transmission is configured.

It should be noted that the various embodiments in slots #0 to #3 do not necessarily require the base station to simultaneously perform scheduling but are intended merely to describe various embodiments.

In the following embodiments of the disclosure, which are based on the above-described embodiments of the disclosure, there are described operations for configuring and determining beams by a UE in each scenario and context when the scheduling offset between the last symbol of PDCCH #1 to PDCCH #3 received by the UE and the start symbol of aperiodic CSI-RS #1 to CSI-RS #7 transmitted in the same serving cell (triggering cell) or a different serving cell (triggered cell) is smaller than a time (beamSwitchTiming or beamSwitchTiming+d) required to switch beams. For the time required to switch beams, the parameter value of beamSwitchTiming is applied if the triggering cell (first serving cell) and the triggered cell (second serving cell or third serving cell) have the same numerology, and the parameter value of beamSwitchTiming+d is applied if the triggering cell (first serving cell) and the triggered cell (second serving cell or third sec) have different numerologies. Here, d denotes the beam switching timing delay, and when μPDCCH is 0, 1, or 2, d may be calculated and applied as 8, 8, and 14 symbols.

Case 1-1

First, if the resource for the aperiodic CSI-RS and the resource for NC-JT-based PDSCH(s) transmitted from the base station in one serving cell, i.e., the first serving cell, where the triggering cell and the triggered cell are operated based on the same self-scheduling as illustrated in 20-10 of FIG. 21A in slot #0 at least partially overlap (e.g., when part of the resource for the aperiodic CSI-RS and part of the resource for the NC-JT-based PDSCH(s) of the first serving cell are the same) or completely overlap (e.g., when the whole resource for the aperiodic CSI-RS and the whole resource for the NC-JT-based PDSCH(s) of the first serving cell are the same), the UE may apply the QCL configuration of a different DL signal (e.g., PDSCH or periodic/aperiodic CSI-RS) at the time of reception of the aperiodic CSI-RS.

Here, if the different DL signal is the PDSCH(s) for NC-JT, like PDSCH #1 and PDSCH #2 of the single DCI-based multi-TRP, the UE is unable to change the beam direction for reception of the aperiodic CSI-RS. Thus, the UE may determine to follow the beam direction for receiving the NC-JT-based PDSCH(s) of CORESET #0. In this case, the UE may configure two beams to receive both PDSCH #1 and PDSCH #2 and may set to receive one (e.g., the beam of PDSCH #1 or the beam of PDSCH #2) of the two beams. The operation of selecting one of the two beams may be dependent upon the UE's implementation or may follow a decision between the base station and the UE.

When beam switching of the PDSCH(s) may be indicated in PDCCH #1 scheduling PDSCH #1 and PDSCH #2, and the time (timeDurationForQCL) for the UE receiving the beam switching indication to apply a QCL configuration change according to the beam switching for receiving the PDSCHs is sufficient, the beam direction is determined based on the TCI state(s) indicated in the TCI codepoint in the DCI in PDCCH #1 to receive PDSCH #1 and PDSCH #2.

If the time (timeDurationForQCL) for the UE to apply the QCL configuration is insufficient, e.g., when timeDurationForQCL is less than a preset value, any one of the extended default QCL operations (e.g., 1) to 5) of default spatial QCL) described above in connection with Alt3 and Alt4 may be followed. For example, if PDSCH(s) are transmitted from the first serving cell based on a single DCI, the UE may use the TCI state(s) corresponding to the lowest codepoint among the TCI states configured with the TCI in the DCI field of PDCCH #2 as the default QCL configuration (e.g., extended default spatial QCL operation 4).

In the case where the aperiodic CSI-RS does not overlap the PDSCH or other RS, if single DCI-based NC-JT (S-DCI based NC-JT) is configured in the CSI-RS-triggered cell, a QCL configuration for CSI-RS reception may be determined according to one of the extended default QCL operations (e.g., 1) to 5) of the extended default spatial QCL) described above in connection with Alt3 and Alt 4. For example, if single DCI-based NC-JT PDSCH is set to be receivable in the first serving cell, the UE may select one or two of the TCI states activated by, e.g., MAC-CE to receive the PDSCH in the first serving cell and use the selected one or two TCI states as the default QCL configuration to receive the CSI-RS (e.g., extended default spatial QCL operation 4)). In this case, when two TCI states are selected, one or more TCI codepoints may be mapped with two of the activated TCI states. In this case, the TCI state(s) corresponding to the lowest codepoint among the TCI codepoints mapped with the two TCI states may be used as the default QCL configuration (e.g., extended default spatial QCL operation 4)). Here, the UE may apply the QCL configuration corresponding to two TCI states corresponding to the lowest codepoint or apply the QCL configuration corresponding to one (first/second) TCI state of the two TCI states. The operation of determining one of the two TCI states may be based on the implementation of the UE or may follow a decision between the base station and the UE. The UE may perform an additional operation through a beam agreed on with the base station upon reception of the aperiodic CSI-RS by applying the QCL configuration corresponding to the TCI states corresponding to the lowest codepoint.

Case 1-2

First, as an example, if the resource for aperiodic CSI-RS #2 transmitted from the base station of a different serving cell, e.g., the second serving cell, where the triggering cell and the triggered cell are operated based on different cross-scheduling in slot #1 and the resource for the NC-JT-based PDSCH(s) of the triggering cell, e.g., the first serving cell at least partially overlap (e.g., when part of the resource for the aperiodic CSI-RS #2 is the same as part of the resource for the NC-JT-based PDSCH(s) of the first serving cell) or completely overlap (e.g., when the whole resource for aperiodic CSI-RS #2 and the whole resource for the NC-JT-based PDSCH(s) of the first serving cell are the same) as described above in connection with 20-20 of FIG. 21A, the UE may apply the QCL configuration of the different DL signal (e.g., PDSCH or periodic/aperiodic CSI-RS) at the time of reception of the aperiodic CSI-RS.

Here, if the different DL signal is the PDSCH(s) for NC-JT, like PDSCH #1 and PDSCH #2 of the single DCI-based multi-TRP, the UE is unable to change the beam direction for reception of the aperiodic CSI-RS. Thus, the UE may determine to follow the beam direction for receiving the NC-JT-based PDSCH(s) of CORESET #0. In this case, the UE may configure two beams to receive both PDSCH #3 and PDSCH #4 and may set to select only one (e.g., the beam of PDSCH #3 or the beam of PDSCH #4) of the two beams. The operation of determining one of the two beams may be based upon the UE's implementation or may follow a decision between the base station and the UE.

When beam switching of the PDSCH(s) may be indicated in PDCCH #2 scheduling PDSCH #3 and PDSCH #4, and the time (timeDurationForQCL) for the UE receiving the beam switching indication to apply a QCL configuration change according to the beam switching is sufficient, e.g., when timeDurationForQCL is not smaller than a threshold time, the beam direction is determined based on the TCI state(s) indicated in the TCI codepoint in the DCI in PDCCH #2 to receive PDSCH #3 and PDSCH #4.

If the time (timeDurationForQCL) for the UE to apply the QCL configuration is insufficient, e.g., when timeDurationForQCL is less than the threshold time, one of the extended default QCL operations (e.g., 1) to 5) of default spatial QCL) described above in connection with Alt3 and Alt4 may be followed. For example, if PDSCH(s) are transmitted from the first serving cell based on a single DCI, the UE may use the TCI state(s) corresponding to the lowest codepoint among the TCI states configured with the TCI in the DCI field of PDCCH #2 as the default QCL configuration (e.g., extended default spatial QCL operation 4).

As another example, if transmission is configured only for a single TRP in the second serving cell, and the CORESET is configured, the UE may apply the QCL configuration used in the CORESET associated with the search space of the lowest CORESET ID in the latest slot in at least one CORESET in the active BWP of the second serving cell.

As another example, if single DCI-based multi-TRP transmission is set in the second serving cell, the UE may select one or two of the TCI states activated by, e.g., MAC-CE to receive the PDSCH in the active BWP of the second serving cell and use the selected one or two TCI states as the default QCL configuration (e.g., extended default spatial QCL operation 4)). In this case, when two TCI states are selected, one or more TCI codepoints may be mapped with two of the activated TCI states. In this case, the TCI state(s) corresponding to the lowest codepoint among the TCI codepoints mapped with the two TCI states may be used as the default QCL configuration (e.g., extended default spatial QCL operation 4)). Here, the UE may apply the QCL configuration corresponding to two TCI states corresponding to the lowest codepoint or apply the QCL configuration corresponding to one (first/second) TCI state of the two TCI states. The operation of determining one of the two TCI states may be based on the implementation of the UE or may follow a decision between the base station and the UE.

Case 1-3

First, as an example, if the resource for aperiodic CSI-RS #3 transmitted from the base station of the third serving cell, where the triggering cell and the triggered cell are operated based on different cross-scheduling in slot #1 and the resource for the NC-JT-based PDSCH(s) of the triggering cell, e.g., the first serving cell at least partially overlap (e.g., when part of the resource for the aperiodic CSI-RS #3 is the same as part of the resource for the NC-JT-based PDSCH(s) of the first serving cell) or completely overlap (e.g., when the whole resource for aperiodic CSI-RS #3 and the whole resource for the NC-JT-based PDSCH(s) of the first serving cell are the same) as described above in connection with 20-20 of FIG. 21A, the UE may apply the QCL configuration of the different DL signal (e.g., PDSCH or periodic/aperiodic CSI-RS) at the time of reception of the aperiodic CSI-RS #3.

Case 1-3-a

First, if the triggering cell, i.e., the serving cell, is operated as a single TRP, the UE may apply the QCL configuration used in the CORESET associated with the search space of the lowest CORESET ID in the latest slot in at least one or more CORESETs in the BWP of the serving cell, rather than the beam direction for the aperiodic CSI-RS at the time of reception of the aperiodic CSI-RS.

Case 1-3-b

If the triggering cell is operated as a single DCI-based multi-TRP, the UE may apply the QCL configuration as described above in connection with case 1-2.

Case 1-4

First, if the triggering cell, i.e., the first serving cell, and the triggered cell, i.e., the second serving cell, are operated based on the same self-scheduling in slot #2, and the resource for aperiodic CSI-RS #4 transmitted from the base station of the second serving cell and the resource for the NC-JT-based PDSCH(s) of the first serving cell at least partially overlap (e.g., when part of the resource for the aperiodic CSI-RS #4 is the same as part of the resource for the NC-JT-based PDSCH(s) of the first serving cell) or completely overlap (e.g., when the whole resource for aperiodic CSI-RS #4 and the whole resource for the NC-JT-based PDSCH(s) of the first serving cell are the same) as described above in connection with 20-20 of FIG. 21A, the UE may apply the QCL configuration of the different DL signal (e.g., PDSCH or periodic/aperiodic CSI-RS) at the time of reception of the aperiodic CSI-RS #4.

Here, if the different DL signal is the PDSCH(s) for NC-JT, like PDSCH #1 and PDSCH #2 of the single DCI-based multi-TRP, the UE is unable to change the beam direction for reception of the aperiodic CSI-RS #4. Thus, the UE may determine to follow the beam direction for receiving the NC-JT-based PDSCH(s). In this case, the UE may configure two beams to receive both PDSCH #5 and PDSCH #6 and may set to receive only one (e.g., the beam of PDSCH #5 or the beam of PDSCH #6) of the two beams. The operation of determining one of the two beams may be based on the implementation of the UE or may follow a decision between the base station and the UE.

If beam switching of PDSCH #5 and PDSCH #6 is indicated in PDCCH #3 scheduling PDSCH #5 and PDSCH

6, and the time (timeDurationForQCL) for the UE receiving the beam switching indication to apply a QCL configuration change according to the beam switching is sufficient, e.g., when timeDurationForQCL is a threshold time or longer, the beam direction is determined according to the TCI state(s) indicated in the TCI codepoint in the DCI in PDCCH #3 to receive PDSCH #5 and PDSCH #6.

If the time (timeDurationForQCL) for the UE to apply the QCL configuration is insufficient, e.g., when the timeDurationForQCL is less than the threshold time, the beam direction for receiving PDSCH #5 and PDSCH #6 may be determined depending on whether it is possible to identify whether the search space of CORESET #1 and PDSCH #5 and PDSCH #6 overlap on the time axis resource or, if possible, whether the search space of CORESET #1 and PDSCH #5 and PDSCH #6 overlap on the time axis resource.

As an example, if it is identified that the search space of CORESET #1 and PDSCH #5 and PDSCH #6 at least partially overlap on the time axis resource, e.g., when it is identified that the search space of CORESET #1 and PDSCH #5 and PDSCH #6 overlap in at least one symbol on the time axis resource, the UE may set to follow the default beam of CORESET #1. Here, if the CORESET is configured so that only the single TRP transmits the default beam in the second serving cell, the UE may apply the QCL configuration used in the CORESET associated with the search space of the lowest CORESET ID in the latest slot in at least one CORESET in the active BWP of the second serving cell. Alternatively, if single DCI-based multi-TRP transmission is set in the second serving cell, the UE may select one or two of the TCI states activated by, e.g., MAC-CE to receive the PDSCH in the active BWP of the second serving cell and use the selected one or two TCI states as the default QCL configuration (e.g., extended default spatial QCL operation 4)). In this case, when two TCI states are selected, one or more TCI codepoints may be mapped with two of the activated TCI states. In this case, the TCI state(s) corresponding to the lowest codepoint among the TCI codepoints mapped with the two TCI states may be used as the default QCL configuration (e.g., extended default spatial QCL operation 4)). Here, the UE may apply the QCL configuration corresponding to two TCI states corresponding to the lowest codepoint or apply the QCL configuration corresponding to one (first/second) TCI state of the two TCI states. The operation of determining one of the two TCI states may be based on the implementation of the UE or may follow a decision between the base station and the UE.

As another example, if the UE identifies that the search space of CORESET #1 and PDSCH #5 and PDSCH #6 do not overlap at least partially, e.g., in at least one or more symbols, the UE may determine a QCL configuration to be applied considering a confliction between the default beam of CORESET #0 of the first serving cell and the default beam of CORESET #1 of the second serving cell. If a carrier aggregation combination configured in the UE is an inter-band CA combination of the CC of the first serving cell and the CC of the second serving cell, the UE may apply the default QCL configuration of CORESET #1 of the second serving cell where the aperiodic CSI-RS, i.e., aperiodic CSI-RS #4, is indicated. If the carrier aggregation combination configured in the UE is an intra-band CA combination of the CC of the first serving cell and the CC of the second serving cell, the UE may apply the default QCL configuration of CORESET #1 of the second serving cell where the aperiodic CSI-RS, i.e., aperiodic CSI-RS #4, is indicated or apply the default QCL configuration of CORESET #0 of the first serving cell. If the carrier aggregation combination configured in the UE is an intra-band CA combination of the CC of the first serving cell and the CC of the second serving cell, which one of the default QCL configuration of CORESET #1 of the second serving cell and the default QCL configuration of CORESET #0 of the first serving cell is to be applied may be based on the UE's implementation or may follow a decision between the base station and the UE.

As another example, the UE may assume that the QCL type-Ds of the default beams configured in the CORESETs in the first serving cell and the second serving cell are the same according to the configuration/implementation of the base station regardless of whether the search space of CORESET #1 and PDSCH #5 and PDSCH #6 overlap at least partially, e.g., in at least one symbol, on the time axis resource.

Case 1-5

As described above in connection with 20-20 of FIG. 21A, if the resource for aperiodic CSI-RS #6 transmitted from the base station of a different serving cell, e.g., the second serving cell, where the triggering cell and the triggered cell are operated based on different cross-scheduling in slot #3 and the resource for NC-JT-based PDSCH(s) of the triggered cell, e.g., the second serving cell at least partially overlap (e.g., when part of the resource for the aperiodic CSI-RS #6 and part of the resource for the NC-JT-based PDSCH(s) of the second serving cell are the same) or completely overlap (e.g., when the whole resource for aperiodic CSI-RS #6 and the whole resource of the NC-JT-based PDSCH(s) of the second serving cell are the same), the UE may apply the QCL configuration of the different DL signal (e.g., PDSCH or periodic/aperiodic CSI-RS) at the time of reception of the aperiodic CSI-RS #6.

Here, if the different DL signal is the PDSCH(s) for NC-JT, like PDSCH #7 and PDSCH #8 of the single DCI-based multi-TRP, the UE is unable to change the beam direction for reception of the aperiodic CSI-RS #6. Thus, the UE may determine to follow the beam direction for receiving the NC-JT-based PDSCH(s). In this case, the UE may configure two beams to receive both PDSCH #7 and PDSCH #8 and may set to select and receive only one (e.g., the beam of PDSCH #7 or the beam of PDSCH #8) of the two beams. The operation of selecting one of the two beams may be based on the implementation of the UE or may follow a decision between the base station and the UE.

If beam switching of the PDSCHs, i.e., PDSCH #7 and PDSCH #8, is indicated in PDCCH #5 scheduling PDSCH #7 and PDSCH #8, and the time (timeDurationForQCL) for the UE receiving the beam switching indication to apply a QCL configuration change according to the beam switching is sufficient, e.g., when timeDurationForQCL is a threshold time or longer, the beam direction is determined according to the TCI state(s) indicated in the TCI codepoint in the DCI in PDCCH #5 to receive PDSCH #7 and PDSCH #8.

If the time (timeDurationForQCL) for the UE to apply the QCL configuration is insufficient, e.g., when timeDurationForQCL is less than the threshold time, one of the extended default QCL operations (e.g., 1) to 5) of default spatial QCL) described above in connection with Alt3 and Alt4 may be followed. For example, if PDSCH(s) are transmitted from the second serving cell based on a single DCI, the UE may use the TCI state(s) corresponding to the lowest codepoint among the TCI states configured with the TCI in the DCI field of PDCCH #6 as the default QCL configuration (e.g., extended default spatial QCL operation 4).

Case 1-6

As described above in connection with 20-30 of FIG. 21A, if the resource for aperiodic CSI-RS #7 transmitted from the base station of a different serving cell, e.g., the third serving cell, where the triggering cell and the triggered cell are operated based on different cross-scheduling in slot #3 and the resource for NC-JT-based PDSCH(s) of the triggered cell, e.g., the third serving cell at least partially overlap (e.g., when part of the resource for the aperiodic CSI-RS #7 and part of the resource for the NC-JT-based PDSCH(s) of the third serving cell are the same) or completely overlap (e.g., when the whole resource for aperiodic CSI-RS #7 and the whole resource of the NC-JT-based PDSCH(s) of the second serving cell are the same), the UE may apply the QCL configuration of the different DL signal (e.g., PDSCH or periodic/aperiodic CSI-RS) at the time of reception of the aperiodic CSI-RS #7.

Here, if the different DL signal is the PDSCH(s) for NC-JT, like PDSCH #9 and PDSCH #10 of the single DCI-based multi-TRP, the UE is unable to change the beam direction for reception of the aperiodic CSI-RS #7. Thus, the UE may determine to follow the beam direction for receiving the NC-JT-based PDSCH(s). In this case, the UE may configure two beams to receive both PDSCH #9 and PDSCH #10 and may set to receive only one (e.g., the beam of PDSCH #9 or the beam of PDSCH #10) of the two beams. The operation of selecting one of the two beams may be based on the implementation of the UE or may follow a decision between the base station and the UE.

If beam switching of the PDSCH(s) is indicated in PDCCH #5 scheduling PDSCH #9 and PDSCH #10, and the time (timeDurationForQCL) for the UE receiving the beam switching indication to apply a QCL configuration change according to the beam switching is sufficient, e.g., when timeDurationForQCL is a threshold time or longer, the beam direction is determined according to the TCI state(s) indicated in the TCI codepoint in the DCI in PDCCH #5 to receive PDSCH #9 and PDSCH #10.

If the time (timeDurationForQCL) for the UE to apply the QCL configuration is insufficient, e.g., when timeDurationForQCL is less than the threshold time, one of the extended default QCL operations (e.g., 1) to 5) of default spatial QCL) described above in connection with Alt3 and Alt4 may be followed. For example, if PDSCH(s) are transmitted from the third serving cell based on a single DCI, the UE may use the TCI state(s) corresponding to the lowest codepoint among the TCI states configured with the TCI in the DCI field of PDCCH #5 as the default QCL configuration (e.g., extended default spatial QCL operation 4).

Referring to FIG. 21B, 20-50 illustrates an example in which in slot #0 to slot #3, the first serving cell transmits PDCCH #1, PDCCH #2, PDCCH #3, PDCCH #5, and PDCCH #6 in the configured CORESET (e.g., CORESET #0 and CORESET #1), transmits two PDSCHs (e.g., PDSCH #1 and PDSCH #2) based on a multi-DCI scheduled in PDCCH #1 and PDCCH #2, particularly in slot #0 to slot #3, transmits two or more PDSCHs (e.g., PDSCH #3 and PDSCH #4) based on a multi-DCI scheduled in PDCCH #3 and PDCCH #4, and transmits two or more PDSCHs (e.g., PDSCH #5 and PDSCH #6) based on a multi-DCI scheduled in PDCCH #7 and PDCCH #8. The base station of the first serving cell transmits the periodic CSI-RS (e.g., CSI-RS #0 or CSI-RS #0') and the aperiodic CSI-RS (e.g., CSI-RS #1 or CSI-RS #5) to measure the UE's downlink channel. In this case, the UE may identify the indication for the aperiodic CSI-RS #1 via PDCCH #2, the indication for the aperiodic CSI-RS #2 and CSI-RS #3 via PDCCH #4, and the indication for the aperiodic CSI-RS #5, CSI-RS #6, and CSI-RS #7 via PDCCH #12.

Slot #0 to slot #3 of 20-60 of FIG. 21B show operations of the serving cells, e.g., the first serving cell and the second serving cell different from the first serving cell, as described above in connection with 20-50 of FIG. 21B. It is assumed that in the second serving cell, the CORESET (e.g., CORESET #2 or CORESET #3) is configured in a different active BWP. The base station of the second serving cell transmits aperiodic CSI-RS #2 indicated based on cross-scheduling in PDCCH #4 of CORESET #1 in slot #1 or transmits aperiodic CSI-RS #4 indicated based on self-scheduling in PDCCH #9 of CORESET #2 in slot #2 or transmits aperiodic CSI-RS #6 indicated based on cross-scheduling in slot #3. The UE may identify the indications for the aperiodic CSI-RS #2, CSI-RS #4, and CSI-RS #6 through PDCCH #4, PDCCH #9, and PDCCH #12. 20-60 of FIG. 21B shows a case in which multi-TRP-based NC-JT transmission is configured for CORESET #2 and CORESET #3. A combination of the single-TRP-based NC-JT transmission configuration described in connection with FIG. 21A and the configuration described in connection with FIG. 21B is not excluded.

Referring to 20-70 of FIG. 21B, slot #0 to slot #3 show operations of the serving cells, e.g., the first serving cell and the third serving cell different from the first serving cell, as described above in connection with 20-50 of FIG. 21B. It is assumed that the third serving cell does not have a separate CORESET configured in another active BWP (non-configured CORESET). The base station of the third serving cell transmits aperiodic CSI-RS #3 indicated based on cross-carrier scheduling in PDCCH #2 of CORESET #1 in slot #1 and transmits aperiodic CSI-RS #7 scheduled in PDCCH #12 in slot #3. 20-70 of FIG. 21B shows a case where multi-TRP-based NC-JT transmission is configured. A combination of the single-TRP-based NC-JT transmission configuration described in connection with FIG. 21A and the configuration described in connection with FIG. 21B is not excluded.

It should be noted that the various embodiments in slots #0 to #3 do not necessarily require the base station to simultaneously perform scheduling but are intended merely to describe various embodiments.

In the following embodiments of the disclosure, which are based on the above-described embodiments of the disclosure, there are described operations for configuring and determining beams by a UE in each scenario and context when the scheduling offset between the last symbol of PDCCH #1 to PDCCH #4, PDCCH #7, and PDCCH #8 received by the UE and the start symbol of aperiodic CSI-RS #1 to CSI-RS #7 transmitted in the same serving cell (triggering cell) or a different serving cell (triggered cell) is smaller than a time (beamSwitchTiming or beamSwitchTiming+d) required to switch beams. For the time required to switch beams, the parameter value of beamSwitchTiming is applied if the triggering cell (first serving cell) and the triggered cell (second serving cell or third serving cell) have the same numerology, and the parameter value of beamSwitchTiming+d is applied if the triggering cell (first serving cell) and the triggered cell (second serving cell or third sec) have different numerologies. Here, d denotes the beam switching timing delay, and when μPDCCH is 0, 1, or 2, d may be calculated and applied as 8, 8, and 14 symbols.

Case 2-1

First, if the resource for the aperiodic CSI-RS and the resource for NC-JT-based PDSCH(s) transmitted from the base station in one serving cell, i.e., the first serving cell, where the triggering cell and the triggered cell are operated based on the same self-scheduling as illustrated in 20-50 of FIG. 21B in slot #0 at least partially overlap (e.g., when part of the resource for the aperiodic CSI-RS and part of the resource for the NC-JT-based PDSCH(s) of the first serving cell are the same) or completely overlap (e.g., when the whole resource for the aperiodic CSI-RS and the whole resource for the NC-JT-based PDSCH(s) of the first serving cell are the same), the UE may apply the QCL configuration of a different DL signal (e.g., PDSCH or periodic/aperiodic CSI-RS) at the time of reception of the aperiodic CSI-RS.

Here, if the different DL signal is the PDSCH(s) for NC-JT, like PDSCH #1 and PDSCH #2 of the single DCI-based multi-TRP, the UE is unable to change the beam direction for reception of the aperiodic CSI-RS. Thus, the UE may determine to follow the beam direction for receiving the NC-JT-based PDSCH(s) of CORESET #1. In this case, the UE may configure a beam for each of PDSCH #1 and PDSCH #2 to receive both PDSCH #1 and PDSCH #2.

When beam switching of the PDSCH(s) may be indicated in PDCCH #1 scheduling PDSCH #1 and PDCCH #2 scheduling PDSCH #2, and the time (timeDurationForQCL) for the UE receiving the beam switching indication to apply a QCL configuration change according to the beam switching is sufficient, e.g., when timeDurationForQCL is not smaller than a threshold time, the beam direction is determined based on the TCI state(s) indicated in the TCI codepoint in the DCI in PDCCH #1 and PDCCH #2 to receive PDSCH #1 and PDSCH #2. In this case, the UE may assume both the two beams for receiving PDSCH #1 and PDSCH #2 as the QCL configuration for receiving the aperiodic CSI-RS and may assume to receive one (e.g., the beam direction of PDSCH #1 and the beam direction of PDSCH #2) of the two beams. The operation of selecting one of the two beams may be based on the implementation of the UE or may follow a decision between the base station and the UE. As an example of selecting one of the two beams, if the two PDSCHs are associated with different CORESETPoolIndexs, any one beam may be selected according to the TCI state indicated in the PDSCH associated with the same CORESETPoolIndex as the CORESETPoolIndex for the DCI triggering the aperiodic CSI-RS. Here, the CORESETPoolIndex is a field included in ControlResourceSet IE which is an RRC IE and indicates the index of the CORESET pool for the corresponding CORESET. As an example, the ControlResourceSet IE is used to configure a time/frequency CORESET to search for downlink control information. Further, such a case may be considered where only a single PDSCH is transmitted in slot #0 although NC-JT transmission is configured in the multi-DCI-based multi-TRP in the first serving cell. For example, if the PDSCH scheduled in CORESET #0 set to CORESETPoolIndex 0 overlaps the aperiodic CSI-RS indicated in CORESET #1 set to CORESETPoolIndex 1 (e.g., when the resource for the PDSCH scheduled in CORESET #0 and the resource for the aperiodic CSI-RS indicated in CORESET #1 overlap at least partially or completely), the UE may apply the default beam configured in CORESET #1 set to CORESETPoolIndex 1 where the aperiodic CSI-RS is triggered. The default beam may be applied under the assumption that it is QCLed with the RS for the QCL parameter used for the PDCCH of the lowest CORESET index among the CORESETs set to the same CORESETPoolIndex value as CORESET #1 of PDCCH #2. As another example, if PDSCH #2 scheduled in CORESET #1 set to CORESETPoolIndex 1 overlaps aperiodic CSI-RS #1 indicated in CORESET #1 set to CORESETPoolIndex 1 (e.g., when the resource for PDSCH #2 scheduled in CORESET #1 and the resource for aperiodic CSI-RS #1 indicated in CORESET #1 overlap at least partially or completely), the UE may apply the QCL parameter to receive PDSCH #2. In other words, the UE may apply the PDSCH beam if it overlaps the PDSCH belonging to the same CORESETPoolIndex and, if not overlapped, apply the default beam of the CORESETPoolIndex that has triggered the CSI-RS.

If the time (timeDurationForQCL) for the UE to apply the QCL configuration is insufficient, e.g., when timeDurationForQCL is less than a threshold time, and the first serving cell transmits a plurality of PDSCHs based on multi-DCI, the UE may apply under the assumption that it is QCLed with the RS for the QCL parameter used for the PDCCH of the lowest CORESET index among the CORESETs set to the same CORESETPoolIndex value (e.g., the CORESETs set to the same CORESETPoolIndex value as CORESET #1 of PDCCH #2). The CORESETs set to the CORESETPoolIndex value means the one monitored in the latest slot among at least one or more CORESETs associated with the CORESETPoolIndexs in the active BWP of the first serving cell. Such an operation may be indicated by the capability of the UE, and if the UE does not support this operation, an operation specified in Rel-15 be followed regardless of the CORESETPoolIndex. In other words, the UE may determine the DMRS port of the received PDSCH based on the QCL parameter used in the CORESET associated with the monitored search space having the lowest CORESET ID in the latest slot.

Case 2-2

If the resource for aperiodic CSI-RS #2 transmitted from the base station of a serving cell, e.g., the second serving cell, where the triggering cell and the triggered cell are operated based on different cross-scheduling in slot #1 and the resource for the NC-JT-based PDSCH(s) of the triggering cell, e.g., the first serving cell at least partially overlap (e.g., when part of the resource for the aperiodic CSI-RS #2 is the same as part of the resource for the NC-JT-based PDSCH(s) of the first serving cell) or completely overlap (e.g., when the whole resource for aperiodic CSI-RS #2 and the whole resource for the NC-JT-based PDSCH(s) of the first serving cell are the same) as described above in connection with 20-60 of FIG. 21B, the UE may apply the QCL configuration of the different DL signal (e.g., PDSCH or periodic/aperiodic CSI-RS) at the time of reception of the aperiodic CSI-RS #2.

Here, if the different DL signal is the PDSCH(s) for NC-JT, like PDSCH #3 and PDSCH #4 of the multi-DCI-based multi-TRP, the UE is unable to change the beam direction for reception of the aperiodic CSI-RS #2. Thus, the UE may determine to follow the beam direction for receiving the NC-JT-based PDSCH(s) of CORESET #1 as default. In this case, the UE may configure two beams to receive both PDSCH #3 and PDSCH #4.

When beam switching of the PDSCH(s) may be indicated in PDCCH #3 scheduling PDSCH #3 and PDCCH #4 scheduling PDSCH #4, and the time (timeDurationForQCL) for the UE receiving the beam switching indication to apply a QCL configuration change according to the beam switching is sufficient, e.g., when timeDurationForQCL is not smaller than a threshold time, the beam direction is determined based on the TCI state(s) indicated in the TCI codepoint in the DCI in PDCCH #3 and PDCCH #4 to receive PDSCH #3 and PDSCH #4. In this case, the UE may assume both the two beams for receiving PDSCH #3 and PDSCH #4 as the QCL configuration for receiving the aperiodic CSI-RS #2 and may assume to receive only one (e.g., the beam direction of PDSCH #3 and the beam direction of PDSCH #4) of the two beams. The operation of selecting one of the two beams may be based on the implementation of the UE or may follow a decision between the base station and the UE. As an example of selecting one of the two beams, if the two PDSCHs are associated with different CORESETPoolIndexes, a beam may be determined according to the TCI state indicated in the PDSCH associated with the same CORESETPoolIndex as the CORESETPoolIndex for the DCI triggering the aperiodic CSI-RS.

Although multi-DCI-based multi-TRP NC-JT transmission has been configured in the first serving cell, it may be considered to transmit only a single PDSCH in slot #1. For example, if PDSCH #3 scheduled in CORESET #0 set to CORESETPoolIndex 0 overlaps the aperiodic CSI-RS #2 indicated in CORESET #1 set to CORESETPoolIndex 1 (e.g., when the resource for PDSCH #3 scheduled in CORESET #0 and the resource for the aperiodic CSI-RS #2 indicated in CORESET #1 overlap at least partially or completely), the UE may apply the default beam configured in CORESET #1 set to CORESETPoolIndex 1 where the aperiodic CSI-RS #2 is triggered. The default beam may be applied under the assumption that it is QCLed with the RS for the QCL parameter used for the PDCCH of the lowest CORESET index among the CORESETs set to the same CORESETPoolIndex value as CORESET #1 of PDCCH #4. As another example, if PDSCH #4 scheduled in CORESET #1 set to CORESETPoolIndex 1 overlaps aperiodic CSI-RS #2 indicated in CORESET #1 set to CORESETPoolIndex 1 (e.g., when the resource for PDSCH #4 scheduled in CORESET #1 and the resource for aperiodic CSI-RS #2 indicated in CORESET #1 overlap at least partially or completely), the UE may apply the QCL parameter to receive PDSCH #4. In other words, if the resource for the PDSCH belonging to the same CORESETPoolIndex and the resource for the aperiodic CSI-RS overlap (e.g., when the resource for the PDSCH belonging to the same CORESETPoolIndex and the resource for the aperiodic CSI-RS are in whole or at least partially the same), the UE may apply the PDSCH beam and, if not overlapped, apply the default beam of the CORESETPoolIndex that has triggered the CSI-RS.

If the time (timeDurationForQCL) for the UE to apply the QCL configuration is insufficient, e.g., when timeDurationForQCL is less than a threshold time, and the first serving cell transmits a plurality of PDSCHs based on multi-DCI, the UE may apply under the assumption that it is QCLed with the RS for the QCL parameter used for the PDCCH of the lowest CORESET index among the CORESETs set to the same CORESETPoolIndex value (e.g., the CORESETs set to the same CORESETPoolIndex value as CORESET #1 of PDCCH #4). The CORESETs set to the CORESETPoolIndex value means the one monitored in the latest slot among at least one or more CORESETs associated with the CORESETPoolIndexes in the active BWP of the first serving cell.

As another example, if a plurality of PDSCHs are transmitted based on multi-DCI in the second serving cell (e.g., multi-TRP transmission), the UE may apply under the assumption that it is QCLed with the RS for the QCL parameter used for the PDCCH of the lowest CORESET index among the CORESETs set to the same CORESETPoolIndex value as the CORESET monitored latest in the active BWP of the second serving cell (e.g., the CORESETs set to the same CORESETPoolIndex value as CORESET #1 of PDCCH #4). Such an operation may be indicated by the capability of the UE, and if the UE does not support this operation, an operation specified in Rel-15 be followed regardless of the CORESETPoolIndex. In other words, the UE may determine the DMRS port of the received PDSCH based on the QCL parameter used in the CORESET associated with the monitored search space having the lowest CORESET ID in the latest slot.

Case 2-3

If the resource for aperiodic CSI-RS #3 transmitted from the base station of the serving cell (e.g., the third serving cell) where the triggering cell and the triggered cell are operated based on different cross-scheduling in slot #1 and the resource for the NC-JT-based PDSCH(s) of the triggering cell, e.g., the first serving cell, at least partially overlap (e.g., when part of the resource for the aperiodic CSI-RS #3 is the same as part of the resource for the NC-JT-based PDSCH(s) of the first serving cell) or completely overlap (e.g., when the whole resource for aperiodic CSI-RS #3 and the whole resource for the NC-JT-based PDSCH(s) of the first serving cell are the same) as described above in connection with 20-70 of FIG. 21B, the UE may apply the QCL configuration of the different DL signal (e.g., PDSCH or periodic/aperiodic CSI-RS) at the time of reception of the aperiodic CSI-RS #3.

Case 2-3-a

If the triggering cell is operated as a single TRP, the UE may apply the QCL configuration used in the CORESET associated with the search space of the lowest CORESET ID in the latest slot in at least one or more CORESETs in the BWP of the first serving cell, rather than the beam direction for the aperiodic CSI-RS at the time of reception of the aperiodic CSI-RS.

Case 2-3-b

If the triggering cell is operated as a multi-DCI-based multi-TRP, the UE may apply the QCL configuration as described above in connection with case 2-2.

Case 2-4

If the resource for aperiodic CSI-RS #4 transmitted from the base station of the serving cell (e.g., the second serving cell) where the triggering cell and the triggered cell are operated based on the same self-scheduling in slot #2 and the resource for the NC-JT-based PDSCH(s) of the first serving cell at least partially overlap (e.g., when part of the resource for the aperiodic CSI-RS #4 is the same as part of the resource for the NC-JT-based PDSCH(s) of the first serving cell) or completely overlap (e.g., when the whole resource for aperiodic CSI-RS #4 and the whole resource for the NC-JT-based PDSCH(s) of the first serving cell are the same) as described above in connection with 20-60 of FIG. 21B, the UE may apply the QCL configuration of the different DL signal (e.g., PDSCH or periodic/aperiodic CSI-RS) at the time of reception of the aperiodic CSI-RS #4.

Here, if the different DL signal is the PDSCH(s) for NC-JT, like PDSCH #1 and PDSCH #2 of the single DCI-based multi-TRP, the UE is unable to change the beam direction for reception of the aperiodic CSI-RS. Thus, the UE may determine to follow the beam direction for receiving the NC-JT-based PDSCH(s). In this case, the UE may configure two beams to receive both PDSCH #5 and PDSCH #6.

When beam switching of the PDSCHs may be indicated in PDCCH #7 scheduling PDSCH #5 and PDCCH #8 scheduling PDSCH #6, and the time (timeDurationForQCL) for the UE receiving the beam switching indication to apply a QCL configuration change according to the beam switching is sufficient, e.g., when timeDurationForQCL is not smaller than a threshold time, the beam direction is determined based on the TCI state(s) indicated in the TCI codepoint in the DCI in PDCCH #7 and PDCCH #8 to receive PDSCH #5 and PDSCH #6.

Although multi-DCI-based multi-TRP NC-JT transmission has been configured in the first serving cell, it may be considered to transmit only a single PDSCH in slot #1. For example, if PDSCH #3 scheduled in CORESET #0 set to CORESETPoolIndex 0 overlaps the aperiodic CSI-RS #3 indicated in CORESET #1 set to CORESETPoolIndex 1 (e.g., when the resource for PDSCH #3 scheduled in CORESET #0 set to CORESETPoolIndex 0 and the resource for the aperiodic CSI-RS #3 indicated in CORESET #1 set to CORESETPoolIndex 1 overlap at least partially), the UE may apply the default beam configured in CORESET #1 set to CORESETPoolIndex 1 where the aperiodic CSI-RS #3 is triggered. The default beam may be applied under the assumption that it is QCLed with the RS for the QCL parameter used for the PDCCH of the lowest CORESET index among the CORESETs set to the same CORESETPoolIndex value as CORESET #1 of PDCCH #4. As another example, if PDSCH #4 scheduled in CORESET #1 set to CORESETPoolIndex 1 overlaps aperiodic CSI-RS #3 indicated in CORESET #1 set to CORESETPoolIndex 1 (e.g., when the resource for PDSCH #4 scheduled in CORESET #1 set to CORESETPoolIndex 1 and the resource for aperiodic CSI-RS #3 indicated in CORESET #1 set to CORESETPoolIndex 1 overlap at least partially), the UE may apply the QCL parameter to receive PDSCH #4. In other words, if the resource for the PDSCH belonging to the same CORESETPoolIndex and the resource for the aperiodic CSI-RS overlap, the UE may apply the PDSCH beam and, if the resource for the PDSCH belonging to the same CORESETPoolIndex does not overlap the resource for the aperiodic CSI-RS, apply the default beam of the CORESETPoolIndex that has triggered the CSI-RS.

If the time (timeDurationForQCL) for the UE to apply the QCL configuration is insufficient, e.g., when timeDurationForQCL is less than a threshold time, the UE may apply under the assumption that it is QCLed with the RS for the QCL parameter used for the PDCCH of the lowest CORESET index among the CORESETs set to the same CORESETPoolIndex value (e.g., the CORESETs set to the same CORESETPoolIndex value as CORESET #2 of PDCCH #9) in CORESET #2, CORESET #3, or CORESET #0 or CORESET #1. The CORESETs set to the CORESETPoolIndex value means the one monitored in the latest slot among at least one or more CORESETs associated with the CORESETPoolIndexs in the active BWP of the first serving cell.
Case 2-5

First, as described above in connection with 20-60 of FIG. 21B, if the resource for aperiodic CSI-RS #6 transmitted from the base station of a different serving cell, e.g., the second serving cell, where the triggering cell and the triggered cell are operated based on different cross-scheduling in slot #3 and the resource for NC-JT-based PDSCH(s) of the triggered cell, e.g., the second serving cell at least partially overlap (e.g., when part of the resource for the aperiodic CSI-RS #6 and part of the resource for the NC-JT-based PDSCH(s) of the second serving cell are the same) or completely overlap (e.g., when the whole resource for aperiodic CSI-RS #6 and the whole resource of the NC-JT-based PDSCH(s) of the second serving cell are the same), the UE may apply the QCL configuration of the different DL signal (e.g., PDSCH or periodic/aperiodic CSI-RS) at the time of reception of the aperiodic CSI-RS.

Here, if the different DL signal is the PDSCH(s) for NC-JT, like PDSCH #7 and PDSCH #8 of the multi-DCI-based multi-TRP, the UE is unable to change the beam direction for reception of the aperiodic CSI-RS #6. Thus, the UE may determine to follow the beam direction for receiving the NC-JT-based PDSCH(s). In this case, the UE may configure two beams to receive both PDSCH #7 and PDSCH #8.

When beam switching of the PDSCH(s) may be indicated in PDCCH #13 scheduling PDSCH #7 and PDCCH #14 scheduling PDSCH #8, and the time (timeDurationForQCL) for the UE receiving the beam switching indication to apply a QCL configuration change according to the beam switching is sufficient, e.g., when timeDurationForQCL is not smaller than a threshold time, the beam direction is determined based on the TCI state(s) indicated in the TCI codepoint in the DCI in PDCCH #13 and PDCCH #14 to receive PDSCH #7 or PDSCH #8. In this case, the UE may assume both the two beams for receiving PDSCH #7 and PDSCH #8 as the QCL configuration for receiving the aperiodic CSI-RS #6 and may assume to receive only one (e.g., the beam direction of PDSCH #7 and the beam direction of PDSCH #8) of the two beams. The operation of selecting one of the two beams may be based on the implementation of the UE or may follow a decision between the base station and the UE. As an example of determining one of the two beams, if the two PDSCHs are associated with different CORESETPoolIndexs, the UE may determine a beam according to the TCI state indicated in the PDSCH associated with the same CORESETPoolIndex as the CORESETPoolIndex for the DCI triggering the aperiodic CSI-RS.

If the time (timeDurationForQCL) for the UE to apply the QCL configuration is insufficient, e.g., when timeDurationForQCL is less than a threshold time, the UE may apply under the assumption that it is QCLed with the RS for the QCL parameter used for the PDCCH of the lowest CORESET index among the CORESETs set to the same CORESETPoolIndex value (e.g., the CORESETs set to the same CORESETPoolIndex value as CORESET #0 of PDCCH #11 or the CORESETs set to the same CORESETPoolIndex as CORESET #1 of PDCCH #12). The CORESETs set to the CORESETPoolIndex value means the one monitored in the latest slot among at least one or more CORESETs associated with the CORESETPoolIndexs in the active BWP of the first serving cell.

As another example, if a plurality of PDSCHs are transmitted based on multi-DCI in the second serving cell (e.g., multi-TRP transmission), the UE may apply under the assumption that it is QCLed with the RS for the QCL parameter used for the PDCCH of the lowest CORESET index among the CORESETs set to the same CORESETPoolIndex value as the CORESET monitored latest in the active BWP of the second serving cell (e.g., the CORESETs set to the same CORESETPoolIndex value as CORESET #2 of PDCCH #13 or the CORESETs set to the same CORESETPoolIndex value as CORESET #3 of PDCCH #14). Such an operation may be indicated by the capability of the UE, and if the UE does not support this operation, an operation specified in Rel-15 be followed regardless of the CORESETPoolIndex. In other words, the UE may determine the DMRS port of the received PDSCH based on the QCL parameter used in the CORESET associated with the monitored search space having the lowest CORESET ID in the latest slot.
Case 2-6

If the resource for aperiodic CSI-RS #7 transmitted from the base station of the serving cell (e.g., the third serving cell) where the triggering cell and the triggered cell are operated based on different cross-scheduling in slot #3 and the resource for the NC-JT-based PDSCH(s) of the triggered cell, e.g., the third serving cell, at least partially overlap (e.g., when part of the resource for the aperiodic CSI-RS #7 is the same as part of the resource for the NC-JT-based PDSCH(s) of the first serving cell) or completely overlap (e.g., when the whole resource for aperiodic CSI-RS #7 and the whole resource for the NC-JT-based PDSCH(s) of the first serving cell are the same) as described above in connection with 20-70 of FIG. 21B, the UE may apply the QCL configuration of the different DL signal (e.g., PDSCH or periodic/aperiodic CSI-RS) at the time of reception of the aperiodic CSI-RS #7.

Here, if the different DL signal is the PDSCH(s) for NC-JT, like PDSCH #9 and PDSCH #10 of the single DCI-based multi-TRP, the UE is unable to change the beam direction for reception of the aperiodic CSI-RS #7. Thus, the UE may determine to follow the beam direction for receiving the NC-JT-based PDSCH(s). In this case, the UE may configure two beams to receive both PDSCH #9 and PDSCH #10.

If beam switching of the PDSCH(s) is indicated in PDCCH #11 scheduling PDSCH #9 and PDCCH #12 scheduling PDSCH #10, and the time (timeDurationForQCL) for the UE receiving the beam switching indication to apply a QCL configuration change according to the beam switching is sufficient, e.g., when timeDurationForQCL is a threshold time or longer, the beam direction is determined according to the TCI state(s) indicated in the TCI codepoint in the DCI in PDCCH #11 and PDCCH #12 to receive PDSCH #9 and PDSCH #10.

If the time (timeDurationForQCL) for the UE to apply the QCL configuration is insufficient, e.g., when timeDuration-ForQCL is less than a threshold time, the UE may apply under the assumption that it is QCLed with the RS for the QCL parameter used for the PDCCH of the lowest CORESET index among the CORESETs set to the same CORESETPoolIndex value (e.g., the CORESETs set to the same CORESETPoolIndex value as CORESET #0 of PDCCH #11 or the CORESETs set to the same CORESETPoolIndex as CORESET #1 of PDCCH #12). The CORESETs set to the CORESETPoolIndex value means the one monitored in the latest slot among at least one or more CORESETs associated with the CORESETPoolIndexs in the active BWP of the first serving cell.

Described below are a UE capability report and/or base station configuration for default beam support of the PDSCH and AP-CSI-RS as described above.

First, the UE may report whether each of the above-described multi-DCI-based NC-JT default beam operations and single-DCI-based NC-JT default beam operations is supported (enablement/disablement for default beam) to the base station via UE capabilities independent from each other. A different UE capability may be reported per CC, per band, or per band combination. As an example, the UE reports that the default beam operations are supportable for the CC of FR1 while reporting that the default beam operations are not supportable for the CC of FR2. Alternatively, the UE may report that the default beam operations are supportable for the CC of FR2 while reporting that the default beam operations are not supportable for the CC of FR1.

The base station may determine whether to perform the above-described multi-DCI-based NC-JT default beam operations or single-DCI-based NC-JT default beam operations based on the UE's capability and, based thereupon, configure/indicate information necessary to perform the single-DCI or multi-DCI-based NC-JT default beam operations. Here, the configuration/indication may be explicitly indicated to the UE via a higher layer parameter, e.g., RRC IE.

The explicit indication may be expressed as shown in Table 18 below, for each of multi-DCI and single-DCI-based NC-JT.

TABLE 18

[Multi-DCI based]
If a UE configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL and the UE is configured with [enableEnhDefaultBeamMDCI], the UE may assume that the DM-RS ports of PDSCH associated with a value of CORESETPoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the UE.
[Single-DCI based]
If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states and the UE is configured with [enableEnhDefaultBeamSDCI], the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

In Table 18, [Multi-DCI based] indicates an explicit indication for multi-DCI-based NC-JT, and [Single-DCI based] indicates an explicit indication for single-DCI-based NC-JT. In Table 18 above, enableEnhDefaultBeamMDCI and enableEnhDefaultBeamSDCI, respectively, may be the names of the higher layer parameters indicating the multi-DCI-based NC-JT default beam operation and the single-DCI-based NC-JT default beam operation. The names are merely an example and may be changed.

Alternatively, the indication may be implicitly indicated to the UE based on one of the following methods.

Method 1—The base station may set different CORESETPoolIndex values in, e.g., the CORESETs in the CC/BWP, for the UE, by setting multi-DCI-based NC-JT in any one CC/BWP. The UE may perform multi-DCI-based NC-JT default beam operations (default QCL assumption) based on the set values. In other words, the base station and the UE may assume that multi-DCI-based NC-JT default beam operations are determined by setting different CORESET-PoolIndex values in the CORESETs in the CC/BWP.

The default beam operation according to the configuration corresponds to the UE that has reported that the UE is able to support multi-DCI-based NC-JT default beam operations via a UE capability report for CC/BWP.

Method 2—The base station may map and set, for the UE, a plurality of TCI states in the TCI codepoint in the CC/BWP by setting single-DCI-based NC-JT in any one CC/BWP. The UE may perform single-DCI-based NC-JT default beam operations in the CC/BWP based on the set TCI state(s) information. In other words, the base station and the UE may appreciate or assume that single-DCI-based NC-JT default beam operations are determined by configuring a plurality of TCI states in the TCI codepoint in the CC/BWP. The default beam operation according to the configuration corresponds to the UE that has reported that the UE is able to support single-DCI-based NC-JT default beam operations via a UE capability report for CC/BWP.

The above-described configuration and indication methods may be applied to all of the various embodiments of the above-described PDSCH default beam operations and AP-CSI-RS default beam operations. Alternatively, the UE capability reporting whether to apply the default beam operations of AP-CSI-RS described above is independently performed for each of multi-DCI-based NC-JT and single-DCI-based NC-JT, and the base station may explicitly or implicitly indicate whether to apply the above-described default beam operations of AP-CSI-RS to the UE independently for each of multi-DCI-based NC-JT and single-DCI-based NC-JT. Alternatively, the above-described methods for indicating multi-DCI-based NC-JT and single-DCI-based NC-JT default beam operations may be likewise used to indicate the default beam operations of AP-CSI-RS.

If an NC-JT default beam operation is not indicated or an AP-CSI-RS default beam operation is not indicated, the UE may perform operations, e.g., the AP-CSI-RS default beam operations in the single TRP transmission context as described above according to the related art.

A UE capability reporting for default beam operations may be performed independently from self-carrier scheduling and cross-CC scheduling capability reporting. For example, the UE capability report related to determine and set the default beam operation may be applied upon self-carrier scheduling.

default beam operation for cross-CC scheduling may be reported in the form of an independent UE capability parameter, feature, or feature group. For example, whether multi-DCI-based NC-JT default beam operation is possible or whether single-DCI-based NC-JT default beam operation is possible may be reported independently from whether cross-CC scheduling is supported. In the UE capability report for the NC-JT default beam operation upon cross-CC scheduling, the default beam capability for cross-CC scheduling for the PDCCH and/or PDSCH/AP-CSI-RS having the same SCS and the default beam capability for cross-CC scheduling for the PDCCH and/or PDSCH/AP-CSI-RS having a different SCS may be reported via independent parameters features, or feature groups, or via an integrated feature or integrated group.

Whether the default beam operation for the UE's cross-CC scheduling is possible may be reported via a combination of multiple UE capability reports. For example, the UE may report whether the multi-DCI-based NC-JT default beam operation is possible or single-DCI-based NC-JT default beam operation is possible and, together therewith, the UE may report whether a default beam operation is possible upon cross-CC scheduling. In the UE capability report (e.g., enablement for default beam for CCS) as to whether the default beam operation is possible upon cross-CC scheduling, the UE capability for the default beam upon cross-CC scheduling for the PDCCH and PDSCH and/or AP-CSI-RS having the same SCS and the UE capability for the default beam upon cross-CC scheduling for the PDCCH and PDSCH and/or AP-CSI-RS having a different SCS may be reported independently from each other or together. In this case, if the UE reports that it supports both the multi-DCI or single-DCI-based NC-JT default beam and the default beam operation upon cross-CC scheduling for the same/different SCSs, the base station may identify that the UE may support the above-described multi-DCI or single-DCI-based NC-JT default beam operations upon cross-CC scheduling for the same/different SCSs.

The above-described embodiments describe some of various combinations for independently or collectively reporting the UE capability as shown in Table 19 below but, without limitations thereto, it will be readily appreciated that the disclosure may also encompass other various combinations (type 1-1-1, . . . , type 1-2-2) as follows.

TABLE 19

|  | Cross-carrier scheduling with different SCS | Default QCL assumption for cross-carrier scheduling | Cross-carrier A-CSI RS triggering with different SCS | Default QCL assumption for cross-carrier A-CSI-RS triggering |
| --- | --- | --- | --- | --- |
| Default QCL enhancement for single-DCI based multi-TRP | Type 1-1-1 | Type 1-1-2 | Type 1-2-1 | Type 1-2-2 |
| Default QCL enhancement for multi-DCI based multi-TRP | Type 2-1-1 | Type 2-1-2 | Type 2-2-1 | Type 1-2-2 |

Whether a default beam operation is possible for cross-CC scheduling may be to define the UE's capability as to whether the UE is able to perform the default beam operation upon cross-CC scheduling from the base station, as a capability parameter or message. In this case, whether the Next, the base station's NC-JT default beam configuration for cross-CC scheduling may be performed independently of the NC-JT default beam configuration upon self-carrier scheduling. For example, if the above-described base station NC-JT default beam configuration is explicitly indicated, an indicator for self-carrier scheduling and an indicator for cross-CC scheduling may be independently configured. If the above-described base station NC-JT default beam configuration is implicitly indicated, the NC-JT default beam configuration for cross-CC scheduling may be indicated via a combination of multiple explicit/implicit indicators. For example, when method 1 or method 2 described above is implicitly indicated along with an explicit indicator (e.g., a parameter, a feature, or a feature group) indicating whether the default beam operation is possible upon cross-CC scheduling, the UE may identify that the base station has indicated the multi-DCI-based or single-DCI-based NC-JT default beam operation for cross-CC scheduling. Explicit indicators indicating whether the default beam operation is possible upon cross-CC scheduling may be separately indicated as a default beam operation configuration indicator upon cross-CC scheduling for the PDCCH and PDSCH/AP-CSI-RS having the same SCS and a default beam operation configuration indicator upon cross-CC scheduling for the PDCCH and PDSCH/AP-CSI-RS having different SCSs, or such indicators may be collectively indicated.

An operation when the explicit indicator indicating whether the default beam operation is possible upon cross-CC scheduling and method 2 are combined may be represented as shown in Table 20 below.

TABLE 20

If the PDCCH carrying the scheduling DCI is received on one component carrier, and the PDSCH scheduled by that DCI is on another component carrier and the UE is configured with [enabledDefaultBeamForCCS]:
The timeDurationForQCL is determined based on the subcarrier spacing of the scheduled PDSCH. If $\mu_{PDCCH} < \mu_{PDSCH}$ an additional timing delay $d\frac{2^{\mu}PDSCH}{2^{\mu}PDCCH}$ is added to the timeDurationForQCL, where d is defined in 5.2.1.5.1a-1;
For both the cases, when the offset between the reception of the DL DCI and the corresponding PDSCH is less than the threshold timeDurationForQCL, and when the DL DCI does not have the TCI field present, the UE obtains its QCL assumption for the scheduled PDSCH from the activated TCI state with the lowest ID applicable to PDSCH in the active BWP of the scheduled cell;
When tci-PresentInDCI is set to 'enabled' and the offset between the reception of the DL DCI and the corresponding PDSCH is less than the threshold timeDurationForQCL, and at least one TCI codepoint indicates two TCI states for the serving cell of scheduled PDSCH, the UE may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

In Table 20, enabledDefaultBeamForCCS is the explicit indicator indicating whether the default beam operation is possible upon cross-CC scheduling and, if the value is set, the UE may identify that the base station has indicated the default beam operation upon cross-CC scheduling. If the enabledDefaultBeamForCCS value is not set, the UE may assume that the base station has not indicated the default beam operation upon PDSCH scheduling with cross-CC. In other words, it may be expected that upon cross-CC scheduling, the scheduling offset between the PDCCH and the PDSCH described above is always larger than timeDurationForQCL, $$timeDurationForQCL + d\frac{2^{\mu}PDSCH}{2^{\mu}PDCCH},$$

or timeDurationForQCL+delta (e.g. another extra delay). Further, when the enabledDefaultBeamForCCS value is not configured or set, the UE may determine that the base station has not indicated the default beam operation upon AP-CSI-RS triggering with cross-CC. In other words, it may be expected that upon cross-CC scheduling, the scheduling offset between the PDCCH and the AP-CSI-RS is always larger than beamSwitchTiming, $$beamSwitchTiming + d\frac{2^{\mu}CSIRS}{2^{\mu}PDCCH}$$

or timeDurationForQCL+delta (e.g., another extra delay).

Figure 22:
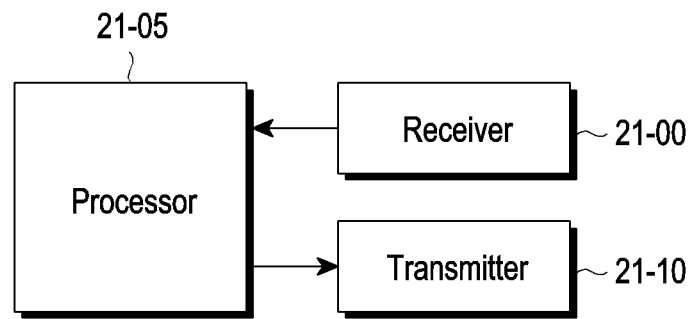
FIG. 22 is a view illustrating a structure of a UE in a wireless communication system according to an embodiment of the disclosure.

FIG. 22 is a block diagram illustrating a structure of a UE in a wireless communication system according to an embodiment of the disclosure.

Referring to FIG. 22, the UE may include a receiver 21-00, a transmitter 21-10, and a processor (or controller) 21-05.

The receiver 21-00 and the transmitter 21-10 may be collectively referred to as a transceiver. The receiver 21-00, the transmitter 21-10, and the processor 21-05 may be operated according to the above-described communication methods by the UE. However, the components of the UE are not limited thereto. For example, the UE may include more components (e.g., a memory) or fewer components than the above-described components. The receiver 21-00, the transmitter 21-10, and the processor 21-05 may be implemented in the form of a single chip.

The receiver 21-00 and the transmitter 21-10 (or a transceiver) may transmit and receive signals to/from the base station. The signal may include control information and data. To that end, the transceiver may include a radio frequency (RF) transmitter for frequency-up converting and amplifying signals transmitted and an RF receiver for low-noise amplifying signals received and frequency-down converting the frequency of the received signals. However, this is merely an example of the transceiver, and the components of the transceiver are not limited to the RF transmitter and the RF receiver.

The transceiver may receive signals via a radio channel, output the signals to the processor 21-05, and transmit signals output from the processor 21-05 via a radio channel.

A memory (not shown) may store programs and data necessary for the operation of the UE. The memory may store control information or data that is included in the signal obtained by the UE. The memory may include a storage medium, such as a read-only memory (ROM), a random access memory (RAM), a hard disk, a compact disc read-only memory (CD-ROM), and a digital versatile discs (DVD), or a combination of storage media.

The processor 21-05 may control a series of processes for the UE to operate according to the above-described embodiments. The processor 21-05 may be implemented as a controller or one or more processors.

Figure 23:
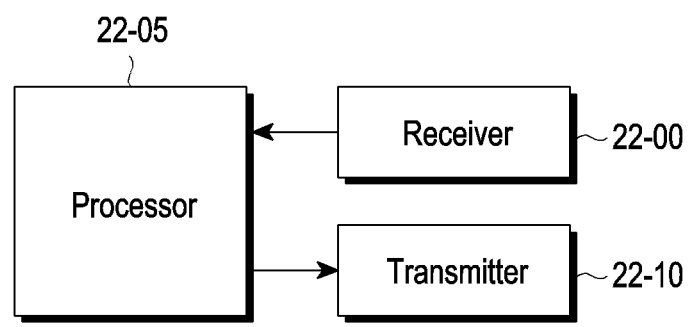
FIG. 23 is a view illustrating a structure of a base station in a wireless communication system according to an embodiment of the disclosure.

FIG. 23 is a block diagram illustrating a structure of a base station in a wireless communication system according to an embodiment of the disclosure.

Referring to FIG. 23, the base station may include a receiver 22-00, a transmitter 22-10, and a processor 22-05.

The receiver 22-00 and the transmitter 22-10 may be collectively referred to as a transceiver. The receiver 22-00, the transmitter 22-10, and the processor 22-05 may be operated according to the above-described communication methods by the base station. However, the components of the base station are not limited thereto. For example, the base station may include more components (e.g., a memory) or fewer components than the above-described components. The receiver 22-00, the transmitter 22-10, and the processor 22-05 may be implemented in the form of a single chip.

The receiver 22-00 and the transmitter 22-10 (or a transceiver) may transmit and receive signals to/from the UE. The signal may include control information and data. To that end, the transceiver may include a radio frequency (RF) transmitter for frequency-up converting and amplifying signals transmitted and an RF receiver for low-noise amplifying signals received and frequency-down converting the frequency of the received signals. However, this is merely an example of the transceiver, and the components of the transceiver are not limited to the RF transmitter and the RF receiver.

The transceiver may receive signals via a radio channel, output the signals to the processor 22-05, and transmit signals output from the processor 22-05 via a radio channel.

According to an embodiment of the present disclosure, a method performed by a terminal in a wireless communication system is provided. The method may include receiving, from a base station (BS), physical downlink control channel (PDCCH) configuration information including two different values of a control resource set (CORESET) pool index, receiving, from the BS, information indicating that pre-defined quasi co located (QCL) relation is enabled to be applied based on a CORESET pool index, receiving, from the BS, a PDCCH triggering an aperiodic channel state information reference signal (CSI-RS), and receiving, from the BS, the aperiodic CSI-RS, wherein, in case that a scheduling offset between a last symbol of the PDCCH and a start symbol of the aperiodic CSI-RS is smaller than a time duration for QCL application, QCL relation applied for the aperiodic CSI-RS may be determined according to a CORESET pool index associated with the PDCCH.

According to an embodiment of the present disclosure, in case that another downlink signal which is associated with a same CORESET pool index as the CORESET pool index associated with the PDCCH is present in a same time resource as the aperiodic CSI-RS, the QCL relation applied for the aperiodic CSI-RS may be determined as QCL relation of the another downlink signal.

According to an embodiment of the present disclosure, the another downlink signal may correspond to a physical downlink shared channel (PDSCH) which is scheduled by another PDCCH associated with the same CORESET pool index as the CORESET pool index associated with the PDCCH.

According to an embodiment of the present disclosure, in case that another downlink signal is absent in a same time resource as the aperiodic CSI-RS, the QCL relation applied for the aperiodic CSI-RS may be determined as QCL relation which is associated with a lowest CORESET index among CORESETs configured with a same CORESET pool index as the CORESET pool index associated with the PDDCH.

According to an embodiment of the present disclosure, the PDSCH may be scheduled with time which is larger than or equal to threshold time for performing the PDCCH reception and applying the QCL relation.

According to an embodiment of the present disclosure, the method may further include transmitting, to the base station, information indicating whether the terminal supports the pre-defined QCL relation to be applied based on the CORESET pool index.

According to an embodiment of the present disclosure, a method performed by a terminal in a wireless communication system is provided. The method may include receiving, from a base station (BS), physical downlink control channel (PDCCH) configuration information including two different values of a control resource set (CORESET) pool index, receiving, from the BS, information indicating that pre-defined quasi co located (QCL) relation is enabled to be applied based on a CORESET pool index, receiving, from the BS, a PDCCH, and receiving, from the BS, a physical downlink shared channel (PDSCH) scheduled by the PDCCH, wherein, in case that an offset between the reception of the PDCCH and the reception of the PDSCH is smaller than a threshold value for applying QCL relation, QCL relation applied for the PDSCH is determined according to a CORESET with a lowest CORESET index among CORESETs configured with a same value as a CORESET pool index of the PDCCH.

According to an embodiment of the present disclosure, the QCL relation applied for the PDSCH may be determined as QCL relation applied for a reference signal (RS) with respect to QCL relation used for another PDCCH of the CORESET.

According to an embodiment of the present disclosure, the CORESETS may include CORESETS which are monitored in a latest slot in at least one CORESET which is associated with a CORESET pool index within an active bandwidth part (BWP) of a serving cell.

According to an embodiment of the present disclosure, the CORESET with the lowest CORESET index may be associated with a monitored search space which is associated with the lowest CORESET index among the CORESETs.

According to an embodiment of the present disclosure, a method performed by a base station (BS) in a wireless communication system is provided. The method may include generating physical downlink control channel (PDCCH) configuration information including two different values of a control resource set (CORESET) pool index, generating first information indicating that pre-defined quasi co located (QCL) relation is enabled to be applied based on a CORESET pool index, transmitting, to the terminal, the PDCCH configuration information, and transmitting, to the terminal, the first information.

According to an embodiment of the present disclosure, the method may further include receiving, from the terminal, second information indicating whether the terminal supports the pre-defined QCL relation based on the CORESET pool index.

According to an embodiment of the present disclosure, the method may further include receiving, from the terminal, third information indicating whether the terminal supports pre-defined QCL relation with a plurality of QCL relations.

According to an embodiment of the present disclosure, a terminal in a wireless communication system is provided. The terminal may include a transceiver, and a processor, wherein the processor is configured to: receive, from a base station (BS) via the transceiver, physical downlink control channel (PDCCH) configuration information including two different values of a control resource set (CORESET) pool index, receive, from the BS via the transceiver, information indicating that pre-defined quasi co located (QCL) relation is enabled to be applied based on a CORESET pool index, receive, from the BS via the transceiver, a PDCCH triggering an aperiodic channel state information reference signal (CSI-RS), and receive, from the BS via the transceiver, the aperiodic CSI-RS, wherein, in case that a scheduling offset between a last symbol of the PDCCH and a start symbol of the aperiodic CSI-RS is smaller than a time duration for QCL application, QCL relation applied for the aperiodic CSI-RS may be determined according to a CORESET pool index associated with the PDCCH.

According to an embodiment of the present disclosure, in case that another downlink signal which is associated with a same CORESET pool index as the CORESET pool index associated with the PDCCH is present in a same time resource as the aperiodic CSI-RS, the QCL relation applied for the aperiodic CSI-RS may be determined as QCL relation of the another downlink signal.

According to an embodiment of the present disclosure, the another downlink signal may correspond to a physical downlink shared channel (PDSCH) which is scheduled by another PDCCH associated with the same CORESET pool index as the CORESET pool index associated with the PDCCH.

According to an embodiment of the present disclosure, in case that another downlink signal is absent in a same time resource as the aperiodic CSI-RS, the QCL relation applied for the aperiodic CSI-RS may be determined as QCL relation which is associated with a lowest CORESET index among CORESETs configured with a same CORESET pool index as the CORESET pool index associated with the PDDCH.

According to an embodiment of the present disclosure, a base station (BS) in a wireless communication system is provided. The BS may include a transceiver, and a processor, wherein the processor is configured to: generate physical downlink control channel (PDCCH) configuration information including two different values of a control resource set (CORESET) pool index, generate first information indicating that pre-defined quasi co located (QCL) relation is enabled to be applied based on a CORESET pool index, transmit, to the terminal via the transceiver, the PDCCH configuration information, and transmit, to the terminal via the transceiver, the first information.

According to an embodiment of the present disclosure, the processor may be further configured to receive, from the terminal, second information indicating whether the terminal supports the pre-defined QCL relation based on the CORESET pool index.

According to an embodiment of the present disclosure, the processor may be further configured to receive, from the terminal, third information indicating whether the terminal supports pre-defined QCL relation with a plurality of QCL relations.

A memory (not shown) may store programs and data necessary for the operation of the base station. The memory may store control information or data that is included in the signal obtained by the base station. The memory may include a storage medium, such as a ROM, a RAM, a hard disk, a CD-ROM, and a DVD, or a combination of storage media. The processor 22-05 may control a series of processes for the base station to operate according to the above-described embodiments. The processor 22-05 may be implemented as a controller or one or more processors.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, DVDs, or other types of optical storage devices, or magnetic cassettes. Alternatively, the programs may be stored in a memory constituted of a combination of all or some thereof. As each constituting memory, multiple ones may be included.

The programs may be stored in attachable storage devices that may be accessed via a communication network, such as the Internet, Intranet, a local area network (LAN), a wide area network (WLAN), or a storage area network (SAN) or a communication network configured of a combination thereof. The storage device may connect to the device that performs embodiments of the disclosure via an external port. A separate storage device over the communication network may be connected to the device that performs embodiments of the disclosure.

In the drawings illustrating methods according to embodiments of the disclosure, the order of description is not necessarily identical to the order of execution, and some operations may be performed in a different order or simultaneously.

Some of the components shown in the drawings illustrating methods according to embodiments may be omitted in such an extent as not to impair the gist or essence of the disclosure.

The methods in the disclosure may be performed in a combination of all or some of the embodiments described herein in such an extent as not to impair the gist or essence of the disclosure.

Although not disclosed herein, a separate table or information containing at least one component included in the tables proposed herein may be used.

While the disclosure has been shown and described with reference to various embodiments thereof, it will be understood by those skilled in the art that various changes in from and details may be made therein without departing from the spirit and scope of the disclosure as defined by the appended claims and their equivalents.

What is claimed is:

1. A method performed by a terminal in a wireless communication system, the method comprising:
receiving, from a base station (BS), physical downlink control channel (PDCCH) configuration information including two different values of a control resource set (CORESET) pool index;
receiving, from the BS, information indicating that a pre-defined quasi co located (QCL) relation is enabled to be applied based on the CORESET pool index;
receiving, from the BS, a PDCCH triggering an aperiodic channel state information reference signal (CSI-RS);
receiving, from the BS, the aperiodic CSI-RS; and
transmitting, to the base station, information indicating whether the terminal supports the pre-defined QCL relation to be applied based on the CORESET pool index value,
wherein, in case that a scheduling offset between a last symbol of the PDCCH triggering the aperiodic CSI-RS and a start symbol of the aperiodic CSI-RS is smaller than a time duration for QCL application, a QCL relation applied for the aperiodic CSI-RS is determined according to a CORESET pool index value associated with the PDCCH triggering the aperiodic CSI-RS.

2. The method of claim 1, wherein, in case that another downlink signal which is associated with a same CORESET pool index value as the CORESET pool index value associated with the PDCCH triggering the aperiodic CSI-RS is present in a same time resource as the aperiodic CSI-RS, the QCL relation applied for the aperiodic CSI-RS is determined as a QCL relation of the other downlink signal.

3. The method of claim 2, wherein the other downlink signal corresponds to a physical downlink shared channel (PDSCH) which is scheduled by another PDCCH associated with the same CORESET pool index value as the CORESET pool index value associated with the PDCCH triggering the aperiodic CSI-RS.

4. The method of claim 3, wherein the PDSCH is scheduled with time which is larger than or equal to a threshold time for performing the PDCCH reception and applying the QCL relation.

5. The method of claim 1, wherein, in case that another downlink signal is absent in a same time resource as the aperiodic CSI-RS, the QCL relation applied for the aperiodic CSI-RS is determined as a QCL relation associated with a lowest CORESET index among CORESETs configured with a same CORESET pool index value as the CORESET pool index value associated with the PDCCH triggering the aperiodic CSI-RS.

6. A method performed by a terminal in a wireless communication system, the method comprising:
receiving, from a base station (BS), physical downlink control channel (PDCCH) configuration information including two different values of a control resource set (CORESET) pool index;
receiving, from the BS, information indicating that a pre-defined quasi co located (QCL) relation is enabled to be applied based on the CORESET pool index;
receiving, from the BS, a PDCCH;
receiving, from the BS, a physical downlink shared channel (PDSCH) scheduled by the PDCCH; and
transmitting, to the base station, information indicating whether the terminal supports the pre-defined QCL relation to be applied based on the CORESET pool index value,
wherein, in case that an offset between the reception of the PDCCH and the reception of the PDSCH is smaller than a threshold value for applying a QCL relation, a QCL relation applied for the PDSCH is determined according to a CORESET with a lowest CORESET index among CORESETs configured with a same value as a CORESET pool index value of the PDCCH.

7. The method of claim 6, wherein the QCL relation applied for the PDSCH is determined as a QCL relation applied for a reference signal (RS) with respect to a QCL relation used for another PDCCH of the CORESET.

8. The method of claim 7, wherein the CORESETs include CORESETs which are monitored in a latest slot in at least one CORESET which is associated with a CORESET pool index value within an active bandwidth part (BWP) of a serving cell.

9. The method of claim 7, wherein the CORESET with the lowest CORESET index is associated with a monitored search space which is associated with the lowest CORESET index among the CORESETs.

10. A terminal in a wireless communication system, the terminal comprising:
a transceiver; and
a processor, wherein the processor is configured to:
receive, from a base station (BS) via the transceiver, physical downlink control channel (PDCCH) configuration information including two different values of a control resource set (CORESET) pool index,
receive, from the BS via the transceiver, information indicating that a pre-defined quasi co located (QCL) relation is enabled to be applied based on the CORESET pool index,
receive, from the BS via the transceiver, a PDCCH triggering an aperiodic channel state information reference signal (CSI-RS),
receive, from the BS via the transceiver, the aperiodic CSI-RS, and
transmit, to the base station, information indicating whether the terminal supports the pre-defined QCL relation to be applied based on the CORESET pool index value,
wherein, in case that a scheduling offset between a last symbol of the PDCCH triggering the aperiodic CSI-RS and a start symbol of the aperiodic CSI-RS is smaller than a time duration for QCL application, a QCL relation applied for the aperiodic CSI-RS is determined according to a CORESET pool index value associated with the PDCCH triggering the aperiodic CSI-RS.

11. The terminal of claim 10, wherein, in case that another downlink signal which is associated with a same CORESET pool index value as the CORESET pool index value associated with the PDCCH triggering the aperiodic CSI-RS is present in a same time resource as the aperiodic CSI-RS, the QCL relation applied for the aperiodic CSI-RS is determined as a QCL relation of the other downlink signal.

12. The terminal of claim 11, wherein the other downlink signal corresponds to a physical downlink shared channel (PDSCH) which is scheduled by another PDCCH associated with the same CORESET pool index value as the CORESET pool index value associated with the PDCCH triggering the aperiodic CSI-RS.

13. The terminal of claim 10, wherein, in case that another downlink signal is absent in a same time resource as the aperiodic CSI-RS, the QCL relation applied for the aperiodic CSI-RS is determined as a QCL relation which is associated with a lowest CORESET index among CORESETs configured with a same CORESET pool index value as the CORESET pool index value associated with the PDCCH triggering the aperiodic CSI-RS.

\* \* \* \* \*